United States Patent
Fudaba et al.

(10) Patent No.: US 8,504,206 B2
(45) Date of Patent: Aug. 6, 2013

(54) CONTROL APPARATUS AND METHOD FOR MASTER-SLAVE ROBOT, MASTER-SLAVE ROBOT, CONTROL PROGRAM, AND INTEGRATED ELECTRONIC CIRCUIT

(75) Inventors: Yudai Fudaba, Osaka (JP); Yuko Tsusaka, Osaka (JP); Taichi Sato, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/433,800

(22) Filed: Mar. 29, 2012

(65) Prior Publication Data
US 2012/0191245 A1 Jul. 26, 2012

Related U.S. Application Data

(63) Continuation of application No. PCT/JP2011/003713, filed on Jun. 29, 2011.

(30) Foreign Application Priority Data

Aug. 31, 2010 (JP) ................ 2010-193605

(51) Int. Cl.
*G05B 19/04* (2006.01)
*G05B 19/18* (2006.01)
*G05B 19/00* (2006.01)
*G05B 15/00* (2006.01)

(52) U.S. Cl.
USPC ........... 700/260; 700/253; 700/255; 700/257; 700/258; 700/261; 901/33; 901/34; 901/46

(58) Field of Classification Search
None
See application file for complete search history.

(56) References Cited

U.S. PATENT DOCUMENTS

| 7,084,867 B1 * | 8/2006 | Ho et al. ................. 345/419 |
| 7,102,315 B2 * | 9/2006 | Nakata et al. ............ 318/568.22 |
| 7,713,263 B2 * | 5/2010 | Niemeyer ................ 606/1 |
| 8,077,145 B2 * | 12/2011 | Rosenberg et al. ........... 345/157 |

(Continued)

FOREIGN PATENT DOCUMENTS

| JP | 59-157715 | 9/1984 |
| JP | 63-28580 | 2/1988 |

(Continued)

OTHER PUBLICATIONS

4_sec_022_Chotiprayanakul_et_al_A_haptic.pdf (Pholchai Chotiprayanakul, Dalong Wang, Ngaiming Kwok and Dikai Liu, A Haptic Base Human Robot Interaction Approach for Robotic Grit Blasting, Jun. 26-29, 2008, ISARC, pp. 148-154).*

(Continued)

*Primary Examiner* — Khoi Tran
*Assistant Examiner* — Bao Long T Nguyen
(74) *Attorney, Agent, or Firm* — Wenderoth, Lind & Ponack, L.L.P.

(57) ABSTRACT

A control apparatus for a master-slave robot includes a force correction section detecting unit that detects a section at which force information from at least one of force information and speed information is corrected, and a force correcting unit that corrects the force information at a section detected as a force correction section by the force correction section detecting unit. A small external force applied to a slave manipulator is magnified and transmitted to a master manipulator, or an excessive manipulation force applied to the master manipulator is reduced and transmitted to the slave manipulator.

18 Claims, 39 Drawing Sheets

(56) References Cited

U.S. PATENT DOCUMENTS

| | | | |
|---|---|---|---|
| 8,287,522 B2 * | 10/2012 | Moses et al. ............... 606/1 |
| 2004/0106916 A1 * | 6/2004 | Quaid et al. ............... 606/1 |
| 2007/0142823 A1 * | 6/2007 | Prisco et al. ............... 606/1 |
| 2009/0248038 A1 * | 10/2009 | Blumenkranz et al. ....... 606/130 |
| 2010/0204713 A1 * | 8/2010 | Ruiz Morales ............ 606/130 |
| 2011/0160745 A1 * | 6/2011 | Fielding et al. ............ 606/130 |

FOREIGN PATENT DOCUMENTS

| | | |
|---|---|---|
| JP | 64-34686 | 2/1989 |
| JP | 4-101789 | 4/1992 |
| JP | 5-204440 | 8/1993 |
| JP | 6-270075 | 9/1994 |
| JP | 8-164807 | 6/1996 |
| JP | 8-229858 | 9/1996 |
| JP | 8-281573 | 10/1996 |
| JP | 9-285984 | 11/1997 |
| JP | 11-333764 | 12/1999 |
| JP | 2002-59380 | 2/2002 |
| JP | 2002-307336 | 10/2002 |
| JP | 2003-39348 | 2/2003 |
| JP | 2006-212741 | 8/2006 |
| JP | 2006-341348 | 12/2006 |

OTHER PUBLICATIONS

ICRA05_CollDetect.pdf (Alessandro De Luca, Raffaella Mattone, Sensorless Robot Collision Detection and Hybrid Force/Motion Control, Apr. 2005, IEEE, pp. 999-1004).*

MicrosoftComputerDictionary_FifthEd_p147.pdf (Mircosoft Computer Dictionary, Fifth Edition, p. 147).*

International Search Report issued Sep. 13, 2011 in International (PCT) Application No. PCT/JP2011/003713.

International Preliminary Report on Patentability issued Mar. 14, 2013 in International Application No. PCT/JP2011/003713.

* cited by examiner

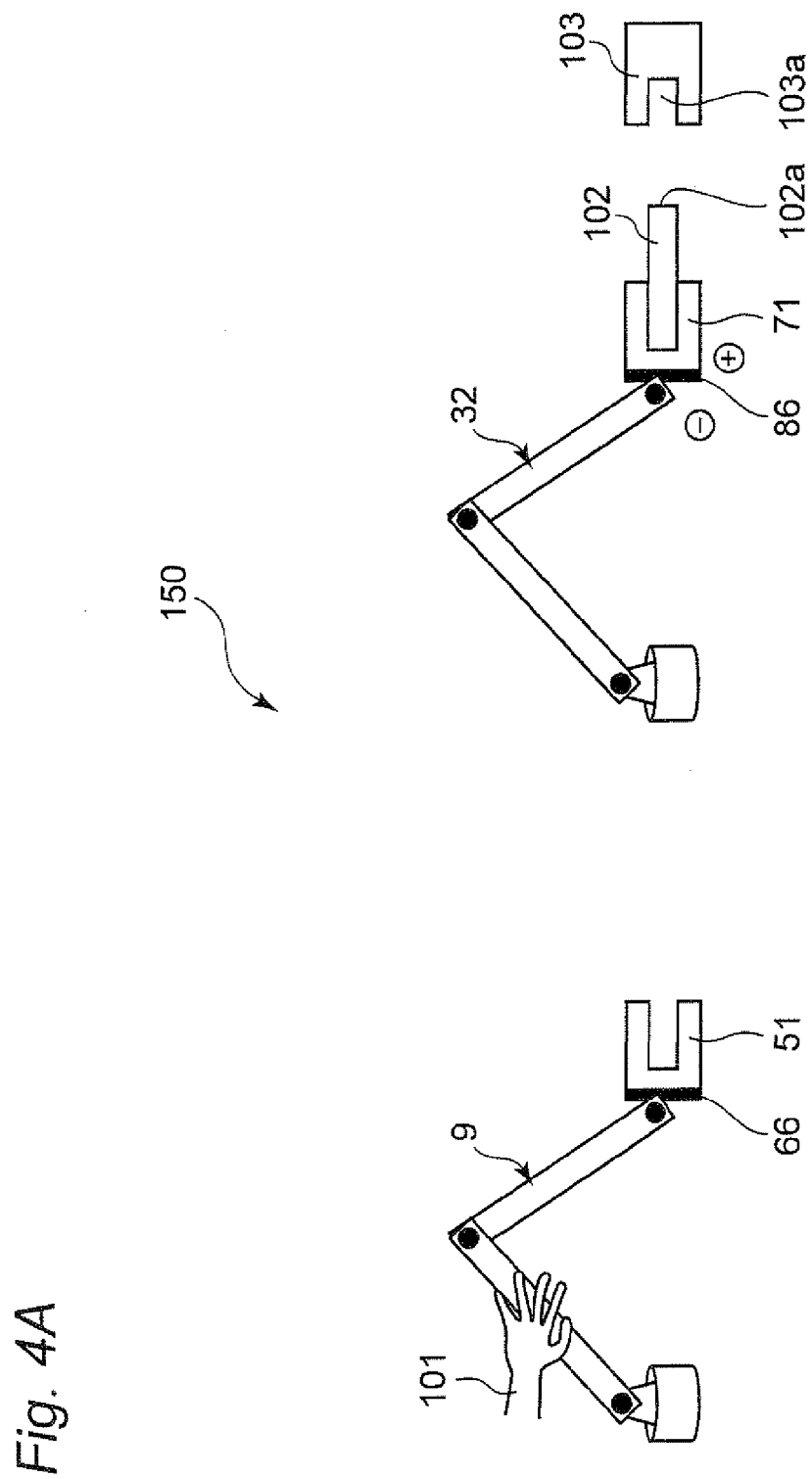

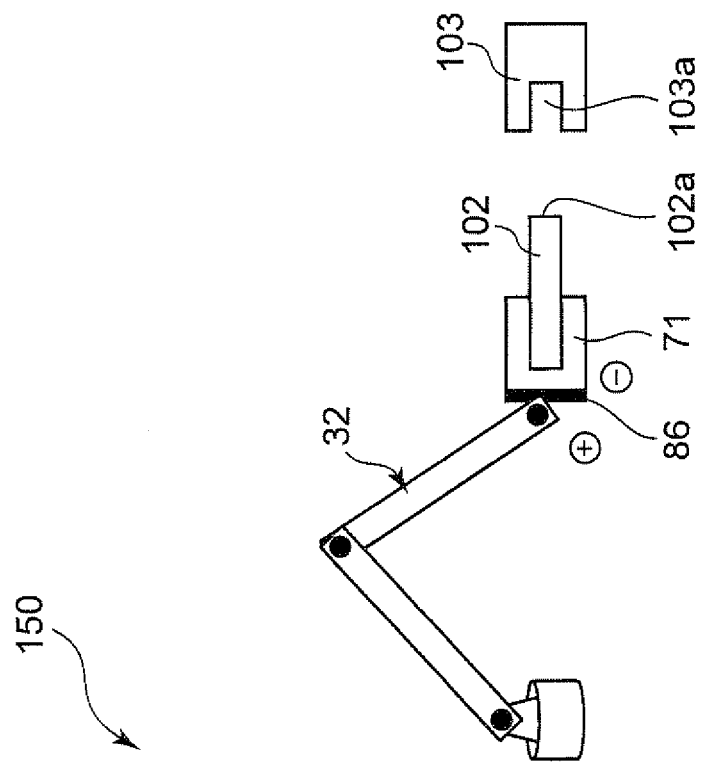
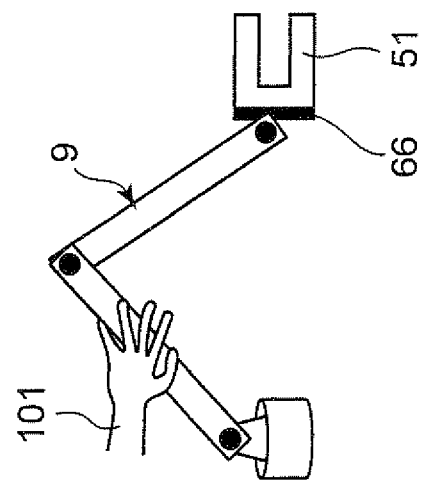
Fig. 4B

Fig. 11

| TASK EXPERIENCE | TASK DIFFICULTY | | |
|---|---|---|---|
| | DIFFICULT | NORMAL | EASY |
| 0 TO 1 YEAR | REFERENCE | FORCE INFORMATION AND SPEED INFORMATION | FORCE INFORMATION AND SPEED INFORMATION |
| 1 TO 3 YEARS | FORCE INFORMATION AND SPEED INFORMATION | FORCE INFORMATION AND SPEED INFORMATION | FORCE INFORMATION |
| THREE OR MORE YEARS | FORCE INFORMATION AND SPEED INFORMATION | FORCE INFORMATION | SPEED INFORMATION |

Fig. 18

| OBJECT | GRIP POSITION | APPLIED REFERENCE |
|---|---|---|
| FLEXIBLE BOARD | 5mm | REFERENCE A |
| | 10mm | REFERENCE B |
| | .. | .. |
| SCREW | 5mm | REFERENCE a |
| | 10mm | REFERENCE b |
| | .. | .. |
| .. | .. | .. |

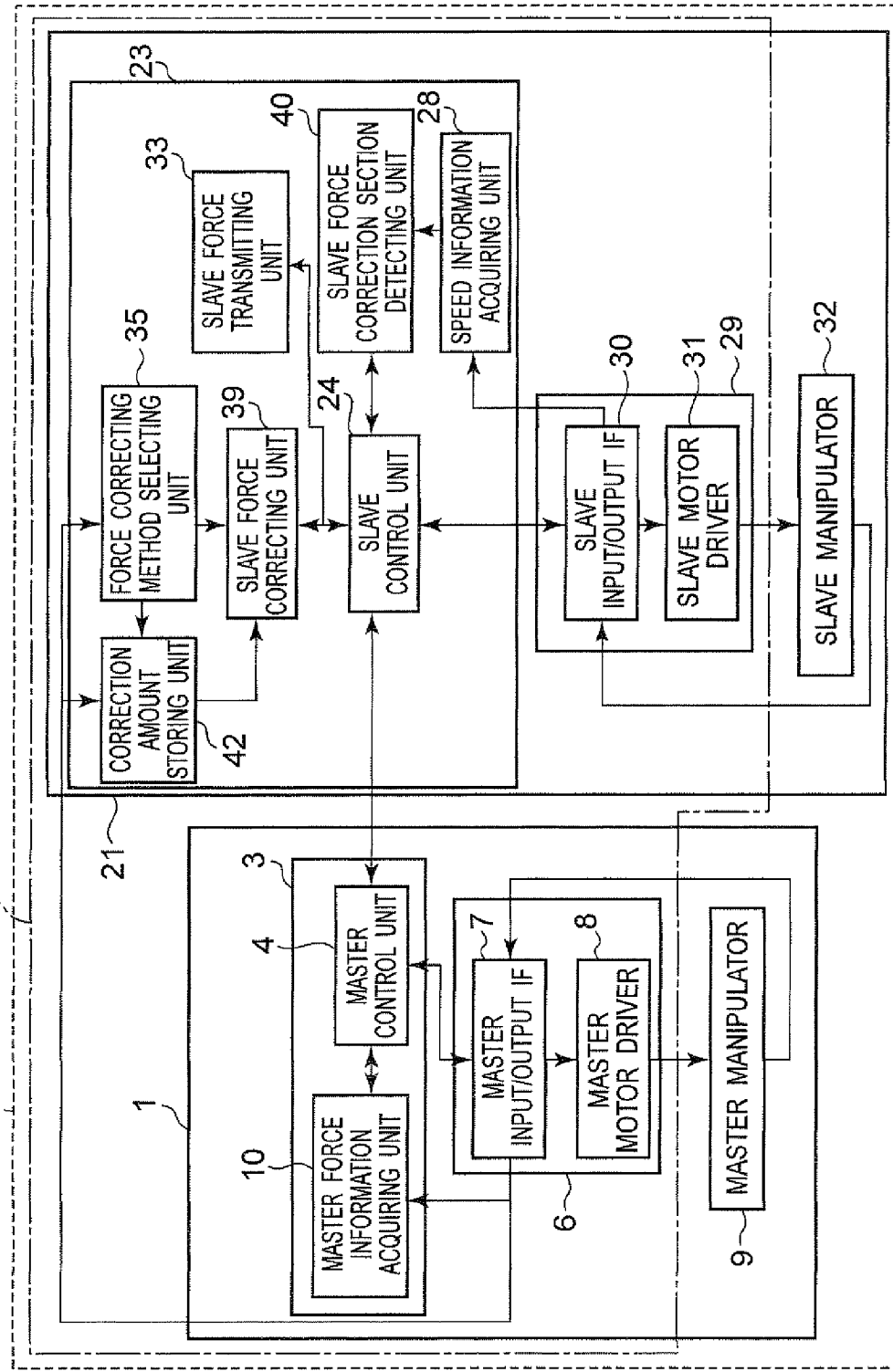

Fig.23

| OBJECT | GRIP POSITION | CORRECTION AMOUNT (INCREASE) | CORRECTION AMOUNT (DECREASE) |
|---|---|---|---|
| FLEXIBLE BOARD A | 5mm | 1.2 TIMES | 0.6 TIMES |
| | 10mm | 1.4 TIMES | 0.8 TIMES |
| | .. | .. | .. |
| FLEXIBLE BOARD B | 5mm | 1.5 TIMES | 0.2 TIMES |
| | 10mm | 2.0 TIMES | 0.5 TIMES |
| | .. | .. | .. |
| SCREW A | .. | .. | .. |
| .. | | | |

Fig.25

| OBJECT | BUCKLING LOAD | CORRECTION AMOUNT (INCREASE) | CORRECTION AMOUNT (DECREASE) |
|---|---|---|---|
| FLEXIBLE BOARD A | 10N | 1.4 TIMES | 0.8 TIMES |
| | 20N | 1.2 TIMES | 0.6 TIMES |
| | : | : | : |
| FLEXIBLE BOARD B | 50N | 2.0 TIMES | 0.5 TIMES |
| | 100N | 1.5 TIMES | 0.2 TIMES |
| | : | : | : |
| SCREW A | 10000N | 1.05 TIMES | 0.98 TIMES |
| | 20000N | 1.02 TIMES | 0.95 TIMES |
| | : | : | : |
| : | : | : | : |

Fig.27

| MASTER GRIP POSITION | CORRECTION AMOUNT (INCREASE) | CORRECTION AMOUNT (DECREASE) |
|---|---|---|
| A | 1.2 TIMES | 0.8 TIMES |
| B | 1.4 TIMES | 0.6 TIMES |
| C | 1.6 TIMES | 0.4 TIMES |

US 8,504,206 B2

CONTROL APPARATUS AND METHOD FOR MASTER-SLAVE ROBOT, MASTER-SLAVE ROBOT, CONTROL PROGRAM, AND INTEGRATED ELECTRONIC CIRCUIT

This is a continuation application of International Application No. PCT/JP2011/003713, filed Jun. 29, 2011.

BACKGROUND OF THE INVENTION

The present invention relates to a control apparatus and method for a master-slave robot to generate and teach an operation of, for example, a robot arm, a master-slave robot having a control apparatus for a master-slave robot, a control program for a control apparatus for a master-slave robot, and an integrated electronic circuit.

In recent years, on a manufacturing premise, due to manufacturing of a wide variety of products in small quantities, model changes are frequently performed. On a recent manufacturing premise on which cell production is popularly performed, in order to automate a screwing task or a fitting task for components, a fixing task therefor, an inserting task for a flexible board, a polishing task, and the like with robots, the robots need to flexibly cope with a wide variety of components or procedures. A task such as an inserting task for a flexible board that handles a flexible material is complex, and still mainly manually performed. It is strongly demanded to automatically perform the task that is mainly manually performed.

Thus, a method of teaching a robot to perform a task with use of a teaching pendant or a programming is used. However, when teaching is performed by such a method, the number of teaching steps disadvantageously considerably increases. In order to solve the problem, direct teaching that teaches a robot by directly touching the robot or a method of performing simple teaching by using a control apparatus for a master-slave robot in which a robot (master) that is manipulated by a person and a robot (slave) that actually works are different from each other is used.

An example of the direct teaching is known in which a force sensor is attached to a wrist of a robot or the like, and a teacher directly grips a handle attached to a top of the force sensor to lead the robot to a teaching point and teaches the robot a point to be positioned at (see Patent Literature 1 [Unexamined Japanese Patent Publication No. 59-157715]).

As an example of a method of performing simple teaching by using a control apparatus for a master-slave robot, a method of performing teaching by using a control apparatus for a master-slave robot in which a force acquired by a slave manipulator is fed back to a master manipulator, and the force added to the slave manipulator by a person can be sensed is used (see Patent Literature 2 [Unexamined Japanese Patent Publication No. 2002-59380], Patent Literature 3 [Unexamined Japanese Patent Publication No. 8-281573], and Patent Literature 4 [Unexamined Japanese Patent Publication No. 1-34686]).

As an example of the method of performing teaching by using the control apparatus for a master-slave robot, a person grips and operates a master manipulator to teach information to the master manipulator. On the basis of the information taught to the master manipulator, a method of teaching the information to a slave manipulator having a size different from that of the master manipulator by increasing or reducing a distance between teaching points is used (see Patent Literature 5 [Unexamined Japanese Patent Publication No. 5-204440]).

SUMMARY OF THE INVENTION

However, in Patent Literature 1, since a force acquired by a robot is physically fed back to a person, the force transmitted to the person cannot be changed in magnitude. For this reason, for example, when a task of inserting a flexible board is to be performed, in the case where the flexible board decreases in rigidity by changing components or procedures, or in the case where a position where a robot grips the flexible board is distant from a distal end of the board, a force acquired by the robot decreases. Thus, a force transmitted to a human becomes small in magnitude, whereby a task time becomes very long.

A result obtained when a person performs an inserting task by using direct teaching about the task of inserting a flexible board while the person senses the force transmitted to the robot is shown below. At this time, when the task is performed while changing a grip position of the flexible board gripped by the robot, change in the task time by the change of the grip positions is verified through an experiment. In FIGS. 29A to 29C, a human hand 101 directly touches a manipulator 105 that grips a flexible board 104 and performs an inserting task to a connector 106. FIG. 29A shows a case in which a grip position is 5 mm distant from an end edge 104a on an insertion side, and FIG. 29B shows a case in which the grip position is 10 mm distant from the end edge 104a on the insertion side. FIG. 29C shows procedures of the inserting task of the flexible board 104 to the connector 106. An experiment result obtained when the grip position is 5 mm distant is shown in FIG. 30, and an experiment result obtained when the grip position is 10 mm is shown in FIG. 31. Solid lines in FIGS. 30 and 31 indicate magnitudes of forces generated when the flexible board 104 collides with the connector 106, and a broken line indicates a speed of a hand of the manipulator 105. Abscissas in FIGS. 30 and 31 indicate experiment times (ms). Each experiment time is a time from an experiment start time that is set at 0 ms to an experiment end time. Left ordinates in FIGS. 30 and 31 indicate magnitudes (N) of forces generated when the flexible board 104 collides with the connector 106, and right ordinates in FIGS. 30 and 31 indicate speeds (mm/ms) of the hand of the manipulator 105. Views drawn below the graphs in FIGS. 30 and 31 show insertion states to the connector 106 of the flexible board 104, and show states of the flexible board 104 with respect to the connector 106 at an experiment time indicated by the abscissa of the graph. Reference symbol A in each of FIGS. 30 and 31 shows a state in which the flexible board 104 collides with an entrance of the connector 106 to start insertion. Reference symbol B shows a state in which the flexible board 104 collides with the back of the connector 106 to complete the insertion. When A in FIG. 30 is compared with that in FIG. 31, it is found that A in FIG. 31 has a time longer than that in FIG. 30. When B in FIG. 30 is compared with that in FIG. 31, it is found that B in FIG. 31 has a force smaller than that in FIG. 30. Thus, it can be confirmed that a time required for insertion when the grip position being 10 mm distant is longer than when the grip position being 5 mm, that a force to be acquired decreases when the grip position being 10 mm distant, and that an inserting task becomes difficult.

In Patent Literatures 2, 3, and 4, by using a control apparatus for a master-slave robot, a force transmitted to a person can be changed in magnitude. However, in the same task, since the force is changed in magnitude by the same manner in any step, the force cannot be clearly weakened or strengthened. For this reason, an operator cannot clearly know whether a force is strong or weak during a task. Even though the force is changed in magnitude, a task time cannot be shortened.

Furthermore, a task such as a task of inserting a flexible board that handles a flexible material also has a problem in which the board or the like is damaged by being applied with an excessive force.

In Patent Literature 5, teaching using a control apparatus for a master-slave robot is performed. However, the teaching uses only position information and does not use force information. In the teaching, an external force applied to the slave manipulator during a task cannot be transmitted to a hand of a person who grips the master manipulator.

The present invention has been made in consideration of the above problems, and has an object thereof to provide a control method and apparatus for a master-slave robot, a master-slave robot, a control program, and an integrated electronic circuit in which, even though components or procedures change, an operator can easily perform a task for a short period of time without damaging an object.

In order to achieve the above object, the present invention has the following configuration.

According to a first aspect of the present invention, there is provided a control apparatus for a master-slave robot having a slave manipulator that grips an object and performs a task while touching an object to be worked and a master manipulator that causes a person to remote-control the slave manipulator, comprising:

a force information acquiring unit that acquires force information externally applied to the slave manipulator;

a force correction section detecting unit that detects a force correction section serving as information of a zone that is required to be corrected in the force information on basis of the force information acquired by the force information acquiring unit;

a force correcting unit that corrects the force information in the zone detected by the force correction section detecting unit;

a force transmitting unit that transmits the force information from the force correcting unit to the master manipulator;

a master control unit that controls manipulation information of the master manipulator when the person manipulates the master manipulator on basis of the force information from the force transmitting unit; and a slave control unit that is connected to the slave manipulator and the master control unit and outputs a control signal transmitting the manipulation information of the master manipulator sent from the master control unit to the slave manipulator.

According to a second aspect of the present invention, there is provided a control apparatus for a master-slave robot having:

a slave manipulator that grips an object and performs a task while touching an object to be worked, and a master manipulator that causes a person to remote-control the slave manipulator, comprising:

a master force information acquiring unit that acquires force information applied to the master manipulator by the person;

a slave force correction section detecting unit that detects a force correction section serving as information of a zone that is required to be corrected in the force information on basis of the force information acquired by the master force information acquiring unit;

a slave force correcting unit that corrects the force information in the zone detected by the slave force correction section detecting unit;

a slave force transmitting unit that transmits the force information from the slave force correcting unit to the slave manipulator;

a master control unit that controls manipulation information of the master manipulator when the person manipulates the master manipulator on basis of the force information from the slave force transmitting unit; and a slave control unit that is connected to the slave manipulator and the master control unit and outputs a control signal transmitting the manipulation information of the master manipulator sent from the master control unit to the slave manipulator.

According to a sixteenth aspect of the present invention, there is provided the control apparatus for a master-slave robot according to the thirteenth aspect, further comprising a master grip position acquiring unit that acquires position information for which the person grips the master manipulator, and a correction amount storing unit that stores relationship information between the position information for which the person grips the master manipulator and a correction amount, wherein the force correcting unit or the slave force correcting unit, when the "master grip position information" is selected in the force correcting method selecting unit, acquires the position information for which the person grips the master manipulator in the master grip position information acquiring unit, and calculates a correction amount of the force information from the correction amount storing unit by using the position information acquired from the master grip position information acquiring unit.

According to a seventeenth aspect of the present invention, there is provided a control method for a control apparatus for a master-slave robot including a slave manipulator that grips an object and performs a task while touching an object to be worked and a master manipulator that causes a person to remote-control the slave manipulator, comprising:

acquiring force information externally applied to the slave manipulator by a force information acquiring unit;

detecting a force correction section serving as information of a zone that is required to be corrected in the force information, on basis of the force information acquired by the force information acquiring unit, by a force correction section detecting unit;

correcting the force information in the zone detected by the force correction section detecting unit, by a force correcting unit;

transmitting the force information from the force correcting unit to the master manipulator by a force transmitting unit;

controlling manipulation information of the master manipulator by a master control unit when the person manipulates the master manipulator on basis of the force information from the force transmitting unit; and outputting a control signal transmitting the manipulation information of the master manipulator sent from the master control unit to the slave manipulator, by a slave control unit connected to the slave manipulator and the master control unit.

According to an eighteenth aspect of the present invention, there is provided a master-slave robot comprising the master manipulator, the slave manipulator, and the control apparatus for a master-slave robot according to any one of the first to sixteenth aspects.

According to a nineteenth aspect of the present invention, there is provided a control program for a control apparatus for a master-slave robot including a slave manipulator that grips an object and performs a task while touching an object to be worked and a master manipulator that causes a person to remote-control the slave manipulator, causing a computer to execute steps of:

acquiring force information externally applied to the slave manipulator by a force information acquiring unit;

detecting a force correction section serving as information of a zone that is required to be corrected in the force information, on basis of the force information acquired by the force information acquiring unit, by a force correction section detecting unit;

correcting the force information in the zone detected by the force correction section detecting unit, by a force correcting unit;

transmitting the force information from the force correcting unit to the master manipulator by a force transmitting unit;

controlling manipulation information of the master manipulator by a master control unit when the person manipulates the master manipulator on basis of the force information from the force transmitting unit; and outputting a control signal transmitting the manipulation information of the master manipulator sent from the master control unit to the slave manipulator, by a slave control unit connected to the slave manipulator and the master control unit.

According to a twentieth aspect of the present invention, there is provided an integrated electronic circuit for a control apparatus for a master-slave robot including a slave manipulator that grips an object and performs a task while touching an object to be worked and a master manipulator that causes a person to remote-control the slave manipulator, comprising:

acquiring force information externally applied to the slave manipulator by a force information acquiring unit;

detecting a force correction section serving as information of a zone that is required to be corrected in the force information, on basis of the force information acquired by the force information acquiring unit, by a force correction section detecting unit;

correcting the force information in the zone detected by the force correction section detecting unit, by a force correcting unit;

transmitting the force information from the force correcting unit to the master manipulator by a force transmitting unit;

controlling manipulation information of the master manipulator by a master control unit when the person manipulates the master manipulator on basis of the force information from the force transmitting unit; and outputting a control signal transmitting the manipulation information of the master manipulator sent from the master control unit to the slave manipulator, by a slave control unit connected to the slave manipulator and the master control unit.

According to a control apparatus and method for a master-slave robot, a master-slave robot, a program for robot control, and an integrated electronic circuit of the present invention, only force information in an important step of pieces of force information externally applied to a slave manipulator in a task is increased and can be transmitted to a master manipulator. As a result, the strength or weakness of the force during the task is clearly transmitted to the operator. Even though components or procedures change, the task can be easily performed for a short period of time. Also when the operator applies an excessive force to the master manipulator, the force information transmitted to the slave manipulator is reduced to make it possible to prevent an object from being damaged.

BRIEF DESCRIPTION OF THE DRAWINGS

These and other aspects and features of the present invention will become clear from the following description taken in conjunction with the preferred embodiments thereof with reference to the accompanying drawings, in which:

FIG. 4A is an explanatory view of a state in which a person performs a task by using a control apparatus for a master-slave robot in the first embodiment of the present invention;

FIG. 4B is an explanatory view when the positive and negative signs of a force sensor are reversed in FIG. 4A in the state in which a person performs a task by using the control apparatus for the master-slave robot in the first embodiment of the present invention;

FIG. 11 is a view showing a database having a detecting method in the third embodiment of the present invention;

FIG. 18 is a view showing a database having a reference in the third embodiment (when the "reference" is detected) of the present invention;

FIG. 20B is a block diagram of a master-slave robot in the fourth embodiment of the present invention;

FIG. 23 is a view showing a database having a correction amount in the fourth embodiment (when the "object grip position information" is selected) of the present invention;

FIG. 25 is a view showing a database having a correction amount in the fourth embodiment (when the "object flexibility information" is selected) of the present invention;

FIG. 27 is a view showing a database having a correction amount in the fourth embodiment (when the "master grip position information" is selected) of the present invention;

DETAILED DESCRIPTION

Figure 1:
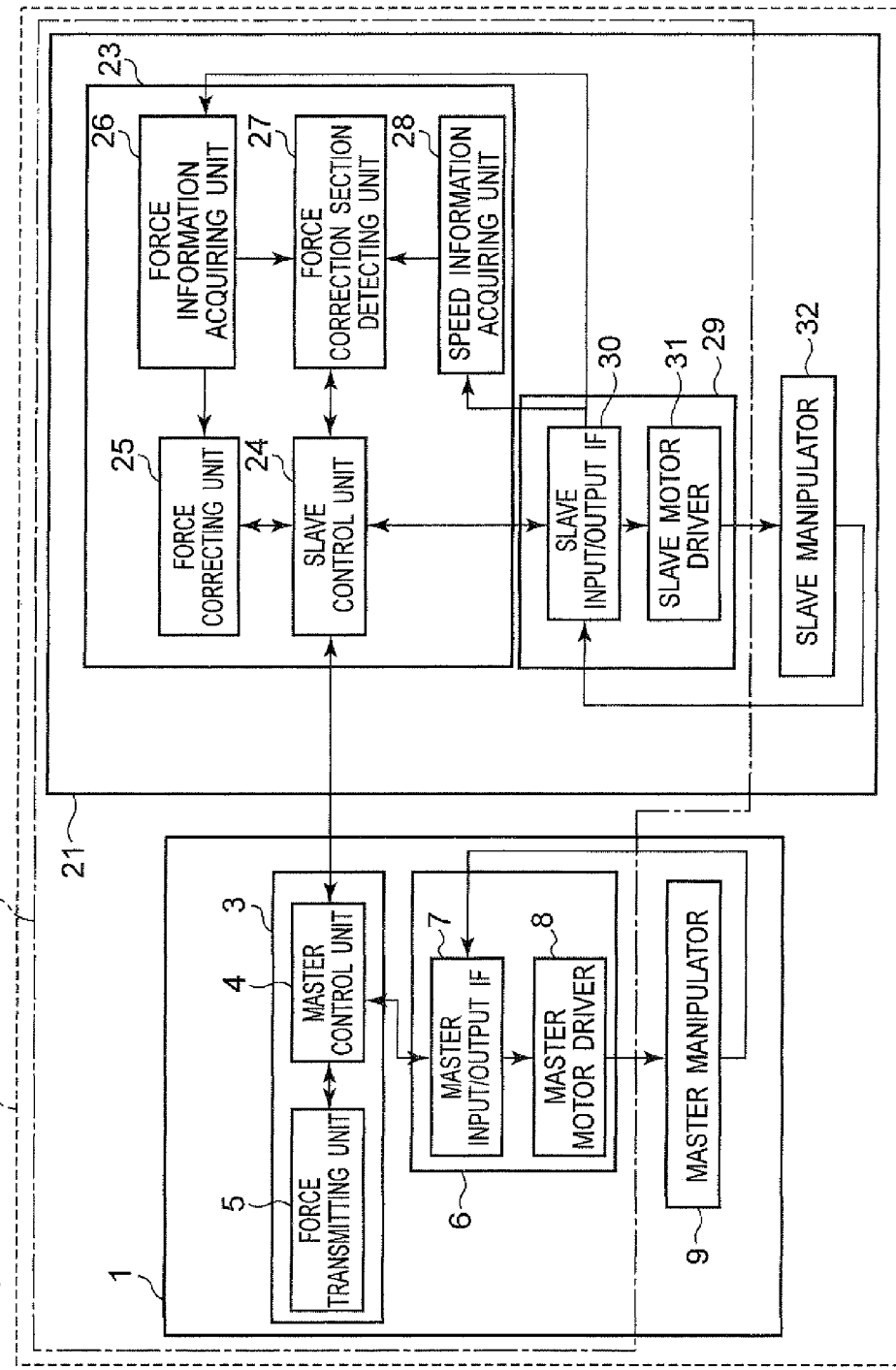
FIG. 1 is a block diagram of a master-slave robot in a first embodiment of the present invention.

Embodiments of the present invention will be described below in detail with reference to the accompanying drawings.

Various modes of the present invention will be described below before the embodiments of the present invention will be described in detail with reference to the accompanying drawings.

According to a first aspect of the present invention, there is provided a control apparatus for a master-slave robot having a slave manipulator that grips an object and performs a task while touching an object to be worked and a master manipulator that causes a person to remote-control the slave manipulator, comprising:

a force information acquiring unit that acquires force information externally applied to the slave manipulator;

a force correction section detecting unit that detects a force correction section serving as information of a zone that is required to be corrected in the force information on basis of the force information acquired by the force information acquiring unit;

a force correcting unit that corrects the force information in the zone detected by the force correction section detecting unit;

a force transmitting unit that transmits the force information from the force correcting unit to the master manipulator;

a master control unit that controls manipulation information of the master manipulator when the person manipulates the master manipulator on basis of the force information from the force transmitting unit; and a slave control unit that is connected to the slave manipulator and the master control unit and outputs a control signal transmitting the manipulation information of the master manipulator sent from the master control unit to the slave manipulator, the control apparatus further comprising a speed information acquiring unit that acquires speed information of a hand of the slave manipulator, wherein the force correction section detecting unit detects a zone in which the force information is corrected, from the speed information acquired by the speed information acquiring unit.

According to a second aspect of the present invention, there is provided a control apparatus for a master-slave robot having:

a slave manipulator that grips an object and performs a task while touching an object to be worked, and a master manipulator that causes a person to remote-control the slave manipulator, comprising:

a master force information acquiring unit that acquires force information applied to the master manipulator by the person;

a slave force correction section detecting unit that detects a force correction section serving as information of a zone that is required to be corrected in the force information on basis of the force information acquired by the master force information acquiring unit;

a slave force correcting unit that corrects the force information in the zone detected by the slave force correction section detecting unit;

a slave force transmitting unit that transmits the force information from the slave force correcting unit to the slave manipulator;

a master control unit that controls manipulation information of the master manipulator when the person manipulates the master manipulator on basis of the force information from the slave force transmitting unit; and a slave control unit that is connected to the slave manipulator and the master control unit and outputs a control signal transmitting the manipulation information of the master manipulator sent from the master control unit to the slave manipulator.

According to a third aspect of the present invention, there is provided the control apparatus for a master-slave robot according to the first or second aspect, wherein a zone from a force correction start time to a force correction end time is defined as the force correction section, and the force information in the zone is represented by a curve or a straight line changing in a form of a chevron in a relationship between time and force.

According to a fourth aspect of the present invention, there is provided the control apparatus for a master-slave robot according to the first aspect, wherein the force correction section detecting unit detects the force correction position serving as any one of force information in a zone in which an absolute value of the force information is corrected so as to be increased and force information in a zone in which the force information is not corrected, from the force information acquired by the force information acquiring unit, and the force correcting unit corrects the force information so as to increase the absolute value of the force information detected by the force correction section detecting unit in the zone in which the absolute value is increased.

According to a fifth aspect of the present invention, there is provided the control apparatus for a master-slave robot according to the second aspect, wherein the slave force correction section detecting unit detects the force correction position serving as any one of force information in a zone in which an absolute value of the force information is corrected so as to be reduced and force information in a zone in which the force information is not corrected, from the force information acquired by the master force information acquiring unit, and the slave force correcting unit corrects the force information so as to reduce the absolute value of the force information in the zone in which the absolute value is reduced, detected by the slave force correction section detecting unit.

According to a sixth aspect of the present invention, there is provided the control apparatus for a master-slave robot according to the first aspect, further comprising a speed information acquiring unit that acquires speed information of a hand of the slave manipulator, wherein the force correction section detecting unit detects a zone in which the force information is corrected, from the speed information acquired by the speed information acquiring unit.

According to a seventh aspect of the present invention, there is provided the control apparatus for a master-slave robot according to the second aspect, further comprising a speed information acquiring unit that acquires speed information of a hand of the slave manipulator, wherein the slave force correction section detecting unit detects a zone in which the force information is corrected, from the speed information acquired by the speed information acquiring unit.

According to an eighth aspect of the present invention, there is provided the control apparatus for a master-slave robot according to the sixth or seventh aspect, further comprising a detecting method selecting unit that selects any one of the "force information and speed information", the "force information", the "speed information", and "stored force information and speed information" when the force correction section is detected in the force correction section detecting unit or the slave force correction section detecting unit, wherein on basis of the information selected by the detecting method selecting unit, the force correction section is detected by the force correction section detecting unit or the slave force correction section detecting unit.

According to a ninth aspect of the present invention, there is provided the control apparatus for a master-slave robot according to the eighth aspect, wherein the force correction section detecting unit or the slave force correction section detecting unit, when the "force information and speed information" is selected in the detecting method selecting unit, sets a time at which a displacement of the speed information acquired by the speed information acquiring unit exceeds a first threshold value, as force correction start time, sets a time at which a displacement of the force information acquired by the force information acquiring unit is lower than a second threshold value, as force correction end time, and detects a zone from the force correction start time to the force correction end time as the force correction section.

According to a tenth aspect of the present invention, there is provided the control apparatus for a master-slave robot according to the eighth aspect, wherein the force correction section detecting unit or the slave force correction section detecting unit, when the "force information" is selected in the detecting method selecting unit, sets a time at which a displacement of the force information acquired by the force information acquiring unit exceeds a first threshold value, as force correction start time, sets a time at which the displacement of the force information acquired by the force information acquiring unit is lower than a second threshold value, as force correction end time, and detects a zone from the force correction start time to the force correction end time as the force correction section.

According to an eleventh aspect of the present invention, there is provided the control apparatus for a master-slave robot according to the eighth aspect, wherein the force correction section detecting unit or the slave force correction section detecting unit, when the "speed information" is selected in the detecting method selecting unit, sets a time at which a displacement of the speed information acquired by the speed information acquiring unit exceeds a first threshold value, as force correction start time, sets a time at which a displacement of the speed information acquired by the speed information acquiring unit is lower than a second threshold value, as force correction end time, and detects a zone from the force correction start time to the force correction end time as the force correction section.

According to a twelfth aspect of the present invention, there is provided the control apparatus for a master-slave robot according to the eighth aspect, further comprising a storing unit that stores force information and speed information in advance, wherein the force correction section detecting unit or the slave force correction section detecting unit, when the "stored force information and speed information" is selected in the detecting method selecting unit, sets, as force correction start time, a time at which a displacement of the force information or the speed information acquired by the force information acquiring unit or the speed information acquiring unit falls within a range of a certain threshold value with reference to a displacement of the force information or the speed information obtained when a displacement of the force information or the speed information stored in the storing unit exceeds the first threshold value, sets, as force correction end time, a time at which the displacement of the force information or the speed information acquired by the force information acquiring unit or the speed information acquiring unit falls within a range of a certain threshold value with reference to the displacement of the force information or the speed information obtained when the displacement of the force information or the speed information stored in the storing unit is lower than the second threshold value, and detects a zone from the force correction start time to the force correction end time as the force correction section.

According to a thirteenth aspect of the present invention, there is provided the control apparatus for a master-slave robot according to the first or second aspect, further comprising a force correcting method selecting unit that selects any one of "object grip position information", "object flexibility information", and "master grip position information" when a force is corrected in the force correcting unit or the slave force correcting unit, wherein the force correcting unit or the slave force correcting unit corrects the force information by the force correcting method selected by the force correcting method selecting unit.

According to an aspect of the present invention, there is provided the control apparatus for a master-slave robot according to the sixth or seventh aspect, the control apparatus further comprising a force correcting method selecting unit that selects any one of "object grip position information", "object flexibility information", and "master grip position information" when a force is corrected in the force correcting unit or the slave force correcting unit, wherein the force correcting unit or the slave force correcting unit corrects the force information by the force correcting method selected by the force correcting method selecting unit.

According to a fourteenth aspect of the present invention, there is provided the control apparatus for a master-slave robot according to the thirteenth aspect, further comprising an object grip position acquiring unit that acquires position information for which the slave manipulator grips the object and a correction amount storing unit that stores relationship information between the position information for which the slave manipulator grips the object and a correction amount, wherein the force correcting unit or the slave force correcting unit, when the "object grip position information" is selected in the force correcting method selecting unit, causes the object grip position acquiring unit to acquire grip position information for which the slave manipulator grips the object and determines a correction amount of the force information from the correction amount storing unit by using the grip position information acquired by the object grip position acquiring unit.

According to a fifteenth aspect of the present invention, there is provided the control apparatus for a master-slave robot according to the thirteenth aspect, further comprising a correction amount storing unit that stores relationship information between flexibility information of the object and a correction amount, wherein the force correcting unit or the slave force correcting unit, when the "object flexibility information" is selected in the force correcting method selecting unit, acquires flexibility information of the object based on the object from the correction amount storing unit and calculates a correction amount of the force information from the correction amount storing unit by using the flexibility information.

According to a sixteenth aspect of the present invention, there is provided the control apparatus for a master-slave robot according to the thirteenth aspect, further comprising a master grip position acquiring unit that acquires position information for which the person grips the master manipulator, and a correction amount storing unit that stores relationship information between the position information for which the person grips the master manipulator and a correction amount, wherein the force correcting unit or the slave force correcting unit, when the "master grip position information" is selected in the force correcting method selecting unit, acquires the position information for which the person grips the master manipulator in the master grip position information acquiring unit, and calculates a correction amount of the force information from the correction amount storing unit by using the position information acquired from the master grip position information acquiring unit.

According to a seventeenth aspect of the present invention, there is provided a control method for a control apparatus for a master-slave robot including a slave manipulator that grips an object and performs a task while touching an object to be worked and a master manipulator that causes a person to remote-control the slave manipulator, comprising:

acquiring force information externally applied to the slave manipulator by a force information acquiring unit;

detecting a force correction section serving as information of a zone that is required to be corrected in the force information, on basis of the force information acquired by the force information acquiring unit, by a force correction section detecting unit;

correcting the force information in the zone detected by the force correction section detecting unit, by a force correcting unit;

transmitting the force information from the force correcting unit to the master manipulator by a force transmitting unit;

controlling manipulation information of the master manipulator by a master control unit when the person manipulates the master manipulator on basis of the force information from the force transmitting unit; and outputting a control signal transmitting the manipulation information of the master manipulator sent from the master control unit to the slave manipulator, by a slave control unit connected to the slave manipulator and the master control unit.

According to an aspect of the present invention, there is provided a control method for a control apparatus for a master-slave robot including a slave manipulator that grips an object and performs a task while touching an object to be worked, and a master manipulator that causes a person to remote-control the slave manipulator, comprising:

acquiring force information applied to the master manipulator by the person by a master force information acquiring unit;

detecting a force correction section serving as information of a zone that is required to be corrected in the force information, on basis of the force information acquired by the master force information acquiring unit, by a slave force correction section detecting unit;

correcting the force information in the zone detected by the slave force correction section detecting unit, by a slave force correcting unit;

transmitting the force information from the slave force correcting unit to the slave manipulator by a slave force transmitting unit;

controlling manipulation information of the master manipulator by a master control unit when the person manipulates the master manipulator on basis of the force information from the slave force transmitting unit;

outputting a control signal transmitting the manipulation information of the master manipulator sent from the master control unit to the slave manipulator, by a slave control unit connected to the slave manipulator and the master control unit; and acquiring speed information of a hand of the slave manipulator by a speed information acquiring unit, wherein the slave force correction section detecting unit detects a zone in which the force information is corrected, from the speed information acquired by the speed information acquiring unit.

According to an eighteenth aspect of the present invention, there is provided a master-slave robot comprising the master manipulator, the slave manipulator, and the control apparatus for a master-slave robot according to any one of the first to sixteenth aspects.

According to a nineteenth aspect of the present invention, there is provided a control program for a control apparatus for a master-slave robot including a slave manipulator that grips an object and performs a task while touching an object to be worked and a master manipulator that causes a person to remote-control the slave manipulator, causing a computer to execute steps of:

acquiring force information externally applied to the slave manipulator by a force information acquiring unit;

detecting a force correction section serving as information of a zone that is required to be corrected in the force information, on basis of the force information acquired by the force information acquiring unit, by a force correction section detecting unit;

correcting the force information in the zone detected by the force correction section detecting unit, by a force correcting unit;

transmitting the force information from the force correcting unit to the master manipulator by a force transmitting unit;

controlling manipulation information of the master manipulator by a master control unit when the person manipulates the master manipulator on basis of the force information from the force transmitting unit; and outputting a control signal transmitting the manipulation information of the master manipulator sent from the master control unit to the slave manipulator, by a slave control unit connected to the slave manipulator and the master control unit.

According to a twentieth aspect of the present invention, there is provided the control program for a control apparatus according to the nineteenth aspect, further comprising acquiring speed information of a hand of the slave manipulator by a speed information acquiring unit, wherein the force correction section detecting unit detects a zone in which the force information is corrected, from the speed information acquired by the speed information acquiring unit.

According to an aspect of the present invention, there is provided a control program for a control apparatus for a master-slave robot including a slave manipulator that grips an object and performs a task while touching an object to be worked, and a master manipulator that causes a person to remote-control the slave manipulator, comprising:

causing a computer to execute steps of:

acquiring force information applied to the master manipulator by the person by a master force information acquiring unit;

detecting a force correction section serving as information of a zone that is required to be corrected in the force information, on basis of the force information acquired by the master force information acquiring unit, by a slave force correction section detecting unit;

correcting the force information in the zone detected by the slave force correction section detecting unit, by a slave force correcting unit;

transmitting the force information from the slave force correcting unit to the slave manipulator by a slave force transmitting unit;

controlling manipulation information of the master manipulator by a master control unit when the person manipulates the master manipulator on basis of the force information from the slave force transmitting unit;

outputting a control signal transmitting the manipulation information of the master manipulator sent from the master control unit to the slave manipulator, by a slave control unit connected to the slave manipulator and the master control unit; and acquiring speed information of a hand of the slave manipulator by a speed information acquiring unit, wherein the slave force correction section detecting unit detects a zone in which the force information is corrected, from the speed information acquired by the speed information acquiring unit.

According to an aspect of the present invention, there is provided a master-slave robot comprising the master manipulator, the slave manipulator, and the control apparatus for a master-slave robot according to the above aspect.

According to an aspect of the present invention, there is provided an integrated electronic circuit for a control apparatus for a master-slave robot including a slave manipulator that grips an object and performs a task while touching an object to be worked and a master manipulator that causes a person to remote-control the slave manipulator, comprising:

acquiring force information externally applied to the slave manipulator by a force information acquiring unit;

detecting a force correction section serving as information of a zone that is required to be corrected in the force information, on basis of the force information acquired by the force information acquiring unit, by a force correction section detecting unit;

correcting the force information in the zone detected by the force correction section detecting unit, by a force correcting unit;

transmitting the force information from the force correcting unit to the master manipulator by a force transmitting unit;

controlling manipulation information of the master manipulator by a master control unit when the person manipulates the master manipulator on basis of the force information from the force transmitting unit;

outputting a control signal transmitting the manipulation information of the master manipulator sent from the master control unit to the slave manipulator, by a slave control unit connected to the slave manipulator and the master control unit; and acquiring speed information of a hand of the slave manipulator by a speed information acquiring unit, wherein the force correction section detecting unit detects a zone in which the force information is corrected, from the speed information acquired by the speed information acquiring unit.

According to an aspect of the present invention, there is provided an integrated electronic circuit for a control apparatus for a master-slave robot including a slave manipulator that grips an object and performs a task while touching an object to be worked, and a master manipulator that causes a person to remote-control the slave manipulator, comprising:

acquiring force information applied to the master manipulator by the person by a master force information acquiring unit;

detecting a force correction section serving as information of a zone that is required to be corrected in the force information, on basis of the force information acquired by the master force information acquiring unit, by a slave force correction section detecting unit;

correcting the force information in the zone detected by the slave force correction section detecting unit, by a slave force correcting unit;

transmitting the force information from the slave force correcting unit to the slave manipulator by a slave force transmitting unit;

controlling manipulation information of the master manipulator by a master control unit when the person manipulates the master manipulator on basis of the force information from the slave force transmitting unit;

outputting a control signal transmitting the manipulation information of the master manipulator sent from the master control unit to the slave manipulator, by a slave control unit connected to the slave manipulator and the master control unit; and acquiring speed information of a hand of the slave manipulator by a speed information acquiring unit, wherein the slave force correction section detecting unit detects a zone in which the force information is corrected, from the speed information acquired by the speed information acquiring unit.

According to a twentieth aspect of the present invention, there is provided an integrated electronic circuit for a control apparatus for a master-slave robot including a slave manipulator that grips an object and performs a task while touching an object to be worked and a master manipulator that causes a person to remote-control the slave manipulator, comprising:

acquiring force information externally applied to the slave manipulator by a force information acquiring unit;

detecting a force correction section serving as information of a zone that is required to be corrected in the force information, on basis of the force information acquired by the force information acquiring unit, by a force correction section detecting unit;

correcting the force information in the zone detected by the force correction section detecting unit, by a force correcting unit;

transmitting the force information from the force correcting unit to the master manipulator by a force transmitting unit;

controlling manipulation information of the master manipulator by a master control unit when the person manipulates the master manipulator on basis of the force information from the force transmitting unit; and outputting a control signal transmitting the manipulation information of the master manipulator sent from the master control unit to the slave manipulator, by a slave control unit connected to the slave manipulator and the master control unit.

Embodiments of the present invention will be described below with reference to the accompanying drawings.

(First Embodiment)

FIG. 1 is a block diagram showing a control apparatus 100 of a master-slave robot 150 in the first embodiment of the present invention. In FIG. 1, the control apparatus 100 of the master-slave robot includes a master robot system 1 to be manipulated by a person directly touching the master-slave robot system and a slave robot system 21 that actually performs a task.

The master robot system 1 includes a master control device 3, a master peripheral device 6 connected to the master control device 3, and a master manipulator 9 connected to the master peripheral device 6.

The master control device 3 includes a master control unit 4 connected to a master input/output IF 7 and a force transmitting unit 5 that is connected to the master control unit 4 to transmit force information to the person.

The master peripheral device 6 includes the master input/output IF 7 connected to the master control unit 4 and connected to the master manipulator 9, and a master motor driver 8 connected to the master input/output IF 7 and connected to the master manipulator 9.

On the other hand, the slave robot system 21 includes a slave control device 23, a slave peripheral device 29 connected to the slave control device 23, and a slave manipulator 32 connected to the slave peripheral device 29.

The slave control device 23 includes a slave control unit 24, a force information acquiring unit 26 that acquires force information externally applied to the slave manipulator 32 at predetermined time intervals, a speed information acquiring unit 28 that acquires speed information of a hand (slave hand 71) of the slave manipulator 32, a force correction position detecting unit 27 that detects a section (zone) in which force information is corrected on the basis of at least one of the force information acquired by the force information acquiring unit 26 and the speed information acquired by the speed information acquiring unit 28 (more specifically, a force correction section serving as information of a zone that is required to be corrected in the force information is detected on the basis of the force information acquired by the force information acquiring unit 26), and a force correcting unit 25 that corrects the force information detected as a force correction section (force correction zone) by the force correction section detecting unit 27. The slave control unit 24 is connected to the master control unit 4 with a cable or a wireless system and connected to the force correcting unit 25, the force correction section detecting unit 27, and a slave input/output IF 30. The force correcting unit 25 is connected to the slave control unit 24 and the force information acquiring unit 26. The force information acquiring unit 26 is connected to the force correcting unit 25 and the force correction section detecting unit 27. The force correction section detecting unit 27 is connected to the force information acquiring unit 26, the slave control unit 24, and the speed information acquiring unit 28. The speed information acquiring unit 28 is connected to the force correction section detecting unit 27.

The slave peripheral device 29 includes the slave input/output IF 30 connected to the slave control unit 24, the speed information acquiring unit 28, and the slave manipulator 32 and a slave motor driver 31 connected to the slave input/output IF 30 and connected to the slave manipulator 32.

Here, the force information acquiring unit 26 acquires, as force information, a value of a slave force sensor 86 through the slave peripheral device 29 or the like from the slave force sensor 86 attached to a slave hand 71 of the slave manipulator 32, and the speed information acquiring unit 28 acquires position information of the slave manipulator 32 through the slave peripheral device 29 or the like from a slave encoder 85 attached to the slave manipulator 32 and acquires, as speed information, a value derived by differentiating the position information with the speed information acquiring unit 28.

Figure 2:
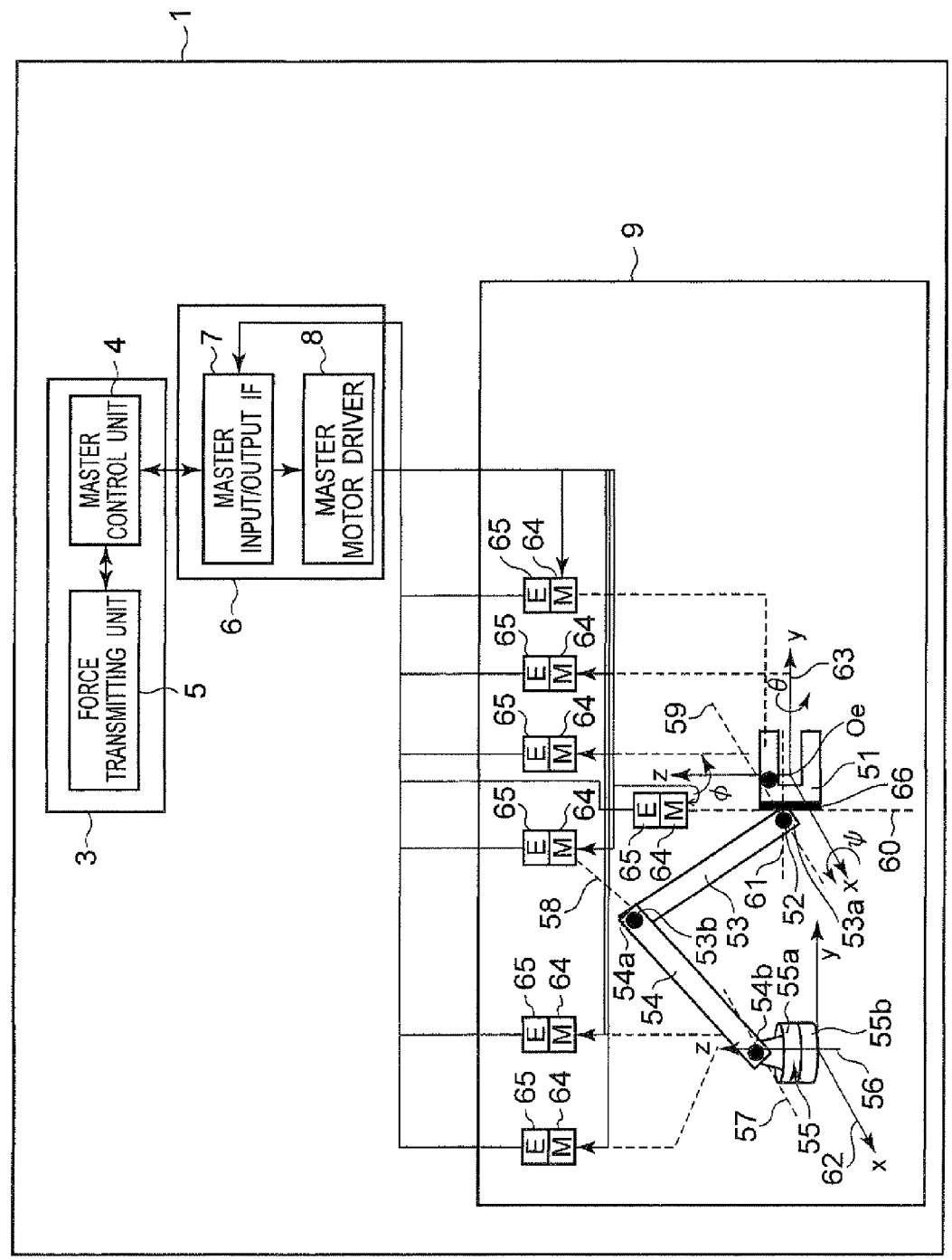
FIG. 2 is an explanatory view of a master robot system in the first embodiment of the present invention.
Figure 3:
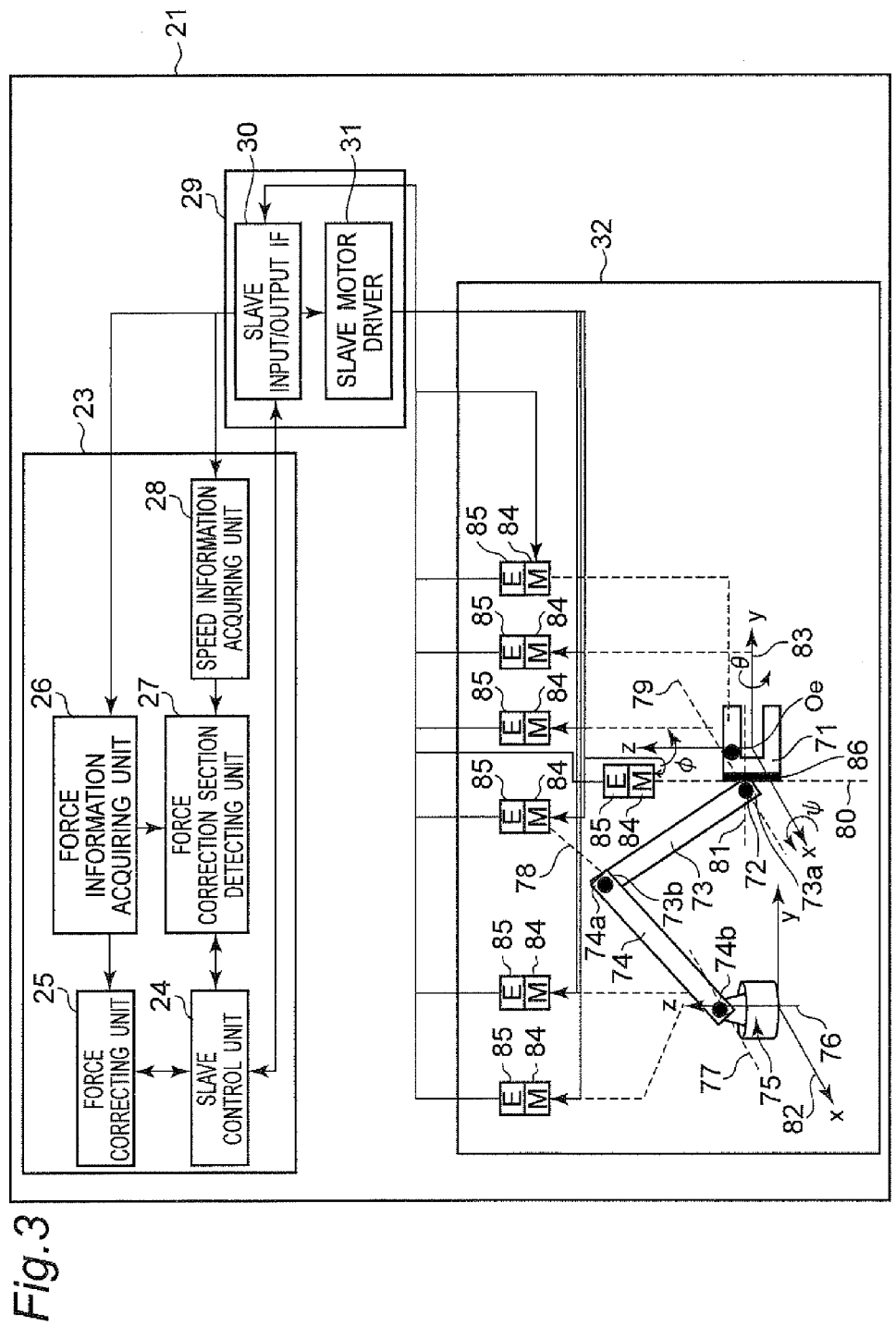
FIG. 3 is an explanatory view of a slave robot system in the first embodiment of the present invention.

FIGS. 2 and 3 are views showing the master manipulator 9 and the slave manipulator 32. Each of the manipulators 9 and 32 configures a 6-degree-of-freedom multi-link manipulator such that the manipulator can be rotated around a total of 6 axes (for details, see WO 2009/107358).

As shown in FIG. 2, the master manipulator 9 is a multi-joint robot arm, for example. More specifically, the master manipulator 9 is a 6-degree-of-freedom multi-link master manipulator and includes a master hand 51, a master forearm link 53 having a master wrist portion 52 to which the master hand 51 is attached at a distal end 53a, a master upper arm link 54 having a distal end 54a rotatably connected to a proximal end 53b of the master forearm link 53, and a master pedestal 55 that rotatably couples to and supports the proximal end 54b of the master upper arm link 54. Although the master pedestal 55 is fixed to a predetermined position, the master pedestal 55 may be movably connected to a rail (not shown). The master wrist unit 52 has three rotating axes of a master fourth joint portion 59, a master fifth joint portion 60, and a master sixth joint portion 61 to make it possible to change a relative orientation (direction) of the master hand 51 with respect to the master forearm link 53. More specifically, in FIG. 2, the master fourth joint portion 59 can change a relative orientation of the master hand 51 around a lateral axis with respect to the master wrist unit 52. The master fifth joint portion 60 can change a relative orientation of the master hand 51 with respect to the master wrist unit 52 around a vertical axis orthogonal to the lateral axis of the master fourth joint portion 59. The master sixth joint portion 61 can change a relative orientation of the master hand 51 with respect to the master wrist unit 52 around a lateral axis orthogonal to the lateral axis of the master fourth joint portion 59 and the vertical axis of the master fifth joint portion 60. Another end 53b of the master forearm link 53 can be rotated around a master third joint portion 58 with respect to the distal end 54a of the master upper arm link 54, i.e., around a lateral axis parallel to the lateral axis of the master fourth joint portion 59. The other end of the master upper arm link 54 can be rotated around a master second joint portion 57 with respect to the master pedestal 55, i.e., around a lateral axis parallel to the lateral axis of the master fourth joint portion 59. Furthermore, an upper movable portion 55a of the master pedestal 55 can be rotated around a master first joint portion 56 with respect to a lower fixed portion 55b of the master pedestal 55, i.e., around a vertical axis parallel to the vertical axis of the master fifth joint portion 60.

As a result, the master manipulator 9 can be rotated around a total of 6 axes to configure the 6-degree-of-freedom multi-link manipulator.

Each joint portion configuring a rotating portion of each axis includes a rotational drive device such as a master motor 64 for driving a joint portion, and a master encoder 65 (actually, arranged inside each joint portion of the master manipulator 9) that detects a rotational phase angle (i.e., a joint angle) of a rotating shaft of the master motor 64 to output position information. The master motor 64 (actually, arranged inside each of the joint portions of the master manipulator 9) is driven and controlled by a master motor driver 8 arranged in one member of one pair of members (for example, a rotating-side member and a support-side member that supports the rotating-side member) configuring each of the joint portions. The rotating shaft of the master motor 64 arranged in one of the members of each of the joint portions is coupled to the other member of the joint portion, and the rotating shaft is rotated in forward and backward directions to make it possible to rotate the other member around the axes with respect to one member.

As an example of a master hand drive device driven and controlled by the master motor driver 8, the master motor 64 for driving the master hand, and the master encoder 65 that detects a rotational phase angle of the rotating shaft of the master motor 64 for driving the master hand are further included in the master hand 51. Rotational angle information detected by the master encoder 65 is taken in the master control unit 4 through the master input/output IF 7 (for example, a counter board). On the basis of the rotational angle information taken in the master control unit 4, the master control unit 4 calculates a control command value (control signal) in an opening/closing operation of the master hand 51.

The control command value calculated by the master control unit 4 is given through the master input/output IF 7 (for example, a D/A board) to the master motor driver 8 that also performs opening/closing drive of the master hand 51. According to each control command value sent from the master motor driver 8, rotation of the master motor 64 is driven and controlled, and the rotating shaft of the master motor 64 for driving a master hand is rotated in forward and backward directions to open/close the master hand 51, thereby performing a simulated operation for gripping and releasing an object 102 (for example, a flexible board). Actually, the slave hand 71 of the slave manipulator 32 performs gripping and releasing operations of the object 102 (for example, a flexible board), and the master hand 51 directly does not perform the gripping and releasing operations of the object 102 (for example, a flexible board). Thus, the above means that the master hand 51 virtually or simulationally performs the gripping and releasing operations of the object 102 (for example, a flexible board).

Reference numeral 62 denotes a master absolute coordinate system having a relative positional relationship fixed with respect to the lower fixed portion 55b of the master pedestal 55, and reference numeral 63 denotes a master hand coordinate system having a relative positional relationship fixed with respect to the master hand 51. A master original position $O_e$ (x,y,z) of the master hand coordinate system 63 obtained when viewed from the master absolute coordinate system 62 is defined as a hand position of the master manipulator 9. A point ($\phi$, $\theta$, $\psi$) obtained by expressing an orientation of the master hand coordinate system 63 obtained when viewed from the master absolute coordinate system 62 with a roll angle, a pitch angle, and a yawing angle is defined as a hand orientation of the master manipulator 9. A hand position and an orientation vector are defined as a vector r=[x, y, z, $\phi$, $\theta$, $\psi$]$^T$. Thus, as an example, a vertical axis of the master first joint portion 56 can be preferably positioned to be parallel to a z axis of the master absolute coordinate system 62, and a lateral axis of the master second joint portion 57 can be preferably positioned to be parallel to an x axis of the master absolute coordinate system 62. Furthermore, a lateral axis of the sixth joint portion 61 can be preferably positioned to be parallel to an x axis of the master hand coordinate system 63. A lateral axis of the master fourth joint portion 59 can be preferably arranged to be parallel to the y axis thereof. A vertical axis of the master fifth joint portion 60 can be preferably arranged to be parallel to the z axis thereof. Note that a rotating angle with respect to the x axis of the master hand coordinate system 63 is defined as a yawing angle $\psi$, a rotating angle with respect to the y axis is defined as a pitch angle $\theta$, and a rotating angle with respect to the z axis is defined as a roll angle $\phi$. When a hand position and an orientation of the master manipulator 9 are controlled, the hand position and an orientation vector r are caused to track a hand position and an orientation desired vector $r_d$ generated by a desired trajectory generating unit disclosed in Published PCT International Application WO2009/107358 described above or the like.

In FIG. 3, the slave manipulator 32 is, as an example, a multi-joint robot arm and a 6-degree-of-freedom slave manipulator. The slave manipulator 32 includes the slave hand 71, a slave forearm link 73 having a slave wrist unit 72 attached to the slave hand 71 at a distal end 73a, a slave upper arm link 74 having a distal end 74a rotatably coupled to a proximal end 73b of the slave forearm link 73, and a slave pedestal 75 by which a proximal end 74b of slave upper arm link 74 is rotatably coupled to and supported. Although the slave pedestal 75 is fixed to a predetermined position, the slave pedestal 75 may be movably coupled to a rail (not shown). The slave wrist unit 72 has three rotating axes of a slave fourth joint portion 79, a slave fifth joint portion 80, and a slave sixth joint portion 81, and can change a relative orientation (direction) of the slave hand 71 with respect to the slave forearm link 73. More specifically, in FIG. 3, the slave fourth joint portion 79 can change a relative orientation of the slave hand 71 around a lateral axis with respect to the slave wrist unit 72. The slave fifth joint portion 80 can change a relative orientation of the slave hand 71 with respect to the slave wrist unit 72 around a vertical axis orthogonal to the lateral axis of the slave fourth joint portion 79. The slave sixth joint portion 81 can change a relative orientation of the slave hand 71 with respect to the slave wrist unit 72 around a lateral axis orthogonal to the lateral axis of the slave fourth joint portion 79 and the vertical axis of the slave fifth joint portion 80. Another end 73b of the slave forearm link 73 can be rotated around a slave third joint portion 78 with respect to the distal end 74a of the slave upper arm link 74, i.e., around a lateral axis parallel to the lateral axis of the slave fourth joint portion 79. The other end 74b of the slave upper arm link 74 can be rotated around a slave second joint portion 77 with respect to the slave pedestal 75, i.e., a lateral axis parallel to the lateral axis of the slave fourth joint portion 79. Furthermore, an upper movable portion 75a of the slave pedestal 75 can be rotated around a slave first joint portion 76 with respect to a lower fixed portion 75b of the slave pedestal 75, i.e., around a vertical axis parallel to the vertical axis of the slave fifth joint portion 80.

As a result, the slave manipulator 32 can be rotated around a total of six axes to configure the 6-degree-of-freedom multi-link manipulator.

Each joint portion configuring a rotating portion of each axis includes a rotational drive device such as a slave motor 84, and the slave encoder 85 (actually, arranged inside each joint portion of the slave manipulator 32) that detects a rotational phase angle (i.e., a joint angle) of a rotating shaft of the slave motor 84 to output position information. The slave motor 84 (actually, arranged inside each of the joint portions of the slave manipulator 32) is driven and controlled by the slave motor driver 31 arranged in one member of one pair of members (for example, a rotating-side member and a support-side member that supports the rotating-side member) configuring each of the joint portions. A rotating shaft of the slave motor 84 arranged in one of the members of each of the joint portions is coupled to the other member of the joint portion, and the rotating shaft is rotated in forward and backward directions to make it possible to rotate the other member around the axes with respect to one member.

As an example of a slave hand drive device driven and controlled by the slave motor driver 31, the slave motor 84 for driving the slave hand and the slave encoder 85 that detects a rotational phase angle of the rotating shaft of the master motor 84 for driving the slave hand are further included in the slave hand 71. Rotational angle information detected by the slave encoder 85 is taken in the slave control unit 24 through the slave input/output IF (for example, a counter board). On the basis of the rotational angle information taken in the slave control unit 24, the slave control unit 24 calculates a control command value (control signal) in an opening/closing operation of the slave hand 71. The control command value calculated by the slave control unit 24 is given through the slave input/output IF 30 (for example, a D/A board) to the slave motor driver 31 that also performs opening/closing drive of the slave hand 71. In accordance with each control command value sent from the slave motor driver 31, rotation of the slave motor 84 is driven and controlled, and the rotating shaft of the slave motor 84 for driving a slave hand is rotated in forward and backward directions to open/close the slave hand 71, thereby performing an operation for gripping and releasing the object 102 (for example, a flexible board).

Reference numeral 82 denotes a slave absolute coordinate system having a relative positional relationship fixed with respect to the lower fixed portion 75b of the slave pedestal 75, and reference numeral 83 denotes a slave hand coordinate system having a relative positional relationship fixed with respect to the slave hand 71. A slave original position $O_e$ (x,y,z) of the slave hand coordinate system 83 obtained when viewed from the slave absolute coordinate system 82 is defined as a hand position of the slave manipulator 32. A point ($\phi$, $\theta$, $\psi$) obtained by expressing an orientation of the slave hand coordinate system 83 obtained when viewed from the slave absolute coordinate system 82 with a roll angle, a pitch angle, and a yawing angle is defined as a hand orientation of the slave manipulator 32. A hand position and an orientation vector are defined as a vector $r=[x, y, z, \phi, \theta, \psi]^T$. Thus, as an example, a vertical axis of the slave first joint portion 76 can be preferably positioned to be parallel to a z axis of the slave absolute coordinate system 82, and a lateral axis of the slave second joint portion 77 can be preferably positioned to be parallel to an x axis of the slave absolute coordinate system 82. Furthermore, a lateral axis of the sixth joint portion 81 can be preferably positioned to be parallel to an x axis of the slave hand coordinate system 83, a lateral axis of the slave fourth joint portion 79 can be preferably arranged to be parallel to the y axis thereof, and a vertical axis of the slave fifth joint portion 80 can be preferably arranged to be parallel to the z axis thereof. A rotating angle with respect to the x axis of the slave hand coordinate system 83 is defined as a yawing angle $\psi$, a rotating angle with respect to the y axis is defined as a pitch angle $\theta$, and a rotating angle with respect to the z axis is defined as a roll angle $\phi$. When a hand position and an orientation of the slave manipulator 32 are controlled, the hand position and an orientation vector r are caused to track a hand position and an orientation desired vector $r_d$ generated by a desired trajectory generating unit disclosed in Published PCT International Application WO2009/107358 described above or the like.

The control apparatus 100 for a master-slave robot is an entire apparatus in the embodiment of the present invention and an apparatus that can be remote-controlled by a person in a task. The master robot system 1 is a robot system to be manipulated by a person such that the person directly touches the robot system. The slave robot system 21 is separated from the master robot system 1, and is a robot system to perform an actual task (for example, a task to be performed while gripping the object 102 with a robot and causing the object 102 to contact a target object 103).

The master manipulator 9 is a robot that is directly touched and manipulated by a person. When the person operates the master manipulator 9, by using a timer built in the master input/output IF 7, at certain predetermined time intervals (for example, every 1 ms), position information of the master manipulator 9 is acquired from each of the master encoders 65 and outputted to the master input/output IF 7.

The slave manipulator 32 is a robot that grips the object 102 (for example, a flexible board) to perform a task (for example, inserting or attaching task) to the target object 103 (for example, the target object 103 held by a holding member (not shown)) (for example, a connector having a recessed portion into which one end portion of the flexible board should be inserted), and operates the slave manipulator 32 to track the position information acquired by the master manipulator 9 (see FIG. 4A).

The master peripheral device 6 transmits information between the master manipulator 9 and the master control device 3. As in the slave peripheral device 29, information is transmitted between the slave manipulator 32 and the slave control device 23.

The master input/output IF 7 outputs the position information input from each of the master encoders 65 of the master manipulator 9 to the master input/output IF 7 and time information from a timer built in the master input/output IF 7 to the master control unit 4. The master input/output IF 7 outputs the position information input from the master control unit 4 to the master input/output IF 7 to the master motor driver 8. The master motor driver 8 operates the master motors 64 of the master manipulator 9 such that the master manipulator 9 tracks the position information input from the master input/output IF 7 to the master motor driver 8.

The slave input/output IF 30 outputs the position information input from the slave control unit 23 to the slave input/output IF 30 to the slave motor driver 31. The position information and the time information input from the slave manipulator 32 to the slave input/output IF 30 are outputted from the slave input/output IF 30 to the slave control unit 24. The slave motor driver 31 operates the slave motors 84 of the slave manipulator 32 such that the slave manipulator 32 tracks the position information input from the slave input/output IF 30 to the slave motor driver 31.

The master control device 3 has two roles, i.e., (i) outputting position information obtained by moving the master manipulator 9 to the slave control device 23 by using the timer built in the master input/output IF 7 at certain predetermined time intervals through the master input/output IF 7 and the master control device 3, and (ii) transmitting force information inputted from the slave control device 23 to the master control device 3, to a person.

The master control unit 4 controls manipulation information of the master manipulator 9 when a person manipulates the master manipulator 9 on the basis of the force information from the force transmitting unit 5. More specifically, the master control unit 4 outputs the position information of the master manipulator 9 and the time information inputted from the master input/output IF 7 to the master control unit 4, to the slave control unit 24. The force information input from the slave control unit 24 to the master control unit 4 is output from the master control unit 4 to the force transmitting unit 5.

The force transmitting unit 5 transmits the force information inputted from the slave control unit 24 through the master control unit 4, to the human hand 101. In the method of transmitting a force to the human hand 101, the force information is converted into position information by the force transmitting unit 5 using Hooke's law (for example, a spring constant is set to 0.5), the position information calculated by the force transmitting unit 5 is output as a command value from the force transmitting unit 5 to the master manipulator 9 through the master control unit 4, the master peripheral device 6, and the like, and the master motor 64 is operated to realize transmission of the force. The force transmitting unit 5 transmits the force information from the force correcting unit 25, to the master manipulator 9 in relation to the force correcting unit 25.

The slave control device 23 has two roles, i.e., (i) causing the slave manipulator 32 to track the position information and the time information input from the master control device 3 to the slave control device 23, and (ii) detecting a force correction section (force correction zone) on the basis of the force information and the speed information acquired by the slave manipulator 32 and performing force correction to only the detected force correction section (force correction zone), thus outputting the force information to the master control device 3.

The force information acquiring unit 26 acquires a value of the slave force sensor 86 (see FIG. 3) attached to the slave hand 71 of the slave manipulator 32 as force information through the slave input/output IF 30 by using a timer built in the slave input/output IF 30 through the slave input/output IF 30 at certain predetermined time intervals. The acquired force information is outputted to the force correcting unit 25 and the force correction section detecting unit 27.

The speed information acquiring unit 28 acquires speed information of the hand of the slave manipulator 32. In the acquiring method, the position information obtained by the slave encoder 85 (see FIG. 3) is acquired at certain predetermined time intervals on the basis of the time information from a timer built in the speed information acquiring unit 28, position information obtained a predetermined time before is subtracted from present position information stored in the speed information acquiring unit 28, and the resulting value is divided by a certain predetermined time. The obtained value is defined as speed information. The speed information acquired by the speed information acquiring unit 28 is outputted from the speed information acquiring unit 28 to the force correction section detecting unit 27.

The force correction section detecting unit 27 detects a force correction section (force correction zone) in the force information by using the force information input from the force information acquiring unit 26 to the force correction section detecting unit 27 and the speed information input from the speed information acquiring unit 28 to the force correction section detecting unit 27, and outputs the detected force information from the force correction section detecting unit 27 to the slave control unit 24.

A method of detecting a force correction section (force correction zone) will be described below with reference to FIGS. 4A to 5C. A task shown in FIG. 4A is a task of inserting a distal end 102a of the object 102 into a recessed portion 103a of the target object 103. When the human hand 101 directly touches the master manipulator 9 to manipulate the slave manipulator 32 that grips the object 102 with the slave hand 71, the inserting task is performed while the object 102 gripped with the slave hand 71 contacts the target object 103.

Figure 5A:
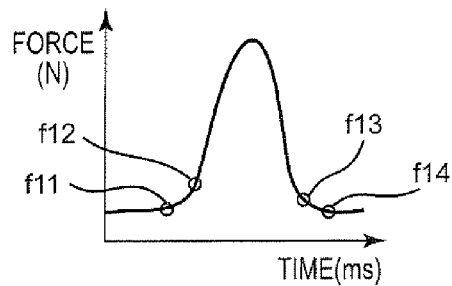
FIG. 5A is a graph showing a relationship between a force detected at a slave manipulator (slave side) and a time to explain that a force increasing section is detected to increase a force in the first embodiment of the present invention.
Figure 5B:
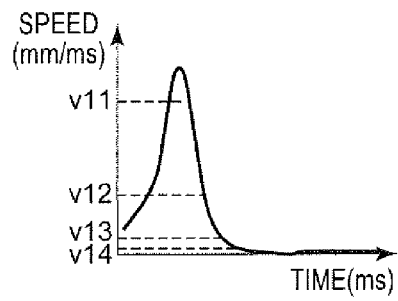
FIG. 5B is a graph showing a relationship between a speed detected at the slave manipulator and a time to explain that a force increasing section is detected to increase a force in the first embodiment of the present invention.
Figure 5C:
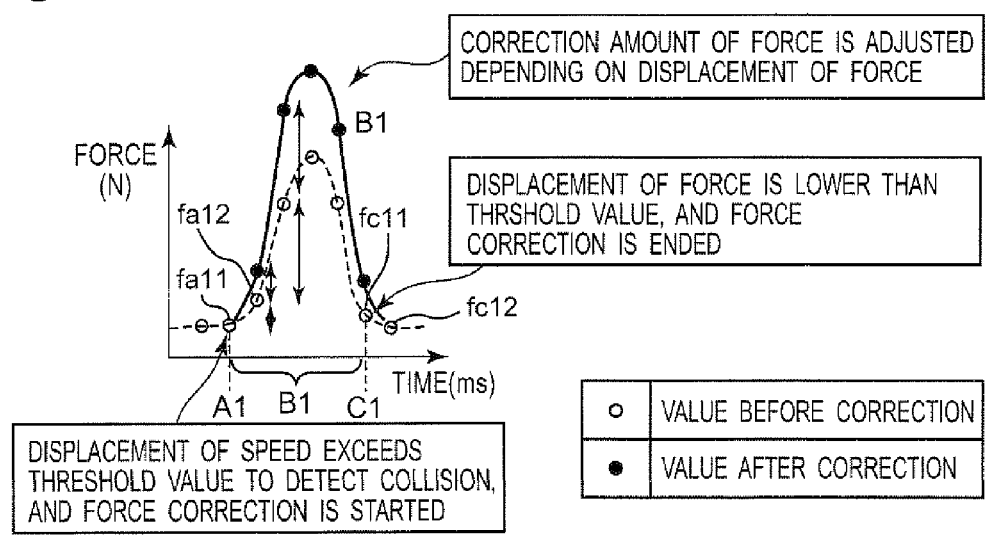
FIG. 5C is an explanatory view including a graph showing a relationship between a force transmitted to the master manipulator and a time to explain that a force increasing section is detected to increase a force in the first embodiment of the present invention when positive and negative directions of a force sensor are the same as those in FIG. 4A.

FIG. 5A is a graph showing a relationship between force detected by the slave manipulator 32 and time, and shows force information acquired by the force information acquiring unit 26. FIG. 5B is a graph showing a relationship between a speed detected by the slave manipulator 32 and a time, and shows speed information acquired by the speed information acquiring unit 28. FIG. 5C is a graph showing a relationship between the force transmitted to the master manipulator 9 and time, and shows force information transmitted to the master manipulator 9 after the force correction. A broken line and blank circles indicate values that have not been corrected, and a solid line and solid black circles indicate corrected values.

When, on the basis of the force information (for example, the force information (f11) and the force information (f12) in FIG. 5A) acquired at the predetermined time intervals by the force information acquiring unit 26, the force correction section detecting unit 27 determines that a displacement of the pieces of force information (difference between the pieces of force information, i.e., (f12)−(f11) in FIG. 5A) exceeds a threshold value (for example, 1.0 N) of the displacement of the pieces of force information, the force correction section detecting unit 27 consequently detects that the object 102 gripped with the slave hand 71 of the slave manipulator 32 collides with the target object 103. A point of time at which the force information (f12) is acquired is detected as a "force correction section" (force correction zone) by the force correction section detecting unit 27 (However, "exceeds the threshold value" means that the force correction section detecting unit 27 determines that the displacement has the same sign as that of the threshold value and an absolute value thereof larger than the threshold value, and shows a state in which an operation speed of the master manipulator 9 decreases. Hereinafter, in the present description, the phrase is used in the same sense as described above.)

On the other hand, when, on the basis of pieces of force information (f11) and (f12), the displacement of the pieces of force information (difference between the pieces of force information, i.e., (f12)−(f11)) in g. 5A does not exceed the threshold value of the displacement of the pieces of force information in the force information acquiring unit 26, this state is detected as "no change" by the force correction section detecting unit 27. The "no change" mentioned here means that there is no force correction section (force correction zone).

Thus, by the force correction section detecting unit 27, a point of time at which the displacement ((f12)−(f11)) of the pieces of force information acquired by the force information acquiring unit 26 exceeds the threshold value (i.e., a point of time (point of time A1 in FIG. 5C) at which the displacement ((fa12)−(fa11) in FIG. 5C) of forces transmitted to the master manipulator 9 exceeds the threshold value) is defined as "force correction start time". Furthermore, by the force correction section detecting unit 27, a point of time at which the displacement ((f14)−(f13) in FIG. 5A) of the pieces of force information acquired by the force information acquiring unit 26 is equal to or smaller than the threshold value (i.e., a point of time (point of time C1 in FIG. 5C) at which the displacement ((fc12)−(fc11) in FIG. 5C) of forces transmitted to the master manipulator 9 is equal to or smaller than the threshold value) is defined as "force correction end time". A zone from the "force correction start time" to the "force correction end time" is defined as a "force correction section" (force correction zone) by the force correction section detecting unit 27 (zone B1 in FIG. 5C).

Thus, when the zone from the force correction start time to the force correction end time is defined as the force correction section, force information in the zone is not a constant value in relation between a time and a magnitude of force, and is expressed by a curve or a straight line changing in the form of an upward chevron.

The above description describes the method of causing the force correction section detecting unit 27 to detect a force correction section (force correction zone) at which force information is corrected by using only the force information acquired by the force information acquiring unit 26. An advantage obtained when only the force information acquired by the force information acquiring unit 26 is used is that the method can be easily performed at low cost without using the speed information acquiring unit 28. However, the present invention is not limited to the method.

Figure 5D:
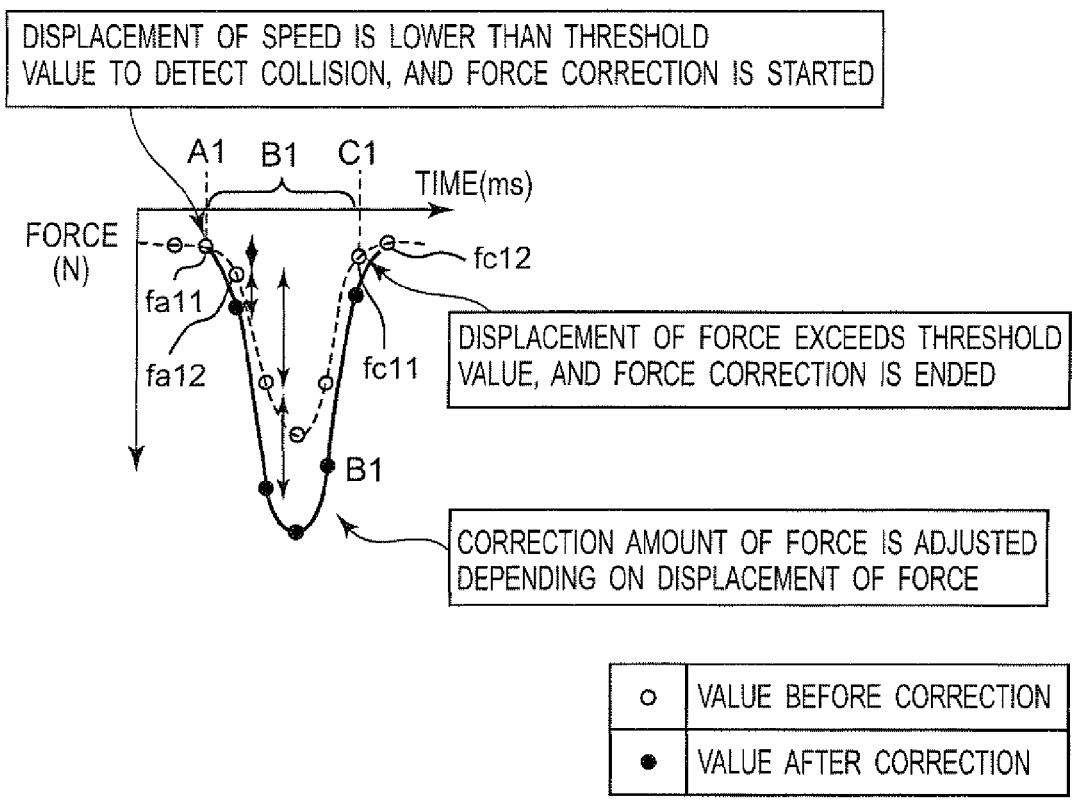
FIG. 5D is an explanatory view including a graph showing a relationship between a force transmitted to the master manipulator and a time to explain that a force increasing section is detected to increase a force in the first embodiment of the present invention when the positive and negative directions of the force sensor are the same as those in FIG. 4B.

For example, when the direction of the positive and negative signs of the slave force sensor 86 of the force information acquiring unit 26 is inverted in FIG. 4A, in other words, by using the configuration as shown in FIG. 4B, the graph in FIG. 5C does not have the form of an upward chevron but has the shape of a downward chevron as shown in FIG. 5D. Even in this case, the zone from the force correction start time to the force correction end time is defined as the force correction section, and force information in the zone is not a constant value in relation between a time and a magnitude of force, and is expressed by a curve or a straight line changing in the form of a downward chevron (in other words, the form of a valley). Thus, in the present description and the scope of claims, the "curve or straight line changing in the form of a chevron" described above means not only the case in FIG. 5C but also the case in FIG. 5D in which the direction of the positive and negative signs of the slave force sensor 86 is inverted.

For example, by using both the force information acquired by the force information acquiring unit 26 and the speed information acquired by the speed information acquiring unit 28, a force correction section (force correction zone) at which the force information is corrected can also be detected.

More specifically, when, on the basis of the speed information (for example, speed information (v11) and speed information (v12) in FIG. 5B) acquired at the predetermined time intervals by the speed information acquiring unit 28, the force correction section detecting unit 27 determines that a displacement of the pieces of speed information (difference between the pieces of speed information, i.e., (v12)−(v11) in FIG. 5B) exceeds a threshold value (for example, −0.01 mm/ms) of the displacement of the pieces of speed information, the force correction section detecting unit 27 consequently detects that the object 102 gripped with the slave hand 71 of the slave manipulator 32 collides with the target object 103. A point of time at which the speed information (v12) is acquired is detected as a "force correction section" (force correction zone) by the force correction section detecting unit 27 (However, "exceeds the threshold value" means that the force correction section detecting unit 27 determines that the displacement has the same sign as that of the threshold value and an absolute value thereof larger than the threshold value, and shows a state in which an operation speed of the master manipulator 9 decreases. Hereinafter, in the present description, the phrase is used in the same sense as described above.)

On the other hand, when, on the basis of pieces of speed information (v11) and (v12), the displacement of the pieces of speed information (difference between the pieces of speed information, i.e., (v12)−(v11)) in FIG. 5B does not exceed the threshold value of the displacement of the pieces of speed information in the speed information acquiring unit 28, this state is detected as a point of time of "no change" by the force correction section detecting unit 27. The "no change" mentioned here means that there is no force correction section (force correction zone).

Thus, by the force correction section detecting unit 27, a point of time at which the displacement ((v12)−(v11)) of the pieces of speed information acquired by the speed information acquiring unit 28 exceeds the threshold value (i.e., a point of time (point of time A1 in FIG. 5C) at which the displacement ((fa12)−(fa11) in FIG. 5C) of forces transmitted to the master manipulator 9 exceeds the threshold value) is defined as "force correction start time".

By the force correction section detecting unit 27, a point of time (point of time C1 in FIG. 5C) at which a displacement ((fc12)−(fc11) in FIG. 5C) of the pieces of force information acquired by the force information acquiring unit 26 is lower than a threshold value (for example −1.0 N) is defined as "force correction end time". More specifically, a point of time at which the state in which the displacement of the pieces of force information exceeds the threshold value changes into the state in which the displacement is lower than the threshold value is defined as "force correction end time". The zone from the "force correction start time" to the "force correction end time" is defined as a "force correction section" (force correction zone) (zone B1 in FIG. 5C) by the force correction section detecting unit 27.

As described above, as an advantage obtained when the "force correction start time" and the "force correction end time" are detected by using both the force information acquired by the force information acquiring unit 26 and the speed information acquired by the speed information acquiring unit 28, accurate detection can be performed with an error less than that in the case in which "force correction start time" and "force correction end time" are detected by using any one of the force information acquired by the force information acquiring unit 26 and the speed information acquired by the speed information acquiring unit 28.

The force correcting unit 25, on the basis of the force information input from the slave control unit 24 to the force correcting unit 25, as the force information of the "force correction section" (force correction zone), information obtained by correcting the force information is outputted to the slave control unit 24. On the other hand, as information, of "no change" that is the state in which the force information does not exceed the threshold value, the force information is outputted to the slave control unit 24 without being changed. In a method of correcting force information, the displacement ((fa12)−(fa11)) in FIG. 5C) of the pieces of force information is multiplied by a predetermined constant (for example, 0.5) by the force correcting unit 25, and the multiplied value is added to the present force information (fa12 in FIG. 5C) by the force correcting unit 25 ((fa12)+0.5×((fa12)−(fa11)) in FIG. 5C) to make it possible to correct the force information by the force correcting unit 25.

The slave control unit 24 outputs the position information input from the master control unit 4 to the slave control unit 24, to the slave input/output IF 30. The force information input from the force correction section detecting unit 27 to the slave control unit 24 is outputted from the slave control unit 24 to the force correcting unit 25, and the force information input from the force correcting unit 25 to the slave control unit 24 is outputted from the slave control unit 24 to the master control unit 4.

Figure 6:
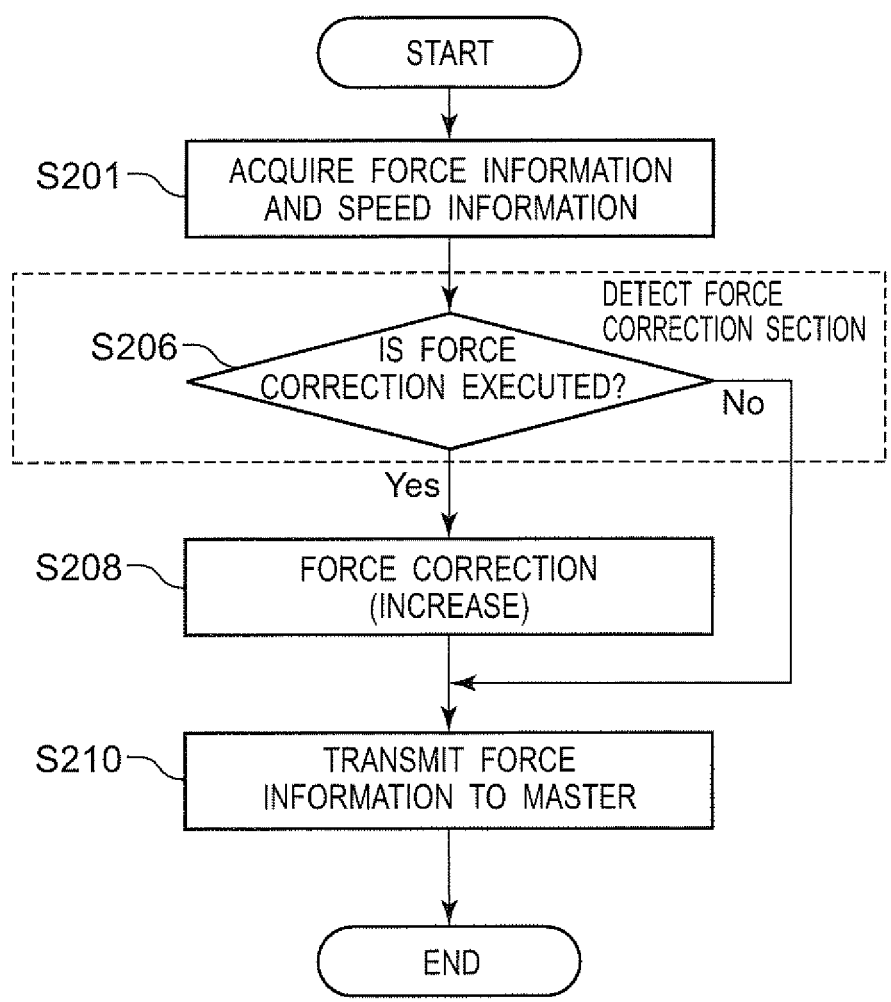
FIG. 6 is a flowchart showing a flow of processes from when force information and speed information are acquired to when force correction is performed in the first embodiment of the present invention.

A manipulation procedure of the control apparatus 100 for a master-slave robot in the first embodiment will be described below with reference to FIG. 4A and the flowchart in FIG. 6.

In step S201, when the object 102 collides with the target object 103, the force information is acquired by the force information acquiring unit 26, the speed information is acquired by the speed information acquiring unit 28, and, from the force information acquiring unit 26 and the speed information acquiring unit 28, the force information acquired by the force information acquiring unit 26 and the speed information acquired by the speed information acquiring unit 28 are outputted to the force correction section detecting unit 27, respectively. Note that when only the force information acquired by the force information acquiring unit 26 is used, the speed information need not be acquired by the speed information acquiring unit 28. The case in which both the force information acquired by the force information acquiring unit 26 and the speed information acquired by the speed information acquiring unit 28 are used is described here.

Subsequent to step S201, in step S206, when both the force information and the speed information are acquired in step S201, by using at least one of the force information and the speed information, in the force correction section detecting unit 27, force correction section information (force correction zone information) is detected, and the detected force correction section information (force correction zone information) is outputted from the force correction section detecting unit 27 to the force correcting unit 25 through the slave control unit 24. In the force correcting unit 25, the force correction section detecting unit 27 determines whether the force information acquired by the force information acquiring unit 26 has a force correction section (force correction zone). Note that when only the force information is used, by using only the force information, in the force correction section detecting unit 27, force correction section information (force correction zone information) is detected, and the detected force correction section information (force correction zone information) is outputted from the force correction section detecting unit 27 to the force correcting unit 25 through the slave control unit 24.

In step S206, when the force correction section detecting unit 27 determines that there is no force correction section (force correction zone), the control flow shifts to step S210.

In step S206, when the force correction section detecting unit 27 determines that there is a force correction section (force correction zone), the control flow shifts to step S208.

In step S208, in the force correcting unit 25, with respect to the force information acquired by the force information acquiring unit 26, force information that is detected to require force correction on the basis of the force correction section information (force correction zone information) is corrected, and then outputted to the slave control unit 24, and thereafter the control flow shifts to step S210.

In step S210, the force information outputted to the slave control unit 24 is sent from the slave control unit 24 to the master control unit 4, and then transmitted from the master control unit 4 to the force transmitting unit 5. The force information inputted to the force transmitting unit 5 is transmitted to the human hand 101 by the method described above, and the flow is ended.

<<Effects of First Embodiment>>

In general, in the case where a method of gripping the object 102 with the slave manipulator 32 changes during a task, and the force information acquired by the force information acquiring unit 26 upon the object 102 colliding with the target object 103 is smaller than that acquired before the gripping method changes, in a conventional technique, force information felt by the human hand 101 is small to make a manipulation difficult. As a result, a time required to complete the task becomes long.

In contrast to this, by using the first embodiment, only the force information acquired upon the object 102 colliding with the target object 103 is corrected by the force correcting unit 25, to thereby increase the force information by the force correcting unit 25. The increased force information is outputted from the force transmitting unit 5 to the master manipulator 9 through the master control unit 4, the master peripheral device 6, and the like, and the master motor 64 is driven on the basis of the increased force information. For this reason, an important section in the manipulation can be clearly felt by the human hand 101 to make the task easy and to shorten a time required for completion of the task.

For example, only force information in an important step in pieces of force information externally applied to the slave manipulator 32 in a task can be increased and transmitted to the master manipulator 9. As a result, the strength or weakness of the force during the task is clearly transmitted to an operator. Even though components or task procedures change, the task can be easily performed for a short period of time.

Note that the force correction section detecting unit 27 and the force correcting unit 25 can also be included in the master control device 3.

(Second Embodiment)

In the first embodiment, an absolute value of the force information applied to the slave manipulator 32 upon the object 102 colliding with the target object 103 is increased and transmitted to the master manipulator 9, and the force is thereby transmitted clearly to the human hand 101 to make it possible to make the task easy. In contrast to this, in the second embodiment of the present invention, an absolute value of force information excessively applied to the master manipulator 9 by the human hand 101 upon the object 102 colliding with the target object 103 is reduced to transmit the force information to the slave manipulator 32. In this manner, even though the human hand 101 applies an excessive force to the master manipulator 9, the object 102 or the target object 103 can be prevented from being damaged. This will be described below.

Figure 7:
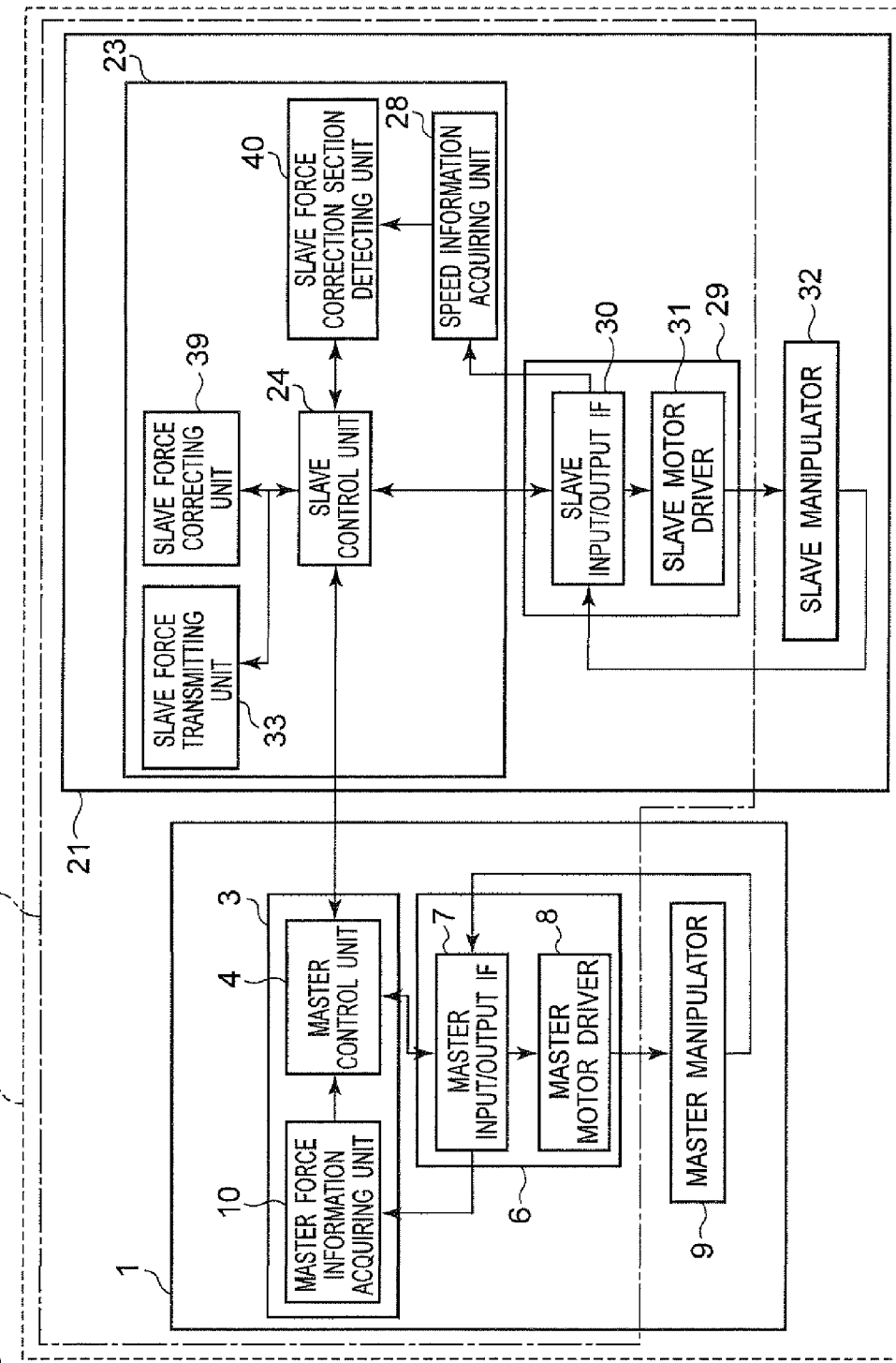
FIG. 7 is a block diagram of a master-slave robot in a second embodiment of the present invention.

FIG. 7 is a block diagram showing a control apparatus 100A of the master-slave robot 150 in the second embodiment of the present invention. Since the master control unit 4, the master input/output IF 7, the master motor driver 8, the master manipulator 9, the slave control unit 24, the speed information acquiring unit 28, the slave input/output IF 30, the slave motor driver 31, and the slave manipulator 32 in the second embodiment of the present invention are the same as those in the first embodiment, common reference numerals denote common components to omit a description of the common components, and only different components will be described below in detail.

The master control device 3 includes the master control unit 4 and a master force information acquiring unit 10.

The slave control device 23 includes the slave control unit 24, the speed information acquiring unit 28, a slave force transmitting unit 33, a slave force correcting unit 39, and a slave force correction section detecting unit 40.

The master force information acquiring unit 10 acquires a value of a master force sensor 66 (see FIG. 2) attached to the master hand 51 of the master manipulator 9 as force information through the master input/output IF 7. The force information acquired by the master force information acquiring unit 10 is outputted from the master force information acquiring unit 10 to the master control unit 4.

The slave force transmitting unit 33 transmits the force information inputted from the slave control unit 24 to the slave force transmitting unit 33 from the slave force transmitting unit 33, to the slave manipulator 32. According to the method of transmitting force information, by using Hooke's law (for example, a spring constant is set to 0.5), force information is converted into position information by the slave force transmitting unit 33, and position information calculated by the slave force transmitting unit 33 is outputted from the slave force transmitting unit 33 to the slave manipulator 32 as a command value to drive a slave motor 74, thereby realizing transmission of force information.

In the slave force correction section detecting unit 40, by using the force information inputted from the master force information acquiring unit 10 to the slave force correction section detecting unit 40 through the master control unit 4 and the slave control unit 24 and the speed information inputted from the speed information acquiring unit 28 to the slave force correction section detecting unit 40, a force correction section (force correction zone) in the force information is detected by the slave force correction section detecting unit 40, and the force information detected by the slave force correction section detecting unit 40 is outputted from the slave force correction section detecting unit 40 to the slave control unit 24.

Figure 8A:
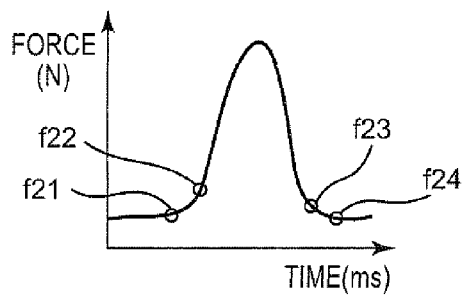
FIG. 8A is a graph showing a relationship between a force detected at a master manipulator and a time to explain that a force reducing section is detected to reduce a force in the second embodiment of the present invention.
Figure 8B:
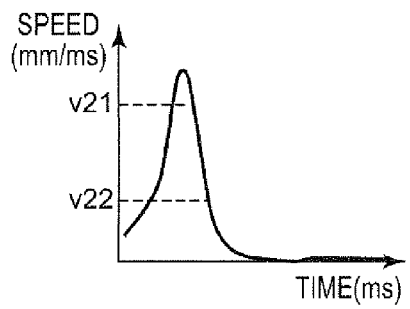
FIG. 8B is a graph showing a relationship between a speed detected at a slave manipulator and a time to explain the force reducing section is detected to reduce a force in the second embodiment of the present invention.
Figure 8C:
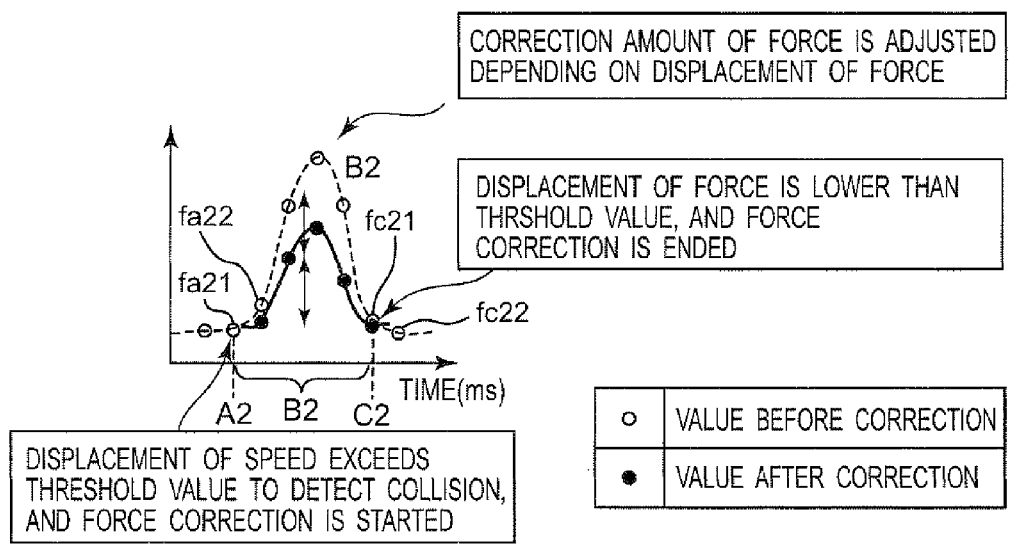
FIG. 8C is an explanatory view including a graph showing a relationship between a force transmitted to a slave manipulator and a time to explain that the force reducing section is detected to reduce a force in the second embodiment of the present invention.

A method of detecting a force correction section (force correction zone) in the slave force correction section detecting unit 40 will be described with reference to FIG. 4A and FIGS. 8A to 8C. FIG. 8A is a graph showing a relationship between a force detected at the master manipulator 9 and a time, and shows force information acquired by the master force information acquiring unit 10. FIG. 8B is a graph showing a relationship between a speed detected at the slave manipulator 32 and a time, and shows speed information acquired by the speed information acquiring unit 28. FIG. 8C is a graph showing a relationship between a force transmitted to the slave manipulator 32 and a time, and shows force information transmitted to the slave manipulator 32 after the force correction. A broken line and blank circles indicate values that have not been corrected, and a solid line and solid black circles indicate corrected values.

When, on the basis of the force information (for example, the force information (f21) and the force information (f22) in FIG. 8A) acquired at the predetermined time intervals by the master force information acquiring unit 10, the slave force correction section detecting unit 40 determines that a displacement of the pieces of force information (difference between the pieces of force information, i.e., (f22)−(f21) in FIG. 8A) exceeds a threshold value (for example, 1.0 N) of the displacement of the pieces of force information, the slave force correction section detecting unit 40 consequently detects that the object 102 gripped with the slave hand 71 of the slave manipulator 32 collides with the target object 103. A point of time at which the force information (f22) is acquired is detected as a "force correction section" (force correction zone) by the slave force correction section detecting unit 40.

On the other hand, when, on the basis of pieces of force information (f21) and (f22), the displacement of the pieces of force information (difference between the pieces of force information, i.e., (f22)−(f21) in FIG. 8A) does not exceed the threshold value of the displacement of the pieces of force information in the master force information acquiring unit 10, this state is detected as "no change" by the slave force correction section detecting unit 40. "No change" mentioned here means that there is no force correction section (force correction zone).

Thus, by the slave force correction section detecting unit 40, a point of time at which the displacement ((f22)−(f21)) of the pieces of force information acquired by the master force information acquiring unit 10 exceeds the threshold value (i.e., a point of time (point of time A2 in FIG. 8C) at which the displacement ((fa22)−(fa21) in FIG. 8C) of forces transmitted to the slave manipulator 32 exceeds the threshold value) is defined as "force correction start time". Furthermore, by the slave force correction section detecting unit 40, a point of time at which the displacement ((f24)−(f23) in FIG. 8A) of the pieces of force information acquired by the master force information acquiring unit 10 is equal to or smaller than the threshold value (i.e., a point of time (point of time C2 in FIG. 8C) at which the displacement ((fc22)−(fc21) in FIG. 8C) of forces transmitted to the slave manipulator 32 is equal to or smaller than the threshold value) is defined as "force correction end time". A zone from the "force correction start time" to the "force correction end time" is defined as a "force correction section" (force correction zone) by the slave force correction section detecting unit 40 (zone B2 in FIG. 8C).

The above description explains the method of causing the slave force correction section detecting unit 40 to detect a force correction section (force correction zone) at which force information is corrected by using only the force information acquired by the master force information acquiring unit 10. An advantage obtained when only the force information acquired by the master force information acquiring unit 10 is used is that the method can be easily performed at low cost without using the speed information acquiring unit 28. However, the present invention is not limited to the method.

For example, by using both the force information acquired by the master force information acquiring unit 10 and the speed information acquired by the speed information acquiring unit 28, a force correction section (force correction zone) at which the force information is corrected can also be detected.

More specifically, when, on the basis of the speed information (for example, speed information (v21) and speed information (v22) in FIG. 8B) acquired at the predetermined time intervals by the speed information acquiring unit 28, the slave force correction section detecting unit 40 determines that a displacement of the pieces of speed information (difference between the pieces of speed information, i.e., (v22)−(v21) in FIG. 8B) exceeds a threshold value (for example, −0.01 mm/ms) of the displacement of the pieces of speed information, the slave force correction section detecting unit 40 consequently detects that the object 102 gripped with the slave hand 71 of the slave manipulator 32 collides with the target object 103. A point of time at which the speed information (v22) is acquired is detected as a "force correction section" (force correction zone) by the slave force correction section detecting unit 40.

On the other hand, when, on the basis of pieces of speed information (v21) and (v22), the displacement of the pieces of speed information (difference between the pieces of speed information, i.e., (v22)−(v21) in FIG. 8B) does not exceed the threshold value of the displacement of the pieces of speed information in the speed information acquiring unit 28, this state is detected as a point of time of "no change" by the slave force correction section detecting unit 40. "No change" mentioned here means that there is no force correction section (force correction zone).

Thus, by the slave force correction section detecting unit 40, a point of time at which the displacement ((v22)−(v21)) of the pieces of speed information acquired by the speed information acquiring unit 28 exceeds the threshold value (i.e., a point of time (point of time A2 in FIG. 8C) at which the displacement ((fa22)−(fa21) in FIG. 8C) of forces transmitted to the slave manipulator 32 exceeds the threshold value) is defined as "force correction start time". By the slave force correction section detecting unit 40, a point of time (point of time C2 in FIG. 8C) at which a displacement ((fc22)−(fc21) in FIG. 8C) of the pieces of force information acquired by the master force information acquiring unit 10 is lower than a threshold value (for example −1.0 N) is defined as "force correction end time".

A zone from the "force correction start time" to the "force correction end time" is defined as a "force correction section" (force correction zone) (zone B2 in FIG. 8C) by the slave force correction section detecting unit 40.

As described above, as an advantage obtained when the "force correction start time" and the "force correction end time" are detected by using both the force information acquired by the master force information acquiring unit 10 and the speed information acquired by the speed information acquiring unit 28, accurate detection can be performed with an error less than that in the case in which "force correction start time" and "force correction end time" are detected by using any one of the force information acquired by the master force information acquiring unit 10 and the speed information acquired by the speed information acquiring unit 28.

The slave force correcting unit 39, on the basis of the force information inputted from the slave control unit 24 to the slave force correcting unit 39, as the force information of the "force correction section" (force correction zone), information obtained by correcting the force information is outputted to the slave control unit 24. On the other hand, as information of "no change", the force information is outputted to the slave control unit 24 without being changed. In a method of correcting force information, the displacement ((fa22)−(fa21) in FIG. 8C) of the pieces of force information is multiplied by a predetermined constant (for example, 0.5) by the slave force correcting unit 39, and the multiplied value is subtracted from the present force information (fa22 in FIG. 8C) by the slave force correcting unit 39 ((fa22)−0.5×((fa22)−(fa21)) in FIG. 8C) to make it possible to correct the force information by the slave force correcting unit 39.

Figure 9:
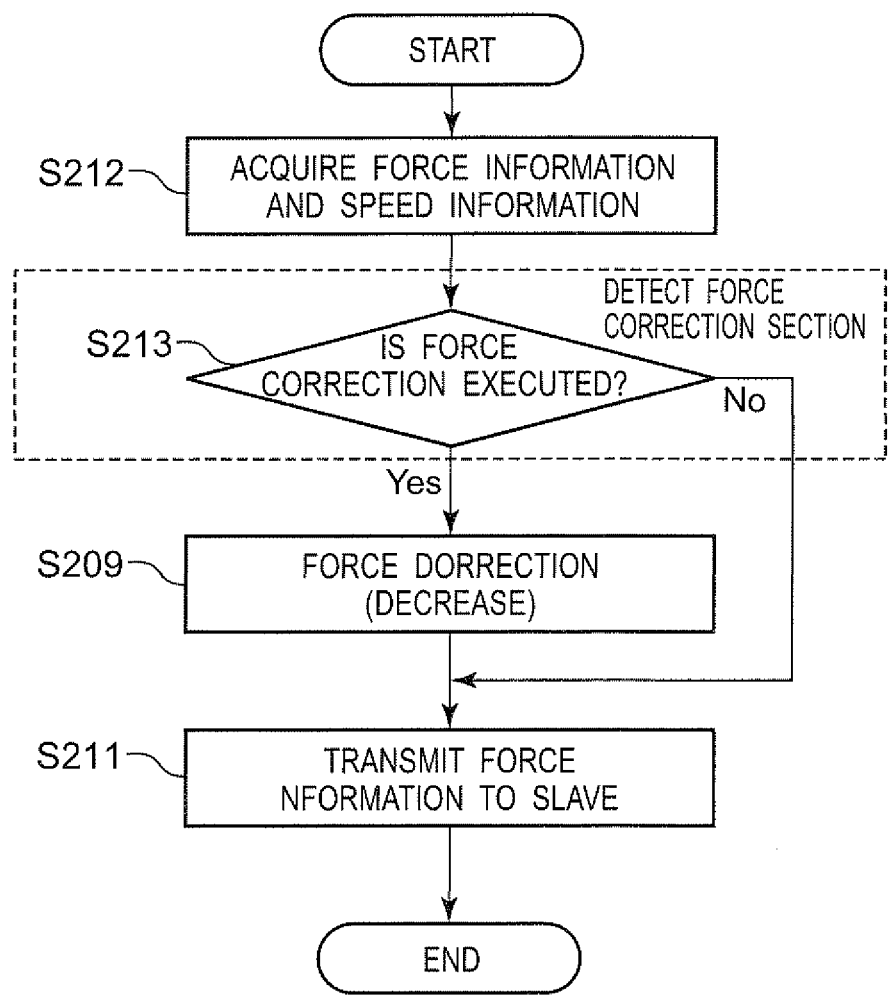
FIG. 9 is a flowchart showing a flow of processes from when force information and speed information are acquired to when force correction is performed in the second embodiment of the present invention.

A manipulation procedure of the control apparatus 100A for a master-slave robot in the second embodiment will be described below with reference to FIG. 4A and the flowchart in FIG. 9.

In step S212, when the object 102 collides with the target object 103, the force information is acquired by the master force information acquiring unit 10, the speed information is acquired by the speed information acquiring unit 28, and, from the master force information acquiring unit 10 and the speed information acquiring unit 28, the force information acquired by the master force information acquiring unit 10 and the speed information acquired by the speed information acquiring unit 28 are outputted to the slave force correction section detecting unit 40, respectively. When only the force information acquired by the master force information acquiring unit 10 is used, the speed information need not be acquired by the speed information acquiring unit 28. The case in which both the force information acquired by the master force information acquiring unit 10 and the speed information acquired by the speed information acquiring unit 28 are used is described here.

Subsequent to step S212, in step S213, when both the force information and the speed information are acquired in step S212, by using at least one of the force information and the speed information, in the slave force correction section detecting unit 40, force correction section information (force correction zone information) is detected, and the detected force correction section information (force correction zone information) is outputted from the slave force correction section detecting unit 40 to the slave force correcting unit 39 through the slave control unit 24. In the slave force correcting unit 39, the slave force correction section detecting unit 40 determines whether the force information acquired by the master force information acquiring unit 10 has a force correction section (force correction zone). When only the force information is used, by using only the force information, in the slave force correction section detecting unit 40, force correction section information (force correction zone information) is detected, and the detected force correction section information (force correction zone information) is outputted from the slave force correction section detecting unit 40 to the slave force correcting unit 39 through the slave control unit 24.

In step S213, when the slave force correction section detecting unit 40 determines that there is no force correction section (force correction zone), the control flow shifts to step S211.

In step S213, when the slave force correction section detecting unit 40 determines that there is a force correction section (force correction zone), the control flow shifts to step S209.

In step S209, in the slave force correcting unit 39, with respect to the force information acquired by the master force information acquiring unit 10, force information that is detected to require force correction on the basis of the force correction section information (force correction zone information) is corrected and then outputted to the slave control unit 24, and the control flow shifts to step S211.

In step S211, the force information outputted to the slave control unit 24 is transmitted from the slave control unit 24 to the slave force transmitting unit 33. The force information inputted to the slave force transmitting unit 33 is transmitted to the slave manipulator 9 by the method described above, and the flow is ended.

<<Effects of Second Embodiment>>

In the case where the master manipulator 9 is manipulated with the human hand 101 to cause the slave manipulator 32 that grips the object 102 to perform a task, conventionally, the object 102 or the target object 103 may be damaged when the human hand 101 applies an excessive force to the master manipulator 9 to cause the object 102 to collide with the target object 103.

In contrast to this, by using the second embodiment of the present invention, the slave force correction section detecting unit 40 detects that the human hand 101 applies an excessive force thereto, the slave force correcting unit 39 decreases an absolute value of the force information to transmit the force information to the slave manipulator 32, and, on the basis of the transmitted force information, the slave manipulator 32 is driven, thereby preventing the object 102 or the target object 103 from being damaged.

Note that in the second embodiment, all the master motors 64 for driving joint portions and driving hands in FIG. 2 can be removed. The slave force correction section detecting unit 40 and the slave force correcting unit 39 can also be included in the master control device 3.

(Third Embodiment)

Figure 10A:
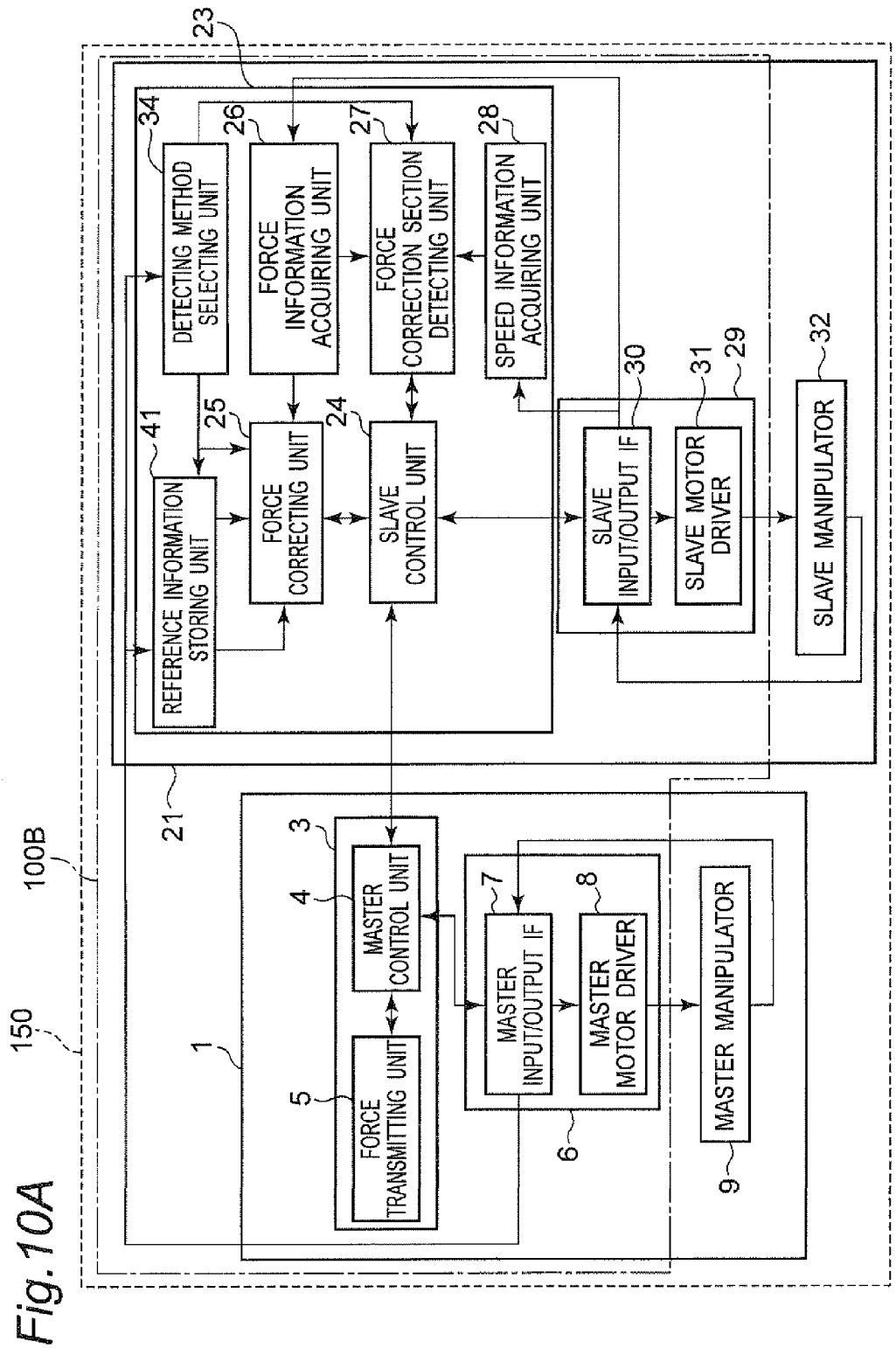
FIG. 10A is a block diagram of a master-slave robot in a third embodiment of the present invention.
Figure 10B:
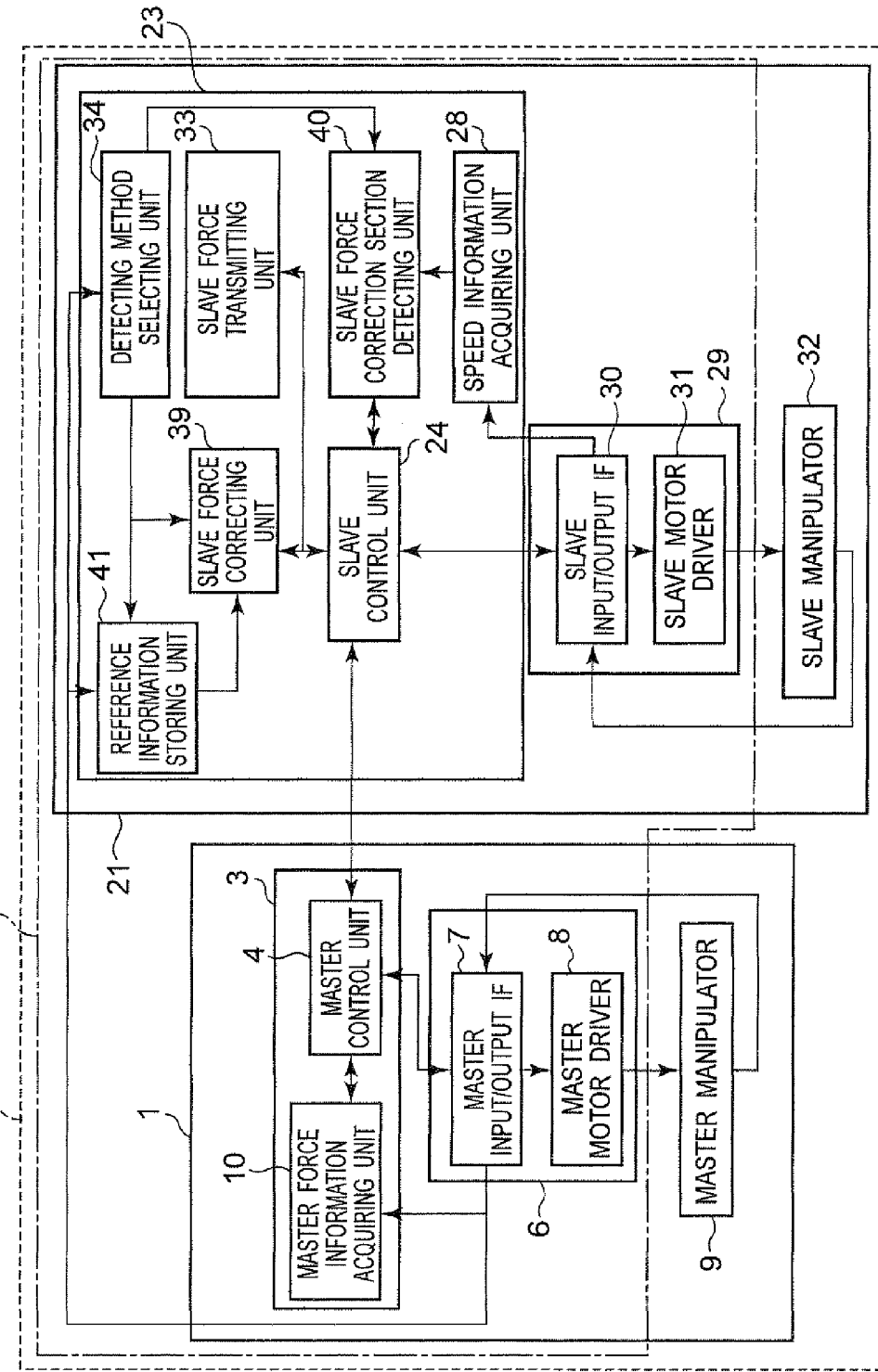
FIG. 10B is a block diagram of a master-slave robot in a third embodiment of the present invention.

FIGS. 10A and 10B are block diagrams showing a control apparatus 100E for the master-slave robot 150 in a third embodiment of the present invention. Since the master robot system 1, the slave control unit 24, the force information acquiring unit 26, the speed information acquiring unit 28, the slave peripheral device 29, and the slave manipulator 32 in the third embodiment of the present invention are the same as those in the first embodiment, common reference numerals denote common components to omit a description of the common components, and only different components will be described below in detail.

The master control device 3 includes the master control unit 4 and the force transmitting unit 5.

The slave control device 23 includes the slave control unit 24, the force correcting unit 25, the force information acquiring unit 26, the speed information acquiring unit 28, a detecting method selecting unit 34, a reference information storing unit 41, and the force correction section detecting unit 27.

A functional difference between the force correcting unit 25 and the slave force correcting unit 39 will be described below. The force correcting unit 25 has a function of increasing a force transmitted to the master manipulator 9. On the other hand, the slave force correcting unit 39 has a function of decreasing the force transmitted to the slave manipulator 32.

The detecting method selecting unit 34 selects one of "force information and speed information", "force information", "speed information", and "stored force information and speed information" (to be referred to as "reference" hereinafter). Selection information selected by the detecting method selecting unit 34 is outputted to the force correction section detecting unit 27, and information used when the force correction section (force correction zone) is detected is designated by the force correction section detecting unit 27 on the basis of the selection information. Since the force correction section detecting unit 27, the slave force correction section detecting unit 40, the force correcting unit 25, and the slave force correcting unit 39 differs depending on the information selected by the detecting method selecting unit 34, an explanation will be made in units of pieces of selected information.

A method of selecting each piece of information in the detecting method selecting unit 34 has a configuration in which an operator (person) depresses buttons corresponding to a task experience of the operator and a task difficulty by using the master input/output IF 7 configured by a console panel or the like on which, for example, a plurality of buttons are arranged, in accordance with a database in FIG. 11, corresponding information is automatically selected by the detecting method selecting unit 34 (the database in FIG. 11 is stored as information in the detecting method selecting unit 34). As the task experience, the operator selects one of "0 to 1 year", "1 to 3 years", and "3 or more years". The task experience is inputted to the detecting method selecting unit 34 by using the master input/output IF 7. As the task difficulty, one of "difficult", "normal", and "easy" is selected and inputted to the detecting method selecting unit 34 by using the master input/output IF 7. For example, "0 to 1 year" is selected as the task experience, "difficult" is selected as the task difficulty, and both the data are inputted from the master input/output IF 7 to the detecting method selecting unit 34. In this case, in the detecting method selecting unit 34, "reference" is selected on the basis of the database in FIG. 11. "3 or more years" is selected as the task experience, "easy" is selected as the task difficulty, and both the data are inputted from the master input/output IF 7 to the detecting method selecting unit 34. In this case, in the detecting method selecting unit 34, "speed information" is selected on the basis of the database in FIG. 11. When the task experience and the task difficulty are not selected, "0 to 1 year" is automatically selected as the task experience, "normal" is automatically selected as the task difficulty, and both the data are inputted to the detecting method selecting unit 34 by using the master input/output IF 7. In this case, in the detecting method selecting unit 34, on the basis of the database in FIG. 11, "force information and speed information" is selected.

The reference information storing unit 41 is used when "reference" is selected in the detecting method selecting unit 34 and preliminarily stores a database in which information of the reference to be used is selected depending on a grip position of the object 102 or the object 102 (When "reference" is selected, details of the database will be described later.)

(When "Force Information and Speed Information" is Selected by the Detecting Method Selecting Unit 34)

In the force correction section detecting unit 27 and the slave force correction section detecting unit 40, by using pieces of force information inputted from the force information acquiring unit 26 and the master force information acquiring unit 10 to the force correction section detecting unit 27 and the slave force correction section detecting unit 40 and speed information inputted from the speed information acquiring unit 28 to the force correction section detecting unit 27 and the slave force correction section detecting unit 40, a force correction section (force correction zone) in the force information is detected by the force correction section detecting unit 27 and the slave force correction section detecting unit 40, and the pieces of force information detected by the force correction section detecting unit 27 and the slave force correction section detecting unit 40 are outputted from the force correction section detecting unit 27 and the slave force correction section detecting unit 40 to the slave control unit 24.

A method of detecting a force correction section (force correction zone) will be described below with reference to FIGS. 5A to 5C and FIGS. 8A to 8C. FIG. 5A shows the force information acquired by the force information acquiring unit 26, FIG. 8A shows the force information acquired by the master force information acquiring unit 10, and FIGS. 5A and 8B show the speed information acquired by the speed information acquiring unit 28. FIG. 5C shows force information transmitted to the master manipulator 9 after force correction, and FIG. 8C shows force information transmitted to the slave manipulator 32 after force correction. A broken line and blank circles indicate values that have not been corrected, and a solid line and solid black circles indicate corrected values.

When, on the basis of the speed information acquired at the predetermined time intervals by the speed information acquiring unit 28, the force correction section detecting unit 27 and the slave force correction section detecting unit 40 determine that a displacement of the pieces of speed information ((v12)−(v11) in FIG. 5B and (v22)−(v21) in FIG. 8B) exceeds a threshold value (for example, −0.01 mm/ms), the force correction section detecting unit 27 and the slave force correction section detecting unit 40 consequently detect that the object 102 gripped with the slave hand 71 of the slave manipulator 32 collides with the target object 103. A point of time at which the speed information (v12) is acquired is detected as a "force correction section" (force correction zone) by the force correction section detecting unit 27 and the slave force correction section detecting unit 40. The force information detected as the "force correction section" (force correction zone), in the case where the force correction section detecting unit 27 and the slave force correction section detecting unit 40 determine that the displacement of the pieces of force information acquired by the force information acquiring unit 26 exceeds a threshold value (for example, 1.0 N), is detected as an "increase" by the force correction section detecting unit 27 and the slave force correction section detecting unit 40. In the case where the force correction section detecting unit 27 and the slave force correction section detecting unit 40 determine that the displacement of the pieces of force information acquired by the master force information acquiring unit 10 exceeds the threshold value, the force information detected as the "force correction section" (force correction zone) is detected as a "decrease" by the force correction section detecting unit 27 and the slave force correction section detecting unit 40. On the other hand, the force correction section detecting unit 27 and the slave force correction section detecting unit 40 determine that the displacement of the pieces of speed information does not exceed the threshold value, a force correction section is detected as "no change" by the force correction section detecting unit 27 and the slave force correction section detecting unit 40.

Thus, by the force correction section detecting unit 27 and the slave force correction section detecting unit 40, a point of time at which the displacement of the pieces of speed information acquired by the speed information acquiring unit 28 exceeds the threshold value (point of time A1 in FIG. 5C and point of time A2 in FIG. 8C) is defined as "force correction start time". By the force correction section detecting unit 27 and the slave force correction section detecting unit 40, a point of time (point of time C1 in FIG. 5C and point of time C2 in FIG. 8C) at which a displacement ((fc12)−(fc11) in FIG. 5C and (fc22)−(fc21) in FIG. 8C) of the pieces of force information acquired by the force information acquiring unit 26 and the master force information acquiring unit 10 is lower than a threshold value (for example −1.0 N) is defined as "force correction end time". A zone from the "force correction start time" to the "force correction end time" is defined as a "force correction section" (force correction zone) (zone B1 in FIG. 5C and zone B2 in FIG. 8C) by the force correction section detecting unit 27 and the slave force correction section detecting unit 40.

The force correcting unit 25, on the basis of the detected force information inputted from the slave control unit 24 to the force correcting unit 25, as the force information of the "force correction section" (force correction zone), information obtained by correcting the force information is outputted to the slave control unit 24. On the other hand, as information of "no change", the force information is outputted to the slave control unit 24 without being changed. In a method of correcting the force information, the displacement ((fa12)−(fa11) in FIG. 5C) of the pieces of force information is multiplied by a predetermined constant (for example, 0.5) by the force correcting unit 25, and the multiplied value is added to the present force information ((fa12) in FIG. 5C) by the force correcting unit 25 ((fa12)+0.5×((fa12)−(fa11)) in FIG. 5C) to make it possible to correct the force information by the force correcting unit 25.

The slave force correcting unit 39, on the basis of the detected force information inputted from the slave control unit 24 to the slave force correcting unit 39, as the force information of the "force correction section" (force correction zone), information obtained by correcting the force information is outputted to the slave control unit 24. On the other hand, as information of "no change", the force information is outputted to the slave control unit 24 without being changed. In a method of correcting the force information, the displacement ((fa22)−(fa21) in FIG. 8C) of the pieces of force information is multiplied by a predetermined constant (for example, 0.5) by the slave force correcting unit 39, and the multiplied value is subtracted from the present force information ((fa22) in FIG. 8C) by the slave force correcting unit 39 ((fa22)-0.5×((fa22)−(fa21)) in FIG. 8C) to make it possible to correct the force information by the slave force correcting unit 39.

(When "Force Information" is Selected by the Detecting Method Selecting Unit 34)

In the force correction section detecting unit 27 and the slave force correction section detecting unit 40, by using pieces of force information inputted from the force information acquiring unit 26 and the master force information acquiring unit 10 to the force correction section detecting unit 27 and the slave force correction section detecting unit 40, a force correction section (force correction zone) in the force information is detected by the force correction section detecting unit 27 and the slave force correction section detecting unit 40, and the pieces of force information detected by the force correction section detecting unit 27 and the slave force correction section detecting unit 40 are outputted from the force correction section detecting unit 27 and the slave force correction section detecting unit 40 to the slave control unit 24.

Figure 12A:
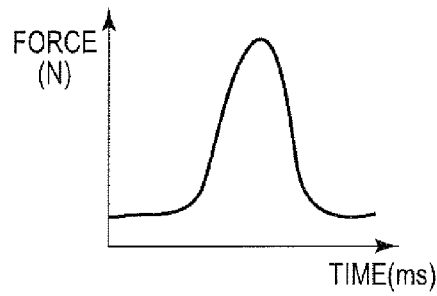
FIG. 12A is a graph showing a relationship between a force detected at a slave manipulator and a time to explain that a force increasing section is detected to increase a force in the third embodiment (when "force information" is selected) of the present invention.
Figure 12B:
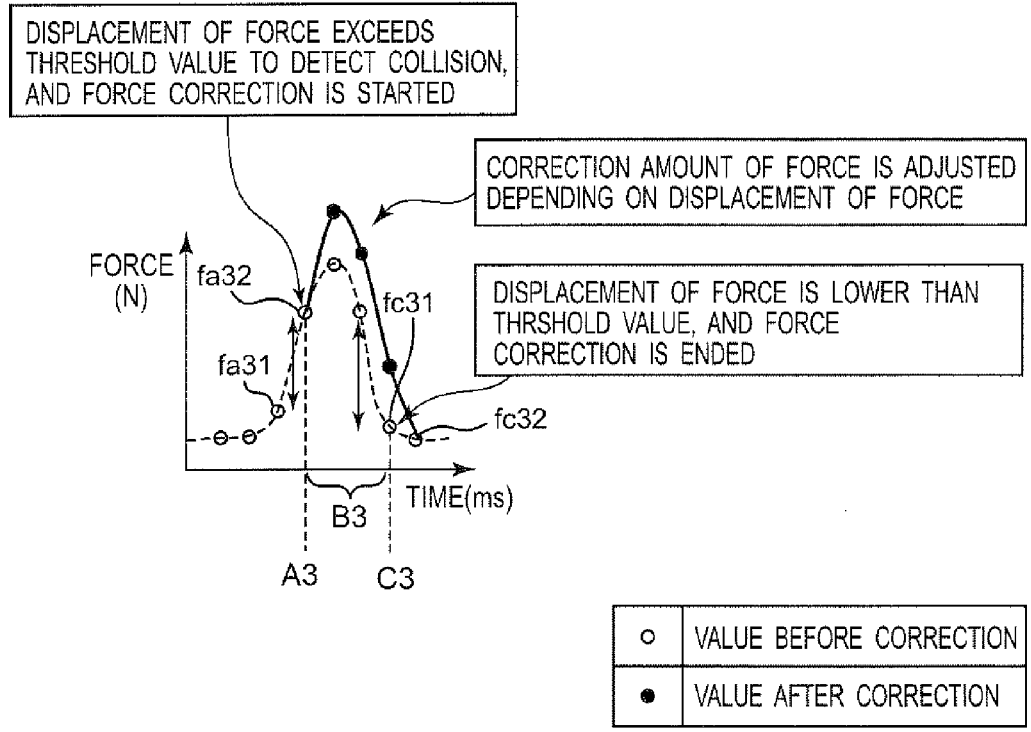
FIG. 12B is an explanatory view including a graph showing a relationship between a force transmitted to a master manipulator and a time to explain that the force increasing section is detected to increase a force in the third embodiment (when "force information" is selected) of the present invention.
Figure 13A:
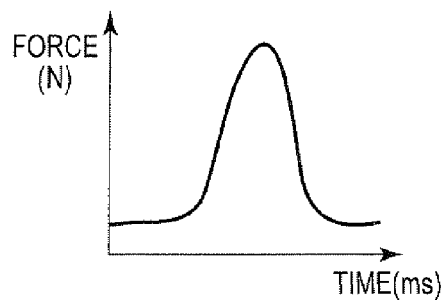
FIG. 13A is an explanatory view including a graph showing a relationship between a force detected at a master manipulator and a time to explain that a force reducing section is detected to reduce a force in the third embodiment (when "force information" is selected) of the present invention.
Figure 13B:
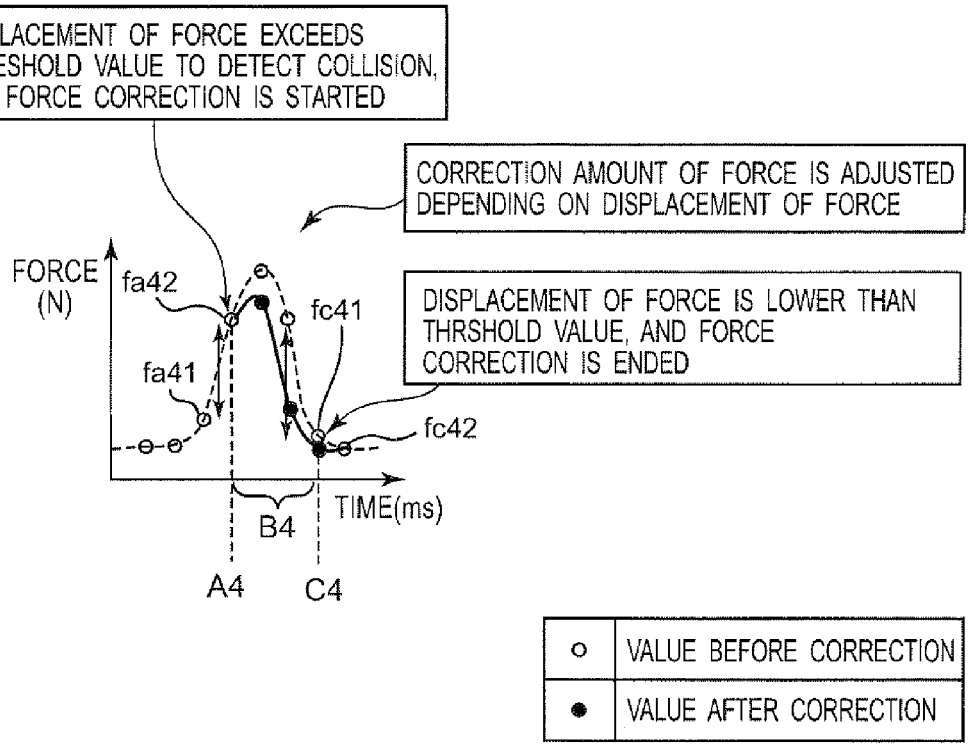
FIG. 13B is an explanatory view including a graph showing a relationship between a force transmitted to a slave manipulator and a time to explain that a force reducing section is detected to reduce a force in the third embodiment (when "force information" is selected) of the present invention.

A method of detecting a force correction section (force correction zone) will be described below with reference to FIGS. 12A to 13B. FIG. 12A shows the force information acquired by the force information acquiring unit 26, and FIG. 13A shows the force information acquired by the master force information acquiring unit 10. FIG. 12B shows force information transmitted to the master manipulator 9 after force correction, FIG. 13B shows force information transmitted to the slave manipulator 32 after force correction. A broken line and blank circles indicate values that have not been corrected, and a solid line and solid black circles indicate corrected values.

When, on the basis of the force information acquired at the predetermined time intervals by the force information acquiring unit 26, the force correction section detecting unit 27 and the slave force correction section detecting unit 40 determine that a displacement of the pieces of force information ((fa32)−(fa31) in FIG. 12B and (fa42)−(fa41) in FIG. 13B) exceeds a threshold value (for example, 1.0 N), the force correction section detecting unit 27 and the slave force correction section detecting unit 40 consequently detect that the object 102 gripped with the slave hand 71 of the slave manipulator 32 collides with the target object 103, and the force information is detected as a "force correction section" (force correction zone) by the force correction section detecting unit 27 and the slave force correction section detecting unit 40. The force information detected as the "force correction section" (force correction zone) by the force correction section detecting unit 27 and the slave force correction section detecting unit 40, in the case where the force correction section detecting unit 27 and the slave force correction section detecting unit 40 determine that the displacement of the pieces of force information acquired by the force information acquiring unit 26 exceeds a threshold value, is detected as an "increase" by the force correction section detecting unit 27 and the slave force correction section detecting unit 40. When the force correction section detecting unit 27 and the slave force correction section detecting unit 40 determine that the displacement of the pieces of force information acquired by the master force information acquiring unit 10 exceeds the threshold value, the force information detected as the "force correction section" (force correction zone) is detected as a "decrease" by the force correction section detecting unit 27 and the slave force correction section detecting unit 40. On the other hand, the force correction section detecting unit 27 and the slave force correction section detecting unit 40 determine that the displacement of the pieces of force information does not exceed the threshold value, a force correction section is detected as "no change" by the force correction section detecting unit 27 and the slave force correction section detecting unit 40.

Thus, by the force correction section detecting unit 27 and the slave force correction section detecting unit 40, a point of time (point of time A3 in FIG. 12B and point of time A4 in FIG. 13B) at which the displacement of the pieces of force information acquired by the force information acquiring unit 26 exceeds the threshold value is defined as "force correction start time". By the force correction section detecting unit 27 and the slave force correction section detecting unit 40, a point of time (point of time C3 in FIG. 12B and point of time C4 in FIG. 13B) at which a displacement ((fc32)−(fc31) in FIG. 12B and (fc42)−(fc41) in FIG. 13B) of the pieces of force information acquired by the force information acquiring unit 26 is lower than a threshold value (for example −1.0 N) is defined as "force correction end time". A zone from the "force correction start time" to the "force correction end time" is defined as a "force correction section" (force correction zone) (zone B3 in FIG. 12B and zone B4 in FIG. 13B) by the force correction section detecting unit 27 and the slave force correction section detecting unit 40.

The force correcting unit 25, on the basis of the detected force information inputted from the slave control unit 24 to the force correcting unit 25, as the force information of the "force correction section" (force correction zone), information obtained by correcting the force information is outputted to the slave control unit 24. On the other hand, as information of "no change", the force information is outputted to the slave control unit 24 without being changed. In a method of correcting force information, the displacement ((fa32)−(fa31) in FIG. 12b) of the pieces of force information is multiplied by a predetermined constant (for example, 0.5) by the force correcting unit 25, and the multiplied value is added to the present force information ((fa32) in FIG. 12B) by the force correcting unit 25 ((fa32)+0.5×((fa32)−(fa31)) in FIG. 12B) to make it possible to correct the force information by the force correcting unit 25.

The slave force correcting unit 39, on the basis of the detected force information inputted from the slave control unit 24 to the slave force correcting unit 39, as the force information of the "force correction section" (force correction zone), information obtained by correcting the force information is outputted to the slave control unit 24. On the other hand, as information of "no change", the force information is outputted to the slave control unit 24 without being changed. In a method of correcting the force information, the displacement ((fa42)−(fa41) in FIG. 13b) of the pieces of force information is multiplied by a predetermined constant (for example, 0.5) by the slave force correcting unit 39, and the multiplied value is subtracted from the present force information ((fa42) in FIG. 13B) by the slave force correcting unit 39 ((fa42)−0.5×((fa42)−(fa41)) in FIG. 13B) to make it possible to correct the force information by the slave force correcting unit 39.

(When "Speed Information" is Selected by the Detecting Method Selecting Unit 34)

In the force correction section detecting unit 27 and the slave force correction section detecting unit 40, by using the speed information inputted from the speed information acquiring unit 28 to the force correction section detecting unit 27, a force correction section (force correction zone) in the force information is detected, and the force information detected by the force correction section detecting unit 27 is outputted from the force correction section detecting unit 27 to the slave control unit 24.

Figure 14A:
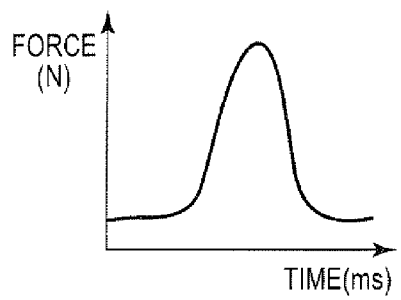
FIG. 14A is a graph showing a relationship between a force detected at a slave manipulator and a time to explain that a force increasing section is detected to increase a force in the third embodiment (when "speed information" is selected) of the present invention.
Figure 14B:
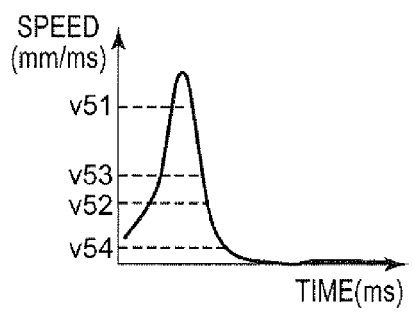
FIG. 14B is a graph showing a relationship between a speed detected at a slave manipulator and a time to explain that a force increasing section is detected to increase a force in the third embodiment (when "speed information" is selected) of the present invention.
Figure 14C:
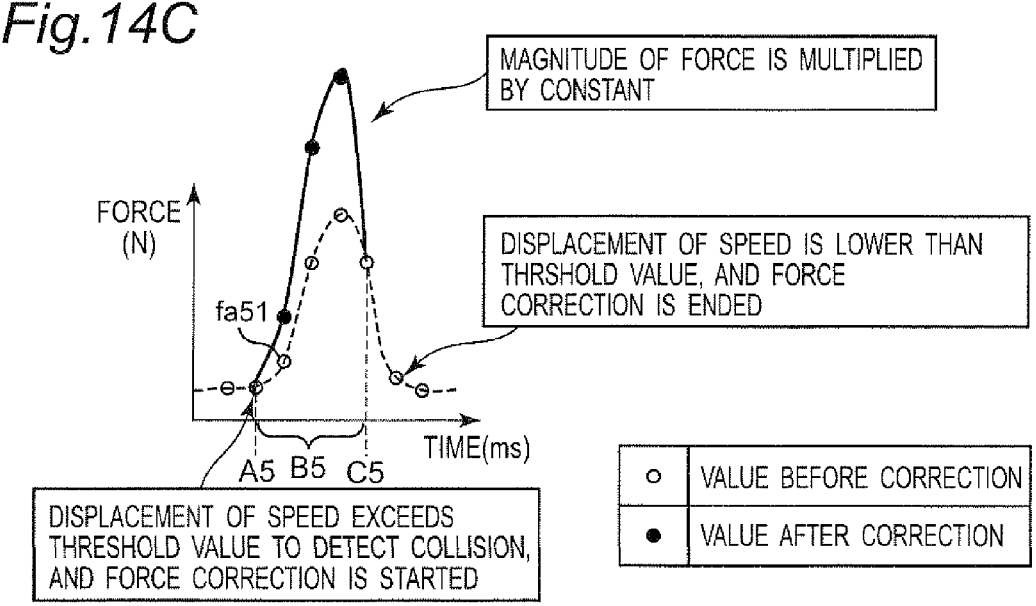
FIG. 14C is an explanatory view including a graph showing a relationship between a force transmitted to a master manipulator and a time to explain that the force increasing section is detected to increase a force in the third embodiment (when "speed information" is selected) of the present invention.
Figure 15A:
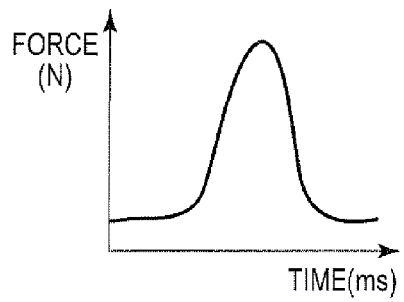
FIG. 15A is a graph showing a relationship between a force detected at a master manipulator and a time to explain that a force reducing section is detected to reduce a force in the third embodiment (when "speed information" is selected) of the present invention.
Figure 15B:
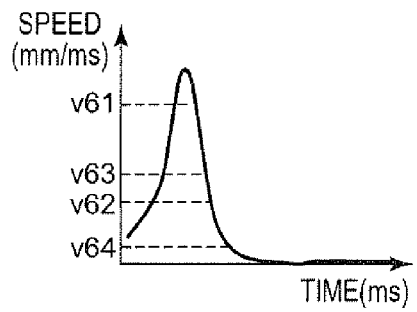
FIG. 15B is a graph showing a relationship between a speed detected at a slave manipulator and a time to explain that the force reducing section is detected to reduce a force in the third embodiment (when "speed information" is selected) of the present invention.
Figure 15C:
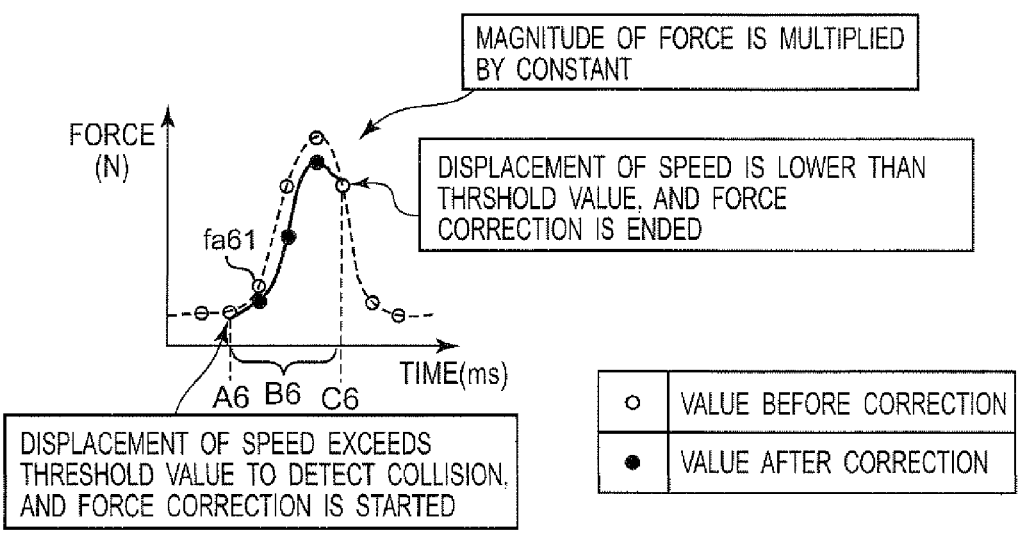
FIG. 15C is an explanatory view including a graph showing a relationship between a force transmitted to a slave manipulator and a time to explain that the force reducing section is detected to reduce a force in the third embodiment (when "speed information" is selected) of the present invention.

A method of detecting the force correction section (force correction zone) will be described below with reference to FIGS. 14A to 15C. FIG. 14A shows the force information acquired by the force information acquiring unit 26, FIG. 15A shows the force information acquired by the master force information acquiring unit 10, and FIGS. 14B and 15B show the speed information acquired by the speed information acquiring unit 28. FIG. 14C shows the force information transmitted to the master manipulator 9 after force correction, FIG. 15C shows force information transmitted to the slave manipulator 32 after force correction. A broken line and blank circles indicate values that have not been corrected, and a solid line and solid black circles indicate corrected values.

When, on the basis of the speed information acquired at the predetermined time intervals by the speed information acquiring unit 28, the force correction section detecting unit 27 and the slave force correction section detecting unit 40 determine that a displacement of the pieces of speed information ((v52)−(v51) in FIG. 14B and (v62)−(v61) in FIG. 15B) exceeds a threshold value (for example, −0.01 mm/ms), the force correction section detecting unit 27 and the slave force correction section detecting unit 40 consequently detect that the object 102 gripped with the slave hand 71 of the slave manipulator 32 collides with the target object 103. A point of time at which the speed information (v52) is acquired is detected as a "force correction section" (force correction zone) by the force correction section detecting unit 27 and the slave force correction section detecting unit 40. The force information detected as the "force correction section" (force correction zone), in the case where the force correction section detecting unit 27 and the slave force correction section detecting unit 40 determine that the displacement of the pieces of force information acquired by the force information acquiring unit 26 exceeds a threshold value (for example, 1.0 N), is detected as an "increase" by the force correction section detecting unit 27 and the slave force correction section detecting unit 40. When the force correction section detecting unit 27 and the slave force correction section detecting unit 40 determine that the displacement of the pieces of force information acquired by the master force information acquiring unit 10 exceeds the threshold value, the force information detected as the "force correction section" (force correction zone) is detected as a "decrease" by the force correction section detecting unit 27 and the slave force correction section detecting unit 40. On the other hand, the force correction section detecting unit 27 and the slave force correction section detecting unit 40 determine that the displacement of the pieces of speed information does not exceed the threshold value, a force correction section is detected as "no change" by the force correction section detecting unit 27 and the slave force correction section detecting unit 40.

Thus, by the force correction section detecting unit 27 and the slave force correction section detecting unit 40, a point of time at which the displacement of the pieces of speed information acquired by the speed information acquiring unit 28 exceeds the threshold value (point of time A5 in FIG. 14C and point of time A6 in FIG. 15C) is defined as "force correction start time". By the force correction section detecting unit 27 and the slave force correction section detecting unit 40, a point of time (point of time C5 in FIG. 14C and point of time C6 in FIG. 15C) at which a displacement ((v54)−(v53)) in FIG. 14B and (v64)−(v63) in FIG. 15B) of the pieces of speed information acquired by the speed information acquiring unit 28 is lower than a threshold value (for example −0.01 mm/ms) is defined as "force correction end time". A zone from the "force correction start time" to the "force correction end time" is defined as a "force correction section" (force correction zone) (zone B5 in FIG. 14C and zone B6 in FIG. 15C) by the force correction section detecting unit 27 and the slave force correction section detecting unit 40.

The force correcting unit 25, on the basis of the detected force information inputted from the slave control unit 24 to the force correcting unit 25, as the force information of the "force correction section" (force correction zone), information obtained by correcting the force information is outputted to the slave control unit 24. On the other hand, as information of "no change", the force information is outputted to the slave control unit 24 without being changed. In a method of correcting the force information, force information is multiplied by a constant by the force correcting unit 25 (1.5×(fa51) in FIG. 14B) to make it possible to correct the force information by the force correcting unit 25.

The slave force correcting unit 39, on the basis of the detected force information inputted from the slave control unit 24 to the slave force correcting unit 39, as the force information of the "force correction section" (force correction zone), information obtained by correcting the force information is outputted to the slave control unit 24. On the other hand, as information of "no change", the force information is outputted to the slave control unit 24 without being changed. In the method of correcting the force information, force information is multiplied by a constant by the slave force correcting unit 39 (0.5×(fa61) in FIG. 15B) to make it possible to correct the force information by the slave force correcting unit 39.

(When "Reference" is Selected by the Detecting Method Selecting Unit 34)

In the force correction section detecting unit 27 and the slave force correction section detecting unit 40, by using pieces of force information inputted from the reference information storing unit 41, the force information acquiring unit 26, and the master force information acquiring unit 10 to the force correction section detecting unit 27 and speed information inputted from the speed information acquiring unit 28 to the force correction section detecting unit 27, a force correction section (force correction zone) in the force information is detected by the force correction section detecting unit 27, and the pieces of force information detected by the force correction section detecting unit 27 are outputted from the force correction section detecting unit 27 to the slave control unit 24.

Figure 16A:
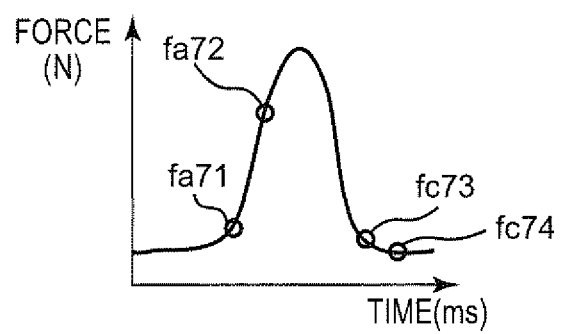
FIG. 16A is a graph showing a relationship between a force detected at a slave manipulator and a time to explain that a force increasing section is detected to increase a force in the third embodiment (when "reference" is selected) of the present invention.
Figure 16B:
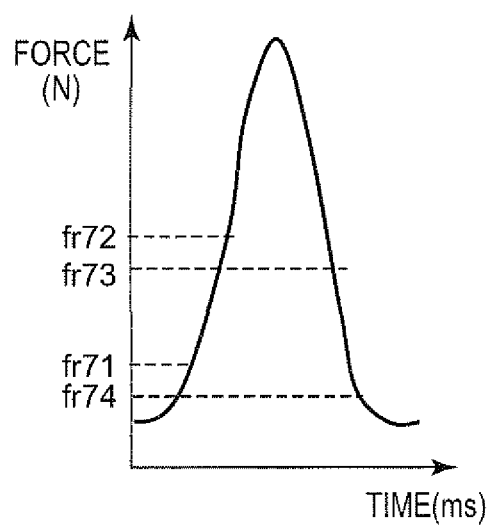
FIG. 16B is a graph showing a relationship between a reference (force) detected at a slave manipulator and a time to explain that the force increasing section is detected to increase a force in the third embodiment (when the "reference" is selected) of the present invention.
Figure 16C:
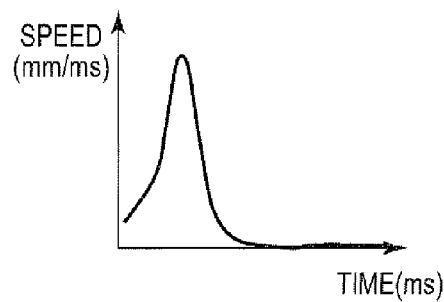
FIG. 16C is a graph showing a relationship between a reference (speed) detected at a slave manipulator and a time to explain that the force increasing section is detected to increase a force in the third embodiment (when the "reference" is selected) of the present invention.
Figure 16D:
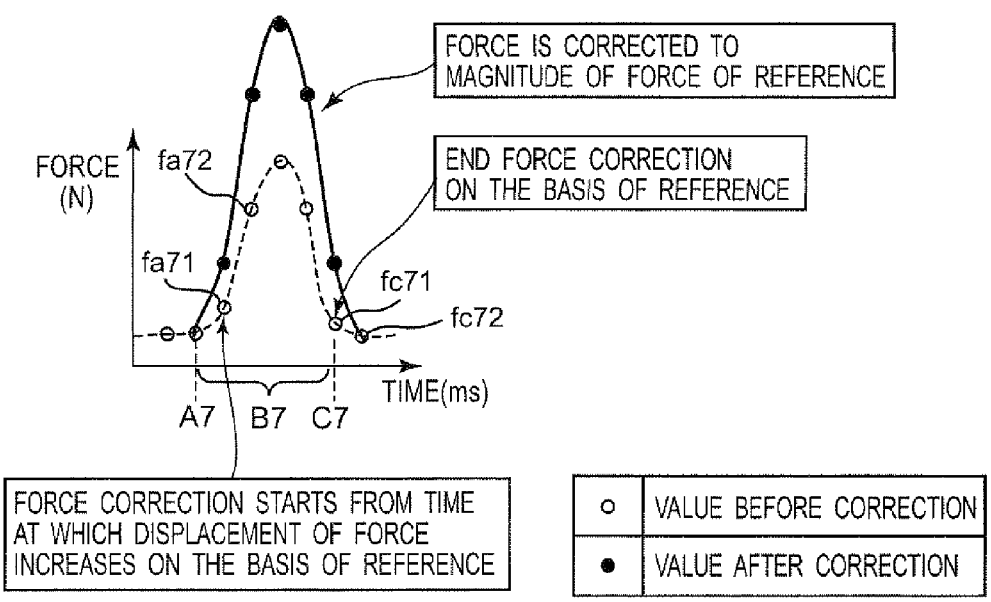
FIG. 16D is an explanatory view showing a graph showing a relationship between a force transmitted to a master manipulator and a time to explain that a force increasing section is detected to increase a force in the third embodiment (when the "reference" is selected) of the present invention.
Figure 17A:
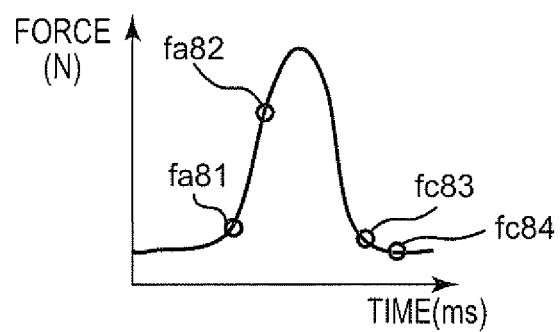
FIG. 17A is a graph showing a relationship between a force detected at a master manipulator and a time to explain that a force reducing section is detected to reduce a force in the third embodiment (when the "reference" is selected) of the present invention.
Figure 17B:
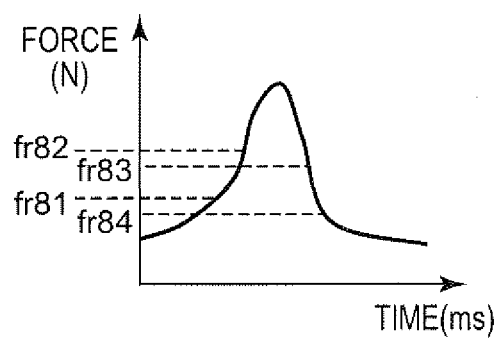
FIG. 17B is a graph showing a relationship between a reference (force) detected at a master manipulator and a time to explain that a force reducing section is detected to reduce a force in the third embodiment (when the "reference" is selected) of the present invention.
Figure 17C:
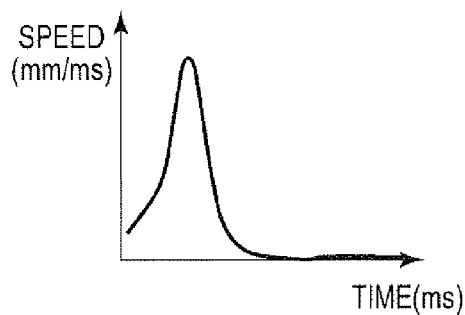
FIG. 17C is a graph showing a relationship between a reference (speed) detected at a master manipulator and a time to explain that the force reducing section is detected to reduce a force in the third embodiment (when the "reference" is selected) of the present invention.
Figure 17D:
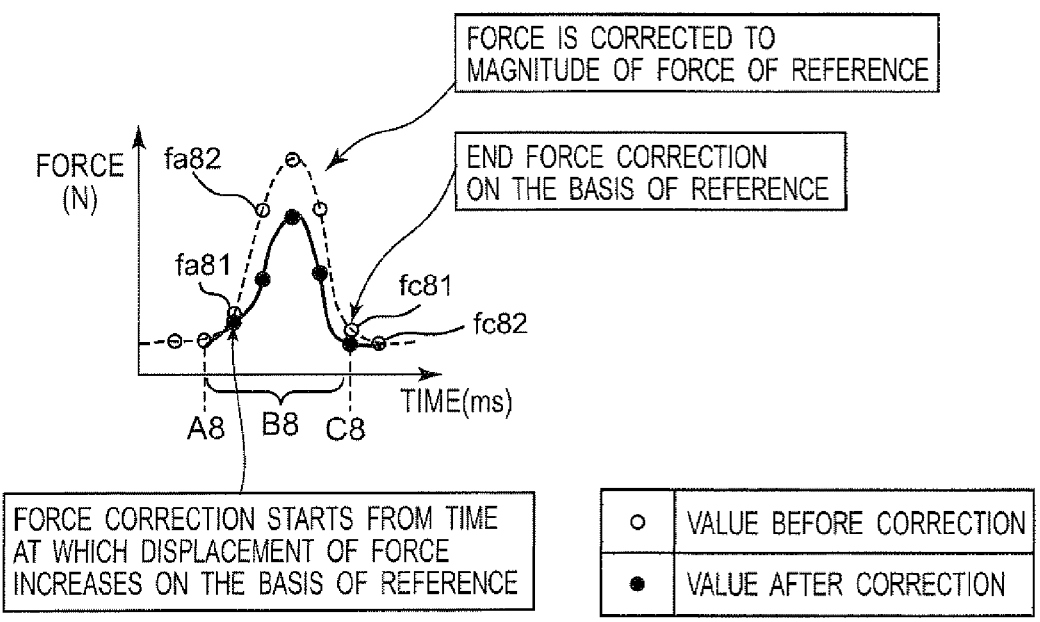
FIG. 17D is an explanatory view including a graph showing a relationship between a force transmitted to a slave manipulator and a time to explain that a force reducing section is detected to reduce a force in the third embodiment (when the "reference" is selected) of the present invention.

A method of detecting a force correction section (force correction zone) will be described below with reference to FIGS. 16A to 17D. FIGS. 16A and 17A are pieces of force information acquired by the force information acquiring unit 26. FIGS. 16B and 17B show pieces of force information of a slave reference and a master reference, and FIGS. 16C and 17C show pieces of speed information of the slave reference and the master reference. FIGS. 16D and 17D show pieces of force information transmitted to the master manipulator 9 and the slave manipulator 32 after force correction. A broken line and blank circles indicate values that have not been corrected, and a solid line and solid black circles indicate corrected values.

Force information acquired when the force correction section detecting unit 27 and the slave force correction section detecting unit 40 determine that a displacement ((fr72)−(fr71) in FIG. 16B and (fr82)−(fr81) in FIG. 17B) of the pieces of force information of the references exceeds a threshold value (for example, 1.0 N) is matched with a displacement of pieces of force information acquired by the force information acquiring unit 26 and the master force information acquiring unit 10 by the force correction section detecting unit 27 and the slave force correction section detecting unit 40, and force information having the same tendency as described above (when the displacement falls within a range obtained by multiplying the displacement of the pieces of force information of the references by a constant (for example, 0.5 and 2) (point of time at which 0.5×((fr72)−(fr71))<((f72)−(f71))<2×((fr72)−(fr71) in FIG. 17) is satisfied and point of time at which 0.5×((fr82)−(fr81))<((f82)−(f81))<2×((fr82)−(fr81)) in FIG. 18 is satisfied)) is detected by the force correction section detecting unit 27 and the slave force correction section detecting unit 40.

On the basis of the pieces of force information detected as described above, the force correction section detecting unit 27 and the slave force correction section detecting unit 40 detect that the object 102 gripped with the slave hand 71 of the slave manipulator 32 collides with the target object 103, and the force correction section detecting unit 27 and the slave force correction section detecting unit 40 detect the information as a "force correction section" (force correction zone). On the other hand, when the force correction section detecting unit 27 and the slave force correction section detecting unit 40 determine that the displacement of the pieces of force information does not have the same tendency, a force correction section is detected as "no change" by the force correction section detecting unit 27 and the slave force correction section detecting unit 40. In the pieces of force information detected as the "force correction section" (force correction zone) by the force correction section detecting unit 27 and the slave force correction section detecting unit 40, when the force correction section detecting unit 27 and the slave force correction section detecting unit 40 determine that the displacement of the pieces of force information acquired by the force information acquiring unit 26 can be matched with the displacement of the pieces of force information of the slave reference, the "force correction section" is detected as an "increase" by the force correction section detecting unit 27 and the slave force correction section detecting unit 40. On the other hand, when the force correction section detecting unit 27 and the slave force correction section detecting unit 40 determines that the displacement of the pieces of force information acquired by the master force information acquiring unit 10 can be matched with the displacement of the pieces of force information of the master reference, the "force correction section" is detected as a "decrease" by the force correction section detecting unit 27 and the slave force correction section detecting unit 40.

Thus, by the force correction section detecting unit 27 and the slave force correction section detecting unit 40, a point of time at which the pieces of force information acquired by the force information acquiring unit 26 and the master force information acquiring unit 10 have the same tendency as that of the pieces of force information of the reference (point of time A7 in FIG. 16D and point of time A8 in FIG. 17D) is defined as "force correction start time". On the other hand, by the force correction section detecting unit 27 and the slave force correction section detecting unit 40, a point of time (point of time C7 in FIG. 16D and point of time C8 in FIG. 17D) at which force information acquired when the force correction section detecting unit 27 and the slave force correction section detecting unit 40 determine that a displacement ((fr74)−(fr73) in FIG. 16B and (fr84)−(fr83) in FIG. 17B) of the pieces of force information of the reference is lower than a threshold value (for example −1.0 N) has the same tendency as that of the displacement of the pieces of force information acquired by the force information acquiring unit 26 and the master force information acquiring unit 10 is defined as "force correction end time". A zone from the "force correction start time" to the "force correction end time" is defined as a "force correction section" (force correction zone) by the force correction section detecting unit 27 and the slave force correction section detecting unit 40 (zone B7 in FIG. 16D and zone B8 in FIG. 17D).

The force correcting unit 25, on the basis of the detected force information inputted from the slave control unit 24 to the force correcting unit 25, as the force information of the "force correction section" (force correction zone), information obtained by correcting the force information is outputted to the slave control unit 24. On the other hand, as information of "no change", the force information is outputted to the slave control unit 24 without being changed. In a method of correcting the force information, the force information is increased to the same value of the force information of the reference by the force correcting unit 25.

The slave force correcting unit 39, on the basis of the detected force information inputted from the slave control unit 24 to the slave force correcting unit 39, as the force information of the "force correction section" (force correction zone), information obtained by correcting the force information is outputted to the slave control unit 24. On the other hand, as information of "no change", the force information is outputted to the slave control unit 24 without being changed. In the method of correcting the force information, the force information is decreased to the same value of the force information of the reference.

The information of the reference is provided in advance by, for example, a manufacturer that manufacture a control apparatus for a master-slave robot, and can be stored in advance in the reference information storing unit 41. The information of the reference can also be added, and the information of the reference of the force information or the information of the reference of the speed information acquired by a pre-experiment can be additionally stored in the reference information storing unit 41 by using the master input/output IF 7. A situation in which the slave manipulator 32 easily acquires the force information is used as the information of the reference, in an insertion experiment of the flexible board 104 that exhibits conventional experiment results in FIGS. 29A to 31, to use information of a grip position of 5 mm of the flexible board 104 as the information of the reference is more advantageous than to use information of a grip position of 10 mm of the flexible board 104 as the information of the reference. The information of the reference is stored in the reference information storing unit 41 and held in a database as shown in FIG. 18. Information of a specific reference to be used is used as information of a reference in a manipulation such that an operator determines the object 102 or the grip position with a button by using the master input/output IF 7.

Figure 19:
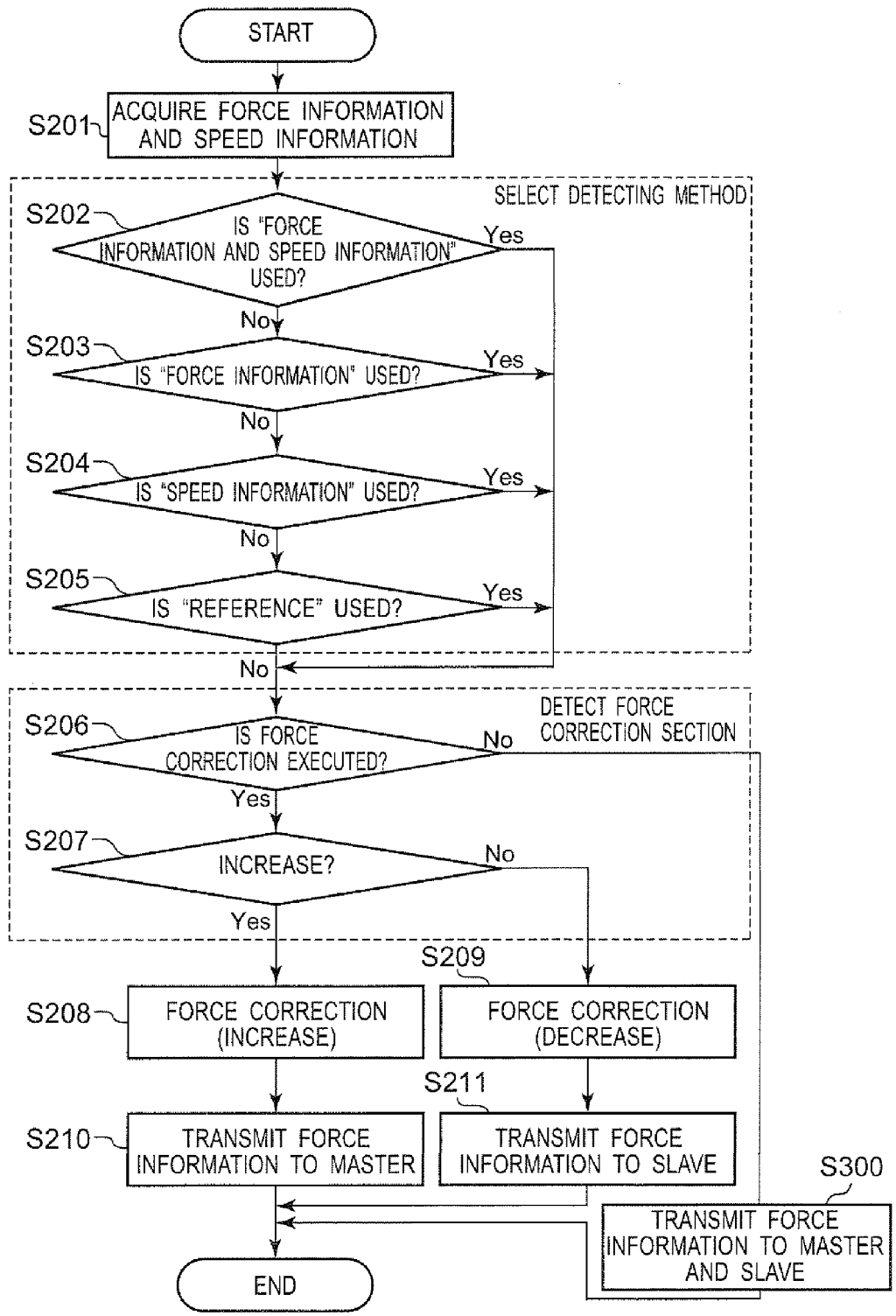
FIG. 19 is a flowchart showing a flow of processes from when force information and speed information are acquired to when force correction is performed in the third embodiment of the present invention.

FIG. 19 is a flowchart showing operations performed until force correction is performed after force information and speed information are acquired in the third embodiment of the present invention.

In step S201, pieces of force information are acquired by the force information acquiring unit 26 and the master force information acquiring unit 10, and speed information is acquired by the speed information acquiring unit 28.

In step S202, the detecting method selecting unit 34 determines whether "force information and speed information" is selected as information used in the force correction section detecting unit 27 and the slave force correction section detecting unit 40 and information used in the force correcting unit 25 and the slave force correcting unit 39. When the detecting method selecting unit 34 determines the "force information and speed information" is selected by selecting and inputting by an operator a detecting method to the detecting method selecting unit 34 by using the master input/output IF 7, the control flow shifts to step S206. When the detecting method selecting unit 34 determines that information except for the "force information and speed information" is selected, the control flow shifts to step S203.

In step S203, the detecting method selecting unit determines whether "force information" is selected as information used in the force correction section detecting unit 27 and the slave force correction section detecting unit 40 and information used in the force correcting unit and the slave force correcting unit 39. When the detecting method selecting unit 34 determines the "force information" is selected by selecting and inputting by an operator a detecting method to the detecting method selecting unit 34 by using the master input/output IF 7, the control flow shifts to step S206. When the detecting method selecting unit 34 determines that information except for the "force information" is selected, the control flow shifts to step S204.

In step S204, the detecting method selecting unit determines whether "speed information" is selected as information used in the force correction section detecting unit 27 and the slave force correction section detecting unit 40 and information used in the force correcting unit and the slave force correcting unit 39. When the detecting method selecting unit 34 determines the "speed information" is selected by selecting and inputting by an operator a detecting method to the detecting method selecting unit 34 by using the master input/output IF 7, the control flow shifts to step S206. When the detecting method selecting unit 34 determines that information except for the "speed information" is selected, the control flow shifts to step S205.

In step S205, the detecting method selecting unit 34 determines whether "reference" is selected as information used in the force correction section detecting unit 27 and the slave force correction section detecting unit 40 and information used in the force correcting unit 25 and the slave force correcting unit 39. When the detecting method selecting unit 34 determines the "reference" is selected by selecting and inputting by an operator a detecting method to the detecting method selecting unit 34 by using the master input/output IF 7, the control flow shifts to step S206. A determination by the detecting method selecting unit 34 that information except for the "reference" is selected means that any one of the pieces of information in step S202 to step 205 is not selected. This case, in the above description, corresponds to a case in which a task experience and a task difficulty are not selected. More specifically, "force information and speed information" is automatically selected in the detecting method selecting unit 34 to shift the flow to step S206.

In step S206, by using the information selected by the detecting method selecting unit 34, it is detected in the force correction section detecting unit 27 and the slave force correction section detecting unit 40 whether force correction is performed. When the force correction section detecting unit 27 and the slave force correction section detecting unit 40 detect that force correction is performed, the control flow shifts to step S207. When the force correction section detecting unit 27 and the slave force correction section detecting unit 40 detect that force correction is not performed, the control flow shifts to step S300.

In step S300, force information in which force correction is not performed is directly transmitted from the force correcting unit 25 to the master manipulator 9 and the slave manipulator 32 to end a series of flows.

In step S207, the force correction section detecting unit 27 and the slave force correction section detecting unit 40 detect that force correction is performed. As the force correction, it is detected whether the force information is increased or decreased. At a section (zone) detected as "no change" by the force correction section detecting unit 27 and the slave force correction section detecting unit 40, the force information is transmitted by the force correction section detecting unit 27 and the slave force correction section detecting unit 40 without being corrected. At a section (zone) detected as an "increase" by the force correction section detecting unit 27 and the slave force correction section detecting unit 40, the control flow shifts to step S208. At a section (zone) detected as not an "increase" but a "decrease" by the force correction section detecting unit 27 and the slave force correction section detecting unit 40, the control flow shifts to step S209.

In step S208, after an absolute value of the force information is increased in the force correcting unit 25, the control flow shifts to step S210.

In step S210, the increased force information is transmitted from the force correcting unit 25 to the master manipulator 9 to end a series of flows.

On the other hand, in step S209, at a section (zone) detected as a "decrease" by the force correction section detecting unit 27 and the slave force correction section detecting unit 40, after the absolute value of the force information is decreased in the slave force correcting unit 39, the control flow shifts to step S211.

In step S211, the decreased force information is transmitted from the slave force correcting unit 39 to the slave manipulator 32 to end a series of flows.

<<Effects of Third Embodiment>>

Since procedures of correcting a force can be changed in accordance with the capability of an operator or the difficulty of a task, in comparison with the first embodiment and the second embodiment, the task can be more efficiently performed.

(Fourth Embodiment)

Figure 20A:
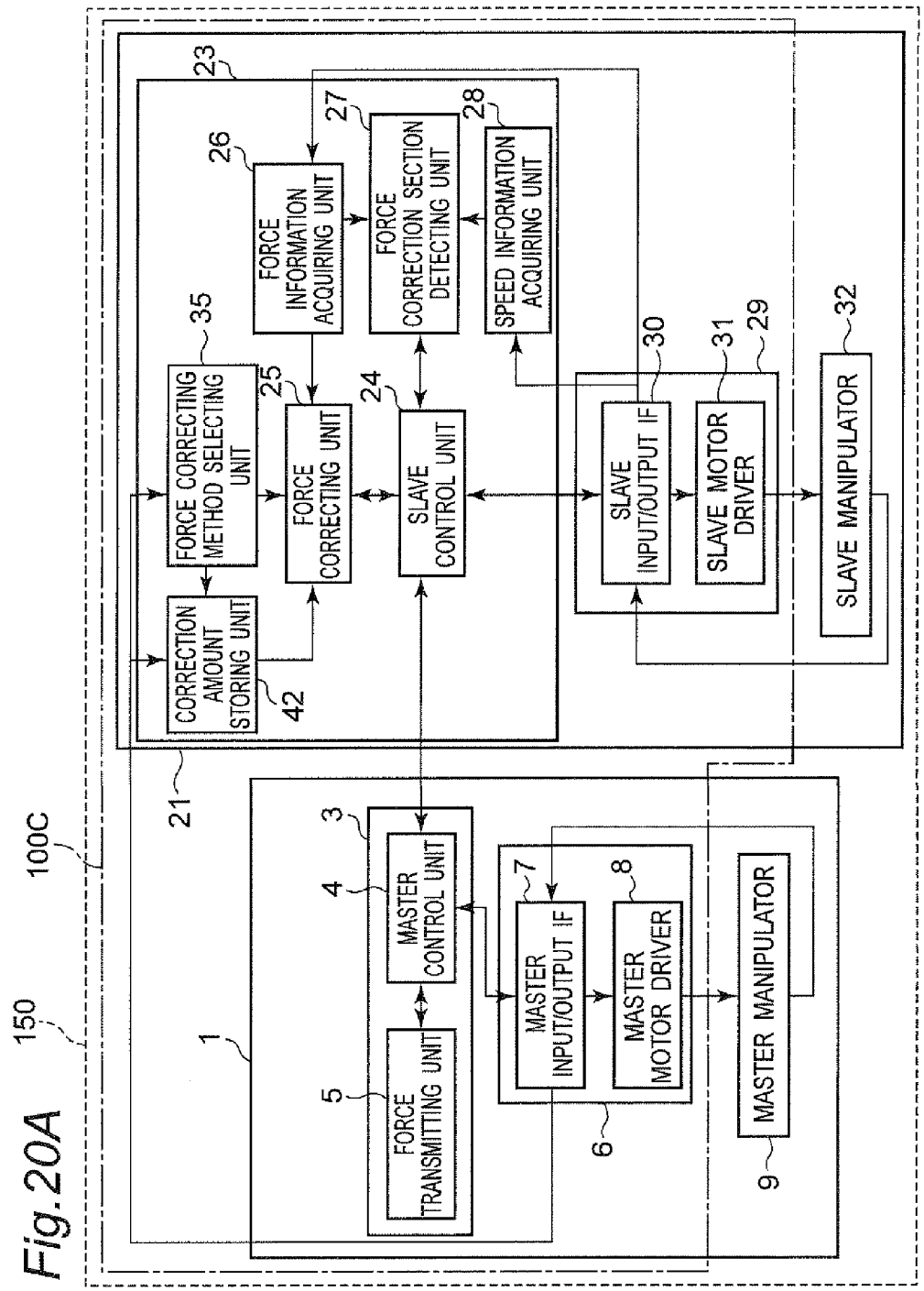
FIG. 20A is a block diagram of a master-slave robot in the fourth embodiment of the present invention.

FIGS. 20A and 20B are block diagrams showing a control apparatus 100C of the master-slave robot 150 according to the fourth embodiment of the present invention. Since the master robot system 1, the slave control unit 24, the force information acquiring unit 26, the force correction section detecting unit 27, the speed information acquiring unit 28, the slave peripheral device 29, and the slave manipulator 32 in the fourth embodiment of the present invention are the same as those in the first embodiment, common reference numerals denote common components to omit a description of the common components, and only different components will be described below in detail.

The master control device 3 includes the master control unit 4 and the force transmitting unit 5.

The slave control device 23 includes the slave control unit 24, the force correcting unit 25, the force information acquiring unit 26, the force correction section detecting unit 27, the speed information acquiring unit 28, a force correcting method selecting unit 35, and a correction amount storing unit 42.

In the force correcting method selecting unit 35, one of "object grip position information", "object flexibility information", and "master grip position information" is selected. Selection information selected by the force correcting method selecting unit 35 is outputted to the force correcting unit 25, and information used when the force correction is performed is designated by the force correcting unit 25 on the basis of the selection information. Since the force correcting unit 25 and the slave force correcting unit 39 differs depending on the selection information selected by the force correcting method selecting unit 35, an explanation will be made in units of pieces of selected information.

In a method of selecting each piece of information in the force correcting method selecting unit 35, when an operator (person), by using the master input/output IF 7 configured by a console panel or the like on which, for example, a plurality of buttons are arranged, manually depresses one of buttons corresponding to, respectively, the "object grip position information", the "object flexibility information", and the "master grip position information", the input information is selected by the force correcting method selecting unit 35 on the basis of information inputted by the depression. If the operator does not select any information, the "object grip position information" is automatically selected by the force correcting method selecting unit 35.

The correction amount storing unit 42 holds databases (databases in which relational information between information, such as information of a position at which the slave manipulator 32 grips the object 102, selected by the force correcting method selecting unit 35 and a correction amount is stored) depending on the information selected by the force correcting method selecting unit 35. The respective databases will be described later. Each of the databases determines a correction amount from the correction amount storing unit 42 by the force correcting unit 25 and the slave force correcting unit 39 depending on an input to the master input/output IF 7.

(When "Object Grip Position Information" is Selected by the Force Correcting Method Selecting Unit 35)

The force correcting unit 25 and the slave force correcting unit 39, on the basis of the force information inputted from the slave control unit 24 to the force correcting unit 25 and the slave force correcting unit 39, as the force information of the "force correction section" (force correction zone), information obtained by correcting the force information is outputted to the slave control unit 24. On the other hand, as information of "no change", the force information is outputted to the slave control unit 24 without being changed.

A functional difference between the force correcting unit 25 and the slave force correcting unit 39 will be described below. The force correcting unit 25 has a function of increasing a force transmitted to the master manipulator 9. On the other hand, the slave force correcting unit 39 has a function of decreasing the force transmitted to the slave manipulator 32.

Figure 21:
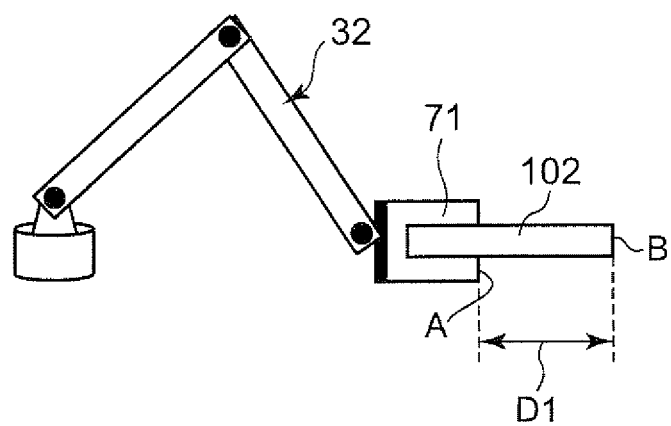
FIG. 21 is an explanatory view showing an object grip position in the fourth embodiment (when "object grip position information" is selected) of the present invention.

A method of correcting force information will be described with reference to FIGS. 21, 22A, and 22B. As an example, a case will be described in which a correction amount of force information is determined from the correction amount storing unit 42 by the force correcting unit 25 and the slave force correcting unit 39 depending on a type of an object and a grip position. Here, the grip position of the object, as shown in FIG. 21, when the slave manipulator 32 grips the object 102, indicates a distance D1 from a hand (slave hand 71) (A in FIG. 21) of the slave manipulator 32 to a distal end (B in FIG. 21) of the object 102.

As a method of acquiring an object grip position D1, a method of directly measuring the distance D1 with a measure etc. by a person and inputting the distance using the master input IF 7, or a method of measuring the distance D1 by image recognition using a camera, or the like may be conceived.

In this case, as an example, a procedure of measuring the object grip position D1 by image recognition to perform force correction will be described with reference to FIGS. 22A and 22B.

Figure 22A:
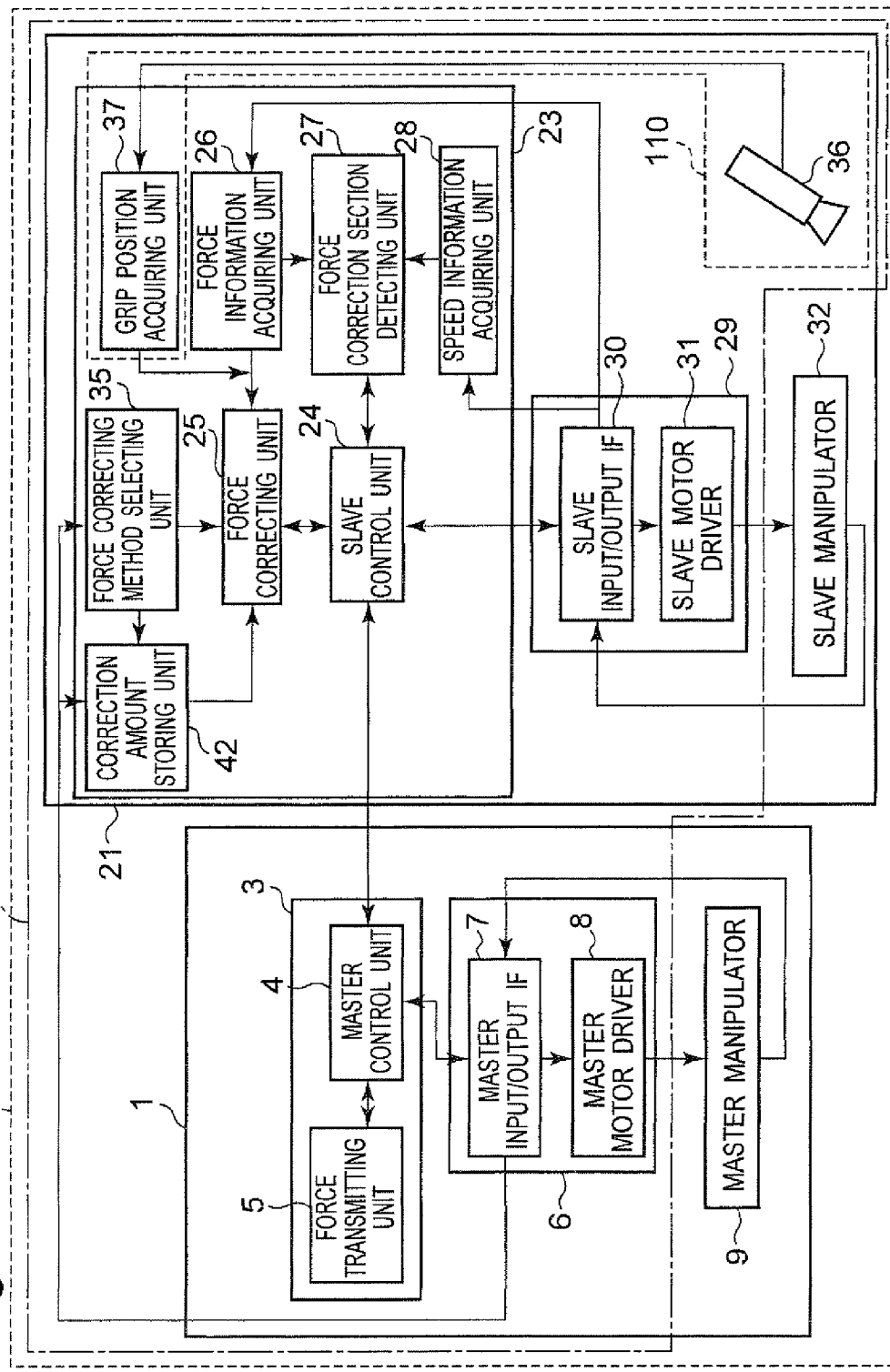
FIG. 22A is a block diagram of a master-slave robot in the fourth embodiment (when the "object grip position information" is selected) of the present invention.
Figure 22B:
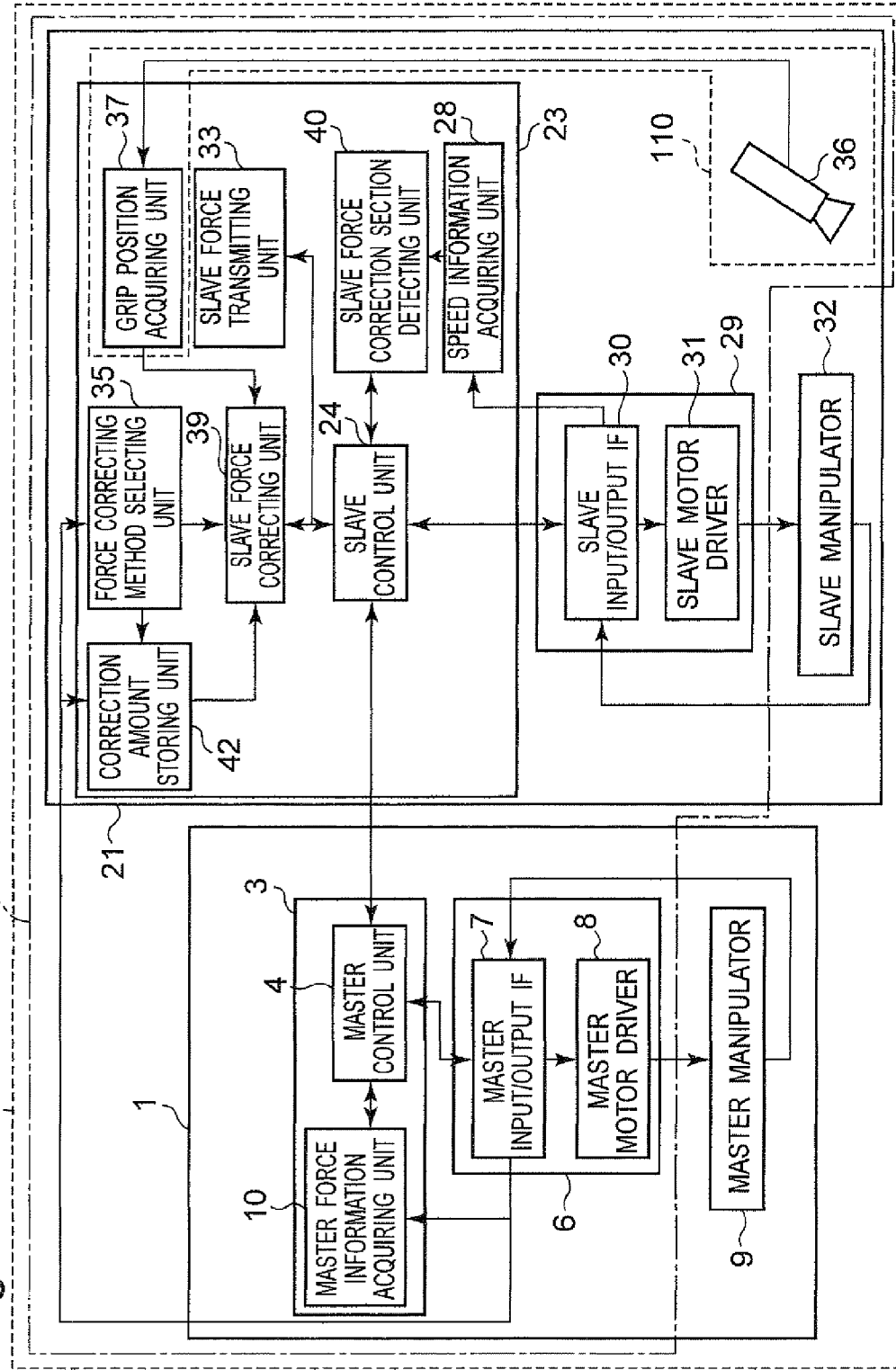
FIG. 22B is a block diagram of the master-slave robot in the fourth embodiment (when the "object grip position information" selected) of the present invention.

Since, in block diagrams showing the control apparatus 100D of the master-slave robot 150 in FIGS. 22A and 22B, the master robot system 1, the slave control unit 24, the force information acquiring unit 26, the force correction section detecting unit 27, the speed information acquiring unit 28, the slave peripheral device 29, and the slave manipulator 32 in FIG. 1 are the same as those in the first embodiment, common reference numerals denote common components to omit a description of the common components, and only different components will be described below in detail. Note that the configurations in FIGS. 20A and 20B are different from the configurations in FIGS. 22A and 22B in that an image-taking device 36 such as a camera and a grip position acquiring unit 37 connected to the image-taking device 36 are added. Here, the image-taking device and the grip position acquiring unit 37 configure an object grip position acquiring unit 110.

The image-taking device 36 such as a camera acquires an image in which the slave manipulator 32 grips the object 102 and outputs acquired image information to the grip position acquiring unit 37.

The grip position acquiring unit 37 calculates object grip position information on the basis of the image information acquired by the image-taking device 36 and outputs the object grip position information to the force correcting unit 25 and the slave force correcting unit 39. The force correcting unit 25 and the slave force correcting unit 39, by using the object grip position information from the grip position acquiring unit 37, calculate correction amounts by the force correcting unit 25 and the slave force correcting unit 39 from a database that is held in the correction amount storing unit 42 and that stores relationships among an object, a grip position, and a correction amount as shown in FIG. 23. In this case, an operator inputs a type (flexible board A, screw A, or the like in FIG. 23) of an object to be used to the correction amount storing unit 42 by using a button of the master input/output IF 7. On the basis of the information of the type of the object to be used inputted by the operator and the object grip position information from the grip position acquiring unit 37, the force correcting unit 25 and the slave force correcting unit 39 acquire the correction amounts from the correction amount storing unit 42. A value of the database in the correction amount storing unit increases to 1.2 times to 1.4 times in the flexible board A when the correction amount increases as the grip position is elongated to 5 mm to 10 mm. When the correction amount decreases, the value increases to 0.6 times to 0.8 times. In a flexible board B, as the grip position is elongated to 5 mm to 10 mm, the value increases to 1.5 times to 2.0 times when the correction amount increases. When the correction amount decreases, the value increases to 0.2 times to 0.5 times.

A determination whether the correction amount increases or decreases will be described below. When the force correction section detecting unit 27 and the slave force correction section detecting unit 40 determine that the displacement of the pieces of force information acquired by the force information acquiring unit 26 exceeds a threshold value (for example, 1.0 N), the force correction section detecting unit 27 and the slave force correction section detecting unit 40 perform detection as an "increase". When the force correction section detecting unit 27 and the slave force correction section detecting unit 40 determine that the displacement of the pieces of force information acquired by the master force information acquiring unit 10 exceeds a threshold value, the force correction section detecting unit 27 and the slave force correction section detecting unit 40 perform detection as a "decrease".

(When "Object Flexibility Information" is Selected by the Force Correcting Method Selecting Unit 35)

The force correcting unit 25 and the slave force correcting unit 39, on the basis of the force information inputted from the slave control unit 24 to the force correcting unit 25 and the slave force correcting unit 39, as the force information of the "force correction section" (force correction zone), output information obtained by correcting the force information to the slave control unit 24. On the other hand, as information of "no change", the force information is outputted to the slave control unit 24 without being changed.

Figure 24A:
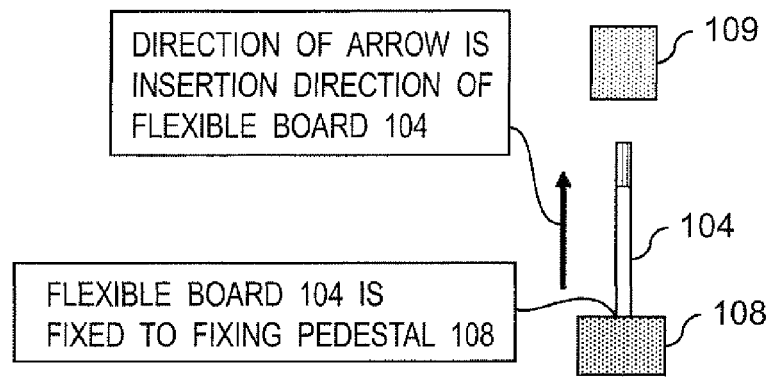
FIG. 24A is an explanatory view showing a method of measuring a buckling load of a flexible board in the fourth embodiment (when "object flexibility information" is selected) of the present invention.
Figure 24B:
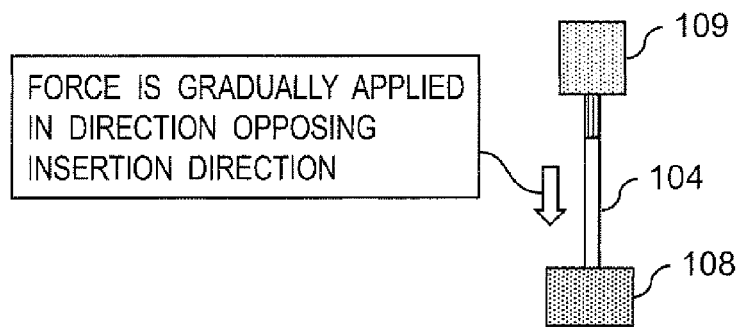
FIG. 24B is an explanatory view showing the method of measuring a buckling load of a flexible board in the fourth embodiment (when the "object flexibility information" is selected) of the present invention.
Figure 24C:
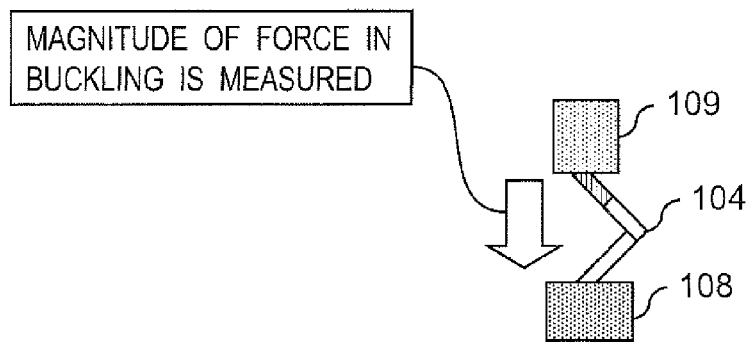
FIG. 24C is an explanatory view showing the method of measuring a buckling load of a flexible board in the fourth embodiment (when the "object flexibility information" is selected) of the present invention.

In a method of correcting the force information, depending on object flexibility information, the force correcting unit 25 and the slave force correcting unit 39 determine a correction amount of force information from the correction amount storing unit 42. An object flexibility means a buckling load of an object. An operator needs to measure the buckling load of the object in advance. The buckling load measured in advance and acquired is inputted to the correction amount storing unit 42 by the operator using the master input IF 7. A method of measuring a buckling load of an object will be described below with reference to FIGS. 24A to 24F. FIGS. 24A to 24C are lateral views obtained when the flexible board 104 is used, and FIGS. 24D to 24F are views obtained when the screw 107 is used.

Figure 24D:
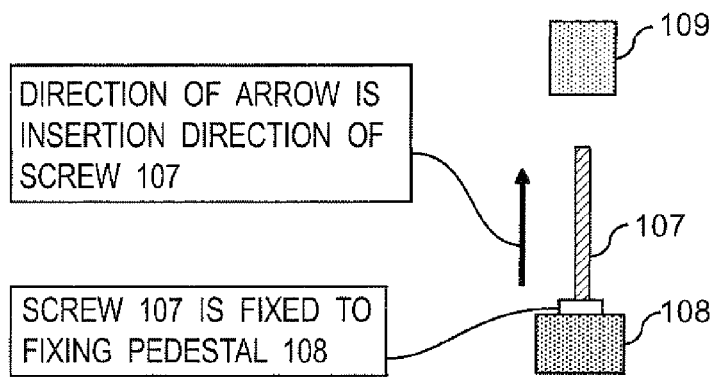
FIG. 24D is an explanatory view showing a method of measuring a buckling load of a screw in the fourth embodiment (when the "object flexibility information" is selected) of the present invention.

As shown in FIGS. 24A and 24D, an object is caused to uprise on a fixing pedestal 108, and an end portion on a side opposing an insertion direction of the object is fixed by the fixing pedestal 108.

Figure 24E:
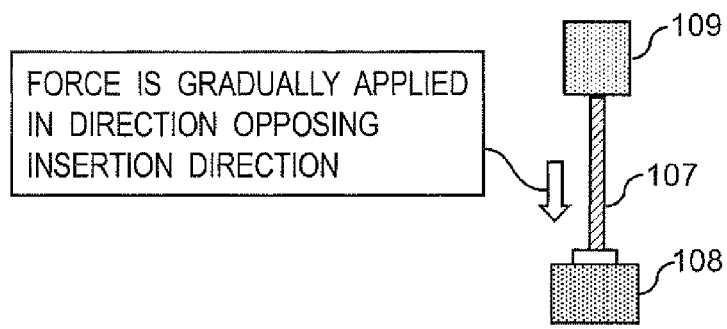
FIG. 24E is an explanatory view showing the method of measuring a buckling load of a screw in the fourth embodiment (when the "object flexibility information" is selected) of the present invention.

Subsequently, as shown in FIGS. 24B and 24E, a force is gradually applied to an end portion in the insertion direction of the object by using a force applying device 109 along a longitudinal direction of the object.

Figure 24F:
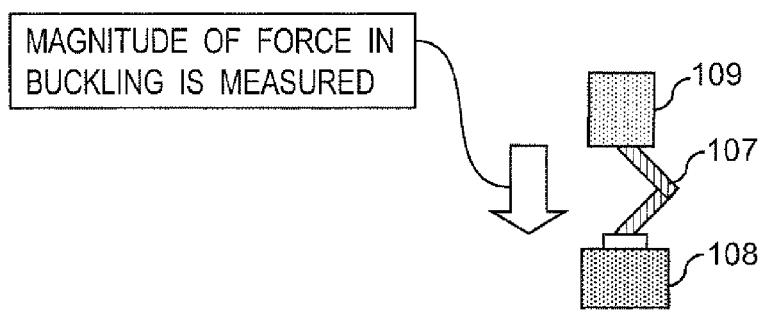
FIG. 24F is an explanatory view showing the method of measuring a buckling load of a screw in the fourth embodiment (when the "object flexibility information" is selected) of the present invention.

As shown in FIGS. 24C and 24F, a magnitude of a force obtained when an object is buckled is measured, and the magnitude of the force is defined as a buckling load.

The buckling load thus obtained and the type of the object are inputted by an operator using the master input IF 7 by the operator and stored in the correction amount storing unit 42.

As a method of calculating a correction amount using object flexibility information, a database that stores a relationship among the type of the object as shown in FIG. 25, the buckling load, and the correction amount is owned by the correction amount storing unit 42, and, depending on the pieces of information of the type of the object and the buckling load, the force correcting unit 25 and the slave force correcting unit 39 calculate a calculation amount from the correction amount storing unit 42. A value of the database, in the flexible board A, decreases to 1.4 times to 1.2 times, when the correction amount increases as the buckling load increases to 10 N to 20 N (become hard). When the correction amount decreases, the value decreases to 0.8 times to 0.6 times.

A determination whether the correction amount increases or decreases will be described below. When the force correction section detecting unit 27 and the slave force correction section detecting unit 40 determine that the displacement of the pieces of force information acquired by the force information acquiring unit 26 exceeds a threshold value (for example, 1.0 N), the force correction section detecting unit 27 and the slave force correction section detecting unit 40 perform detection as an "increase". When the force correction section detecting unit 27 and the slave force correction section detecting unit 40 determine that the displacement of the pieces of force information acquired by the master force information acquiring unit 10 exceeds the threshold value, the force correction section detecting unit 27 and the slave force correction section detecting unit 40 perform detection as a "decrease".

(When "Master Grip Position Information" is Selected by the Force Correcting Method Selecting Unit 35)

The force correcting unit 25 and the slave force correcting unit 39, on the basis of the force information inputted from the slave control unit 24 to the force correcting unit 25 and the slave force correcting unit 39, as the force information of the "force correction section" (force correction zone), information obtained by correcting the force information is outputted to the slave control unit 24. On the other hand, as information of "no change", the force information is outputted to the slave control unit 24 without being changed.

Figure 26A:
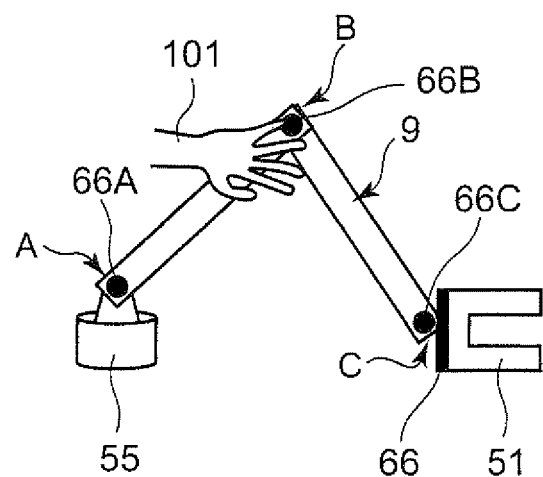
FIG. 26A is an explanatory view showing a master grip position in the fourth embodiment (when "master grip position information" is selected) of the present invention.
Figure 26B:
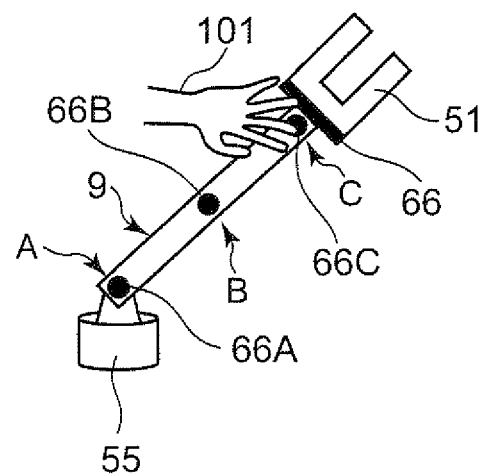
FIG. 26B is an explanatory view showing the master grip position in the fourth embodiment (when the "master grip position information" is selected) of the present invention.

A method of correcting the force information will be described with reference to FIGS. 26A to 26B. The master grip position information, as shown in FIG. 26A, is position information for which the human hand 101 grips the master manipulator 9. In this case, on the master manipulator 9, at three points, i.e., a point A, a point B, and a point C in FIG. 26A, force sensors 66A, 66B, and 66C serving as an example of a master grip position acquiring unit are attached, respectively.

After pieces of force information acquired by the force sensors 66A, 66B, and 66C are sent to the master force information acquiring unit 10 through the master input/output IF 7 (see FIG. 7), the pieces of force information are sent to the force correcting unit 25 through the master control unit 4 and the slave control unit 24. At this time, the pieces of force information at the point A, the point B, and the point C are compared with each other by the force correcting unit 25, and a point that exhibits the maximum value is defined as a master grip position in the force correcting unit 25. Even though the slave manipulator 32 (see a shape in FIG. 21) and the master manipulator 9 have different shapes as shown in FIG. 26B, the three force sensors 66A, 66B, and 66C are attached to the master manipulator 9, and a grip position is acquired on the basis of the pieces of force information at the point A, the point B, and the point C. As a method of calculating a correction amount using master grip position information, a database that stores a relationship between a master grip position and a correction amount as shown in FIG. 27 is owned by the correction amount storing unit 42, and a correction amount of force information is calculated from the correction amount storing unit 42 by the force correcting unit 25 and the slave force correcting unit 39. A value of the database increases to 1.2 times, 1.4 times, and 1.6 times when the correction amount increases as the master grip position changes into the point A, the point B, and the point C. When the correction amount decreases, the value decreases to 0.8 times, 0.6 times, and 0.4 times.

Figure 28:
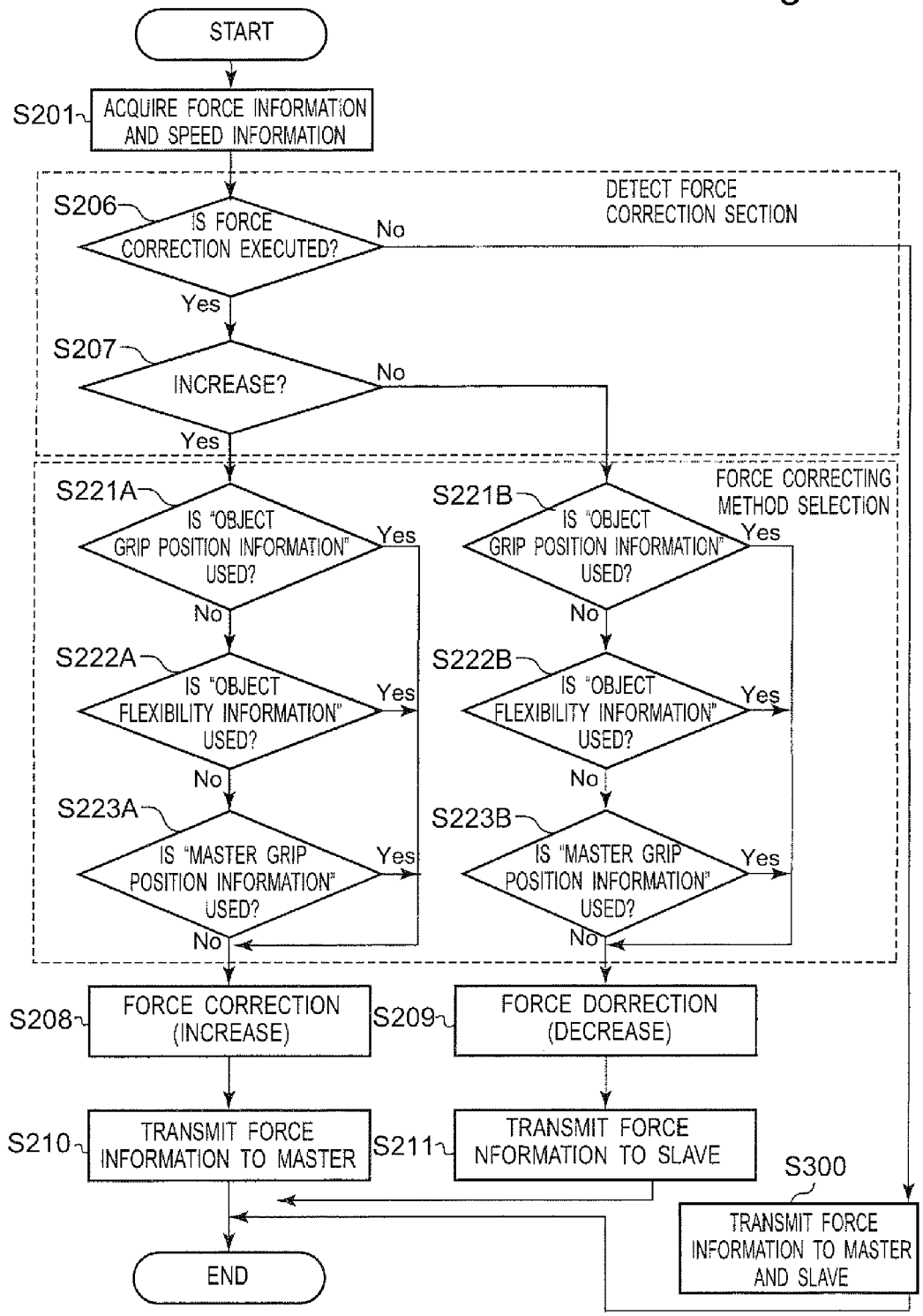
FIG. 28 is a flowchart showing a flow of processes from when force information and speed information are acquired to when force correction is performed in the fourth embodiment of the present invention.
Figure 29A:
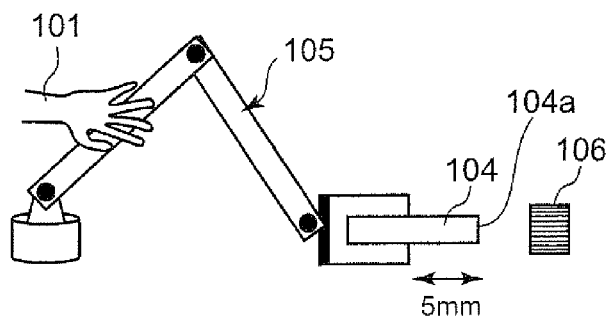
FIG. 29A is a view showing a grip position of a flexible board of a manipulator and an inserting procedure in an inserting experiment of a conventional flexible board into a connector.
Figure 29B:
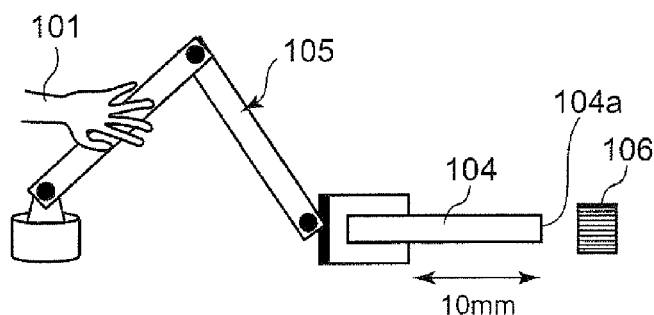
FIG. 29B is a view showing a grip position of a flexible board of a manipulator and an inserting procedure in an inserting experiment of a conventional flexible board into a connector.
Figure 29C:
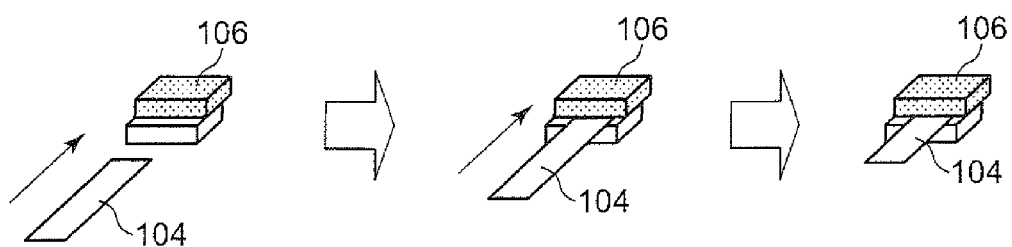
FIG. 29C is a view showing a grip position of a flexible board of a manipulator and an inserting procedure in an inserting experiment of a conventional flexible board into a connector.
Figure 30:
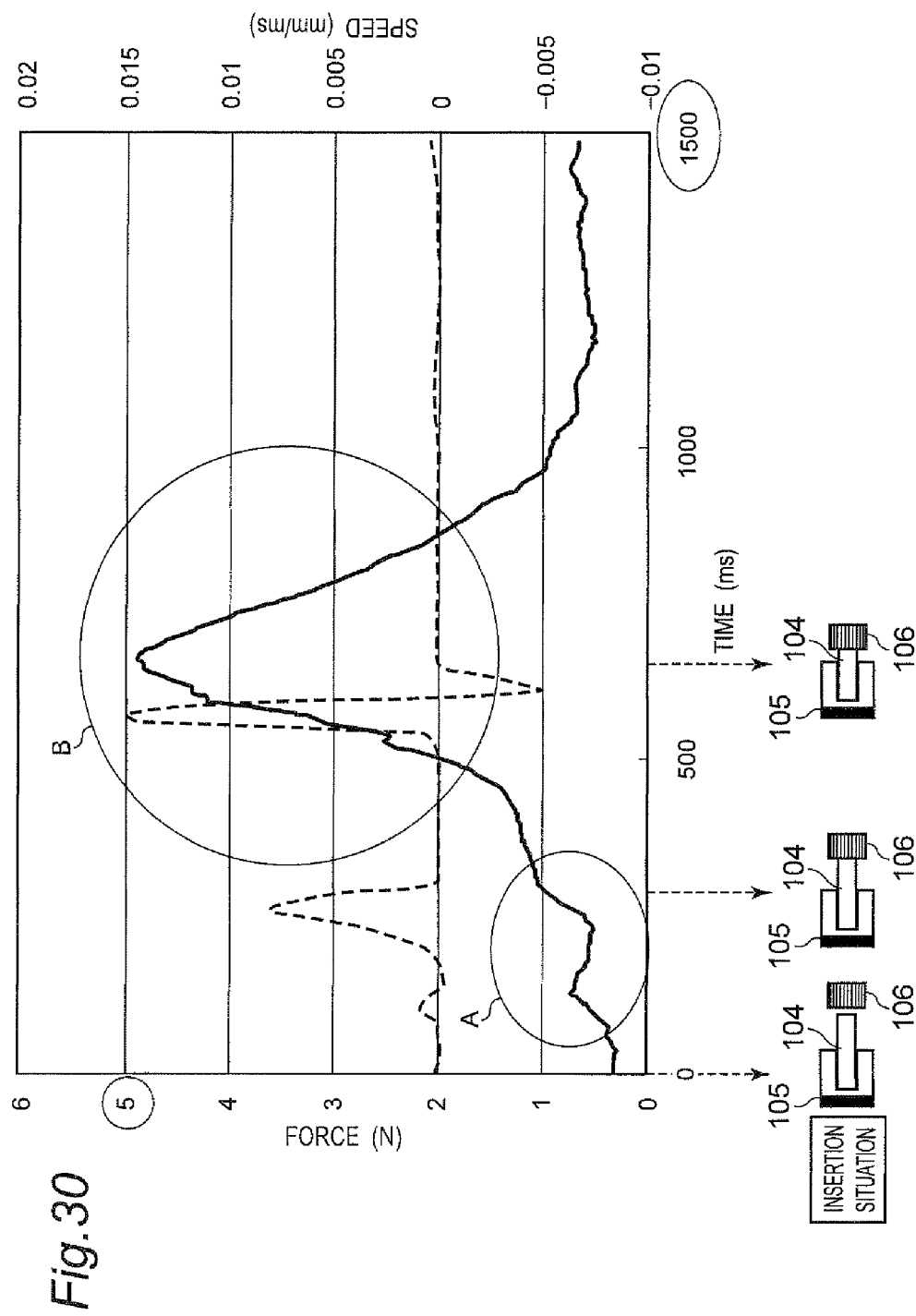
FIG. 30 is an explanatory view showing an experiment result of a grip position of 5 mm in an inserting experiment of a conventional flexible board into a connector.
Figure 31:
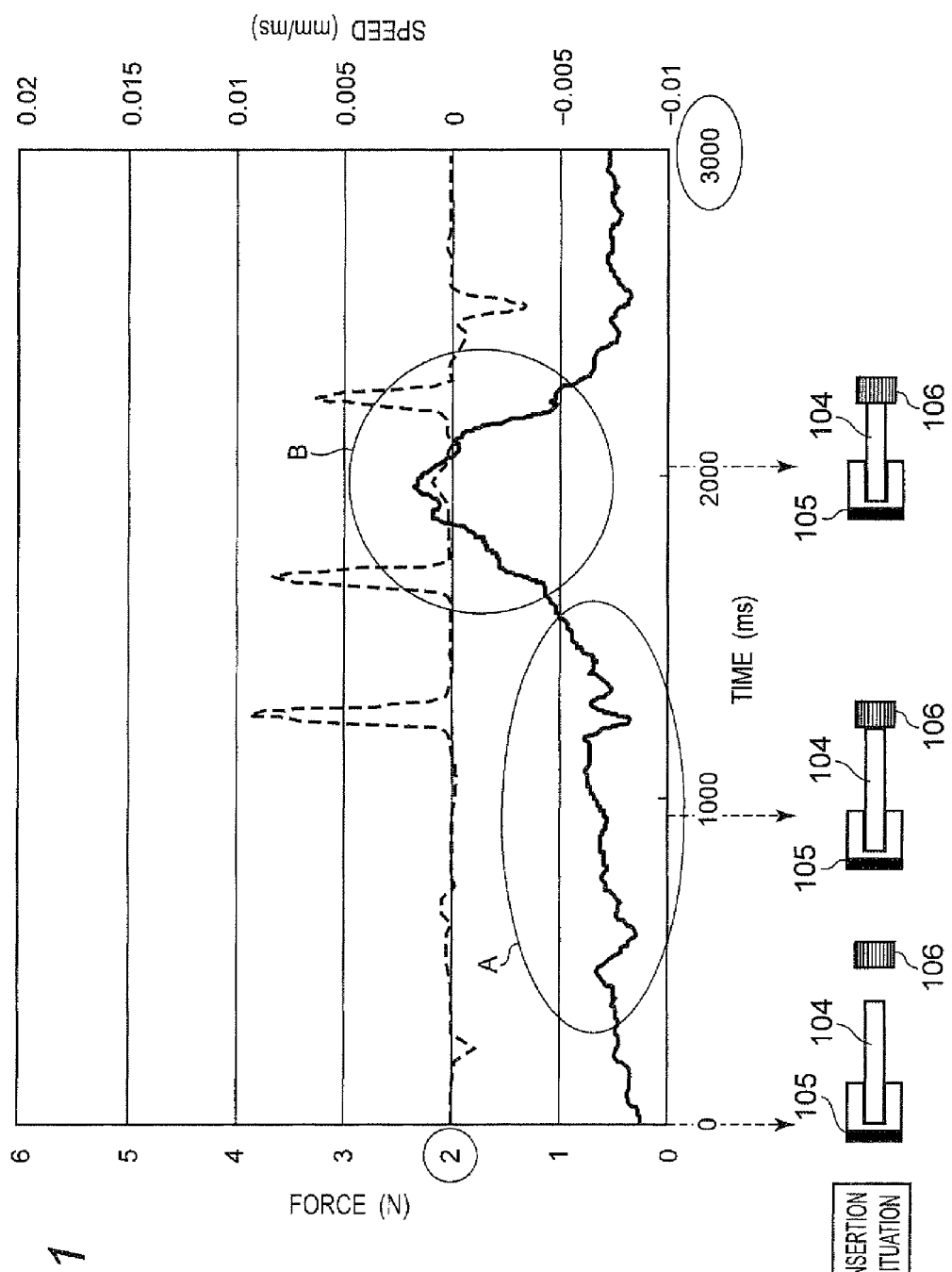
FIG. 31 is an explanatory view showing an experiment result of a grip position of 10 mm in an inserting experiment of a conventional flexible board into a connector.

FIG. 28 is a flowchart showing operations performed until force correction is performed after force information and speed information in the fourth embodiment of the present invention are acquired.

In step S201, pieces of force information are acquired by the force information acquiring unit 26 and the master force information acquiring unit 10, and speed information is acquired by the speed information acquiring unit 28.

In step S206, it is detected in the force correction section detecting unit 27 and the slave force correction section detecting unit 40 whether force correction is performed. In the force correcting unit 25, the force correction section detecting unit 27 and the slave force correction section detecting unit 40 determine whether the force information acquired by the force information acquiring unit 26 and the master force information acquiring unit 10 has a force correction section (force correction zone).

A functional difference between the force correction section detecting unit 27 and the slave force correction section detecting unit 40 will be described below. The force correction section detecting unit 27 has a function of detecting a "force correction section" (force correction zone) by using at least one of the force information acquired by the force information acquiring unit 26 and the speed information acquired by the speed information acquiring unit 28. On the other hand, the slave force correction section detecting unit 40 has a function of detecting a "force correction section" (force correction zone) by using at least one of the force information acquired by the master force information acquiring unit 10 and the speed information acquired by the speed information acquiring unit 28.

In step S206, when the force correction section detecting unit 27 and the slave force correction section detecting unit 40 determine that there is no force correction section (force correction zone), the control flow shifts to step S300.

In step S300, force information in which force correction is not performed is directly transmitted from the force correcting unit 25 to the master manipulator 9 and the slave manipulator 32 to end a series of flows.

In step S206, when the force correction section detecting unit 27 or the slave force correction section detecting unit 40 determines that there is a force correction section (force correction zone), the control flow shifts to step S207.

In step S207, the force correction section detecting unit 27 or the slave force correction section detecting unit 40 detects that there is a force correction section (force correction zone). The force correction section detecting unit 27 or the slave force correction section detecting unit 40, when force correction is performed, detects whether the force correction amount is increased or decreased. Note that at a section (zone) detected as "no change" by the force correction section detecting unit 27 or the slave force correction section detecting unit 40, the force information is transmitted by the force correction section detecting unit 27 and the slave force correction section detecting unit 40 without being corrected. At a section (zone) detected as an "increase" by the force correction section detecting unit 27 and the slave force correction section detecting unit 40, the control flow shifts to step S221A. At a section (zone) detected as a "decrease" by the force correction section detecting unit 27 and the slave force correction section detecting unit 40, the control flow shifts to step S2215.

In step S221A, in the force correcting method selecting unit 35, the force correcting method selecting unit 35 determines whether "object grip position information" is selected as information used in the force correcting unit 25 and the slave force correcting unit 39. When the force correcting method selecting unit 35 determines that the "object grip position information" is selected as the information used in the force correcting unit 25 and the slave force correcting unit 39, the control flow shifts to step S208. When the force correcting method selecting unit 35 determines that the "object grip position information" is not selected as the information used in the force correcting unit 25 and the slave force correcting unit 39, the control flow shifts to step S222A.

In step S222A, in the force correcting method selecting unit 35, the force correcting method selecting unit 35 determines whether "object flexibility information" is selected as information used in the force correcting unit 25 and the slave force correcting unit 39. When the force correcting method selecting unit 35 determines that the "object flexibility information" is selected as the information used in the force correcting unit 25 and the slave force correcting unit 39, the control flow shifts to step S208. When the force correcting method selecting unit 35 determines that the "object flexibility information" is not selected as the information used in the force correcting unit 25 and the slave force correcting unit 39, the control flow shifts to step S223A.

In step S223A, in the force correcting method selecting unit 35, the force correcting method selecting unit 35 determines whether "master grip position information" is selected as information used in the force correcting unit 25 and the slave force correcting unit 39. When the force correcting method selecting unit 35 determines that the "master grip position information" is selected as the information used in the force correcting unit 25 and the slave force correcting unit 39, the control flow shifts to step S208. When the force correcting method selecting unit 35 determines that the "master grip position information" is not selected as the information used in the force correcting unit 25 and the slave force correcting unit 39, any information is not consequently selected in step S221A to step S223A. This case corresponds to a case in which the operator does not select any information, and "object grip position information" is automatically selected by the force correcting method selecting unit 35, and the control flow shifts to step S208.

In step S208, by using the information selected by the force correcting method selecting unit 35, at a section (zone) detected as an "increase" by the force correction section detecting unit 27 and the slave force correction section detecting unit 40, after the absolute value of the force information is increased in the force correcting unit 25, the control flow shifts to step S210.

In step S210, the increased force information is transmitted from the force correcting unit 25 to the master manipulator 9 to end a series of flows.

In step S221B, the force correcting method selecting unit 35 determines whether "object grip position information" is selected as information used in the force correcting unit 25 and the slave force correcting unit 39. When the force correcting method selecting unit 35 determines that the "object grip position information" is selected as the information used in the force correcting unit 25 and the slave force correcting unit 39, the control flow shifts to step S209. When the force correcting method selecting unit 35 determines that the "object grip position information" is not selected as the information used in the force correcting unit 25 and the slave force correcting unit 39, the control flow shifts to step S222B.

In step S222B, the force correcting method selecting unit 35 determines whether "object flexibility information" is selected as information used in the force correcting unit 25 and the slave force correcting unit 39. When the force correcting method selecting unit 35 determines that the "object flexibility information" is selected as the information used in the force correcting unit 25 and the slave force correcting unit 39, the control flow shifts to step S209. When the force correcting method selecting unit 35 determines that the "object flexibility information" is not selected as the information used in the force correcting unit 25 and the slave force correcting unit 39, the control flow shifts to step S223B.

In step S223B, the force correcting method selecting unit 35 determines whether "master grip position information" is selected as information used in the force correcting unit 25 and the slave force correcting unit 39. When the force correcting method selecting unit 35 determines that the "master grip position information" is selected as the information used in the force correcting unit 25 and the slave force correcting unit 39, the control flow shifts to step S209. When the force correcting method selecting unit 35 determines that the "master grip position information" is not selected as the information used in the force correcting unit 25 and the slave force correcting unit 39, any information is not consequently selected in step S221B to step S223B. This case corresponds to a case in which the operator does not select any information, and "object grip position information" is automatically selected by the force correcting method selecting unit 35, and the control flow shifts to step S209.

In step S209, at a section (zone) detected as a "decrease" by the force correction section detecting unit 27 and the slave force correction section detecting unit 40, after the absolute value of the force information is decreased in the slave force correcting unit 39, the control flow shifts to step S211.

In step S211, the decreased force information is transmitted from the force correcting unit 25 to the slave manipulator 32 to end a series of flows.

<<Effects of Fourth Embodiment>>

When tasks are performed such that object grip positions change depending on the tasks, upon selection of the "object grip position information", a correction amount is adjusted depending on a position where an object is gripped. As a result, a task performed when the tasks are performed such that the object grip positions change depending on the tasks can be easily performed. Similarly, when the tasks are performed such that flexibilities of the object change depending on the tasks, upon selection of the "object flexibility information", a correction amount is adjusted depending on the flexibilities of the object. As a result, a task performed when the tasks are performed such that the flexibilities of the object change depending on the tasks can be easily performed. Since, upon selection of the "master grip position information", a correction amount can be adjusted by a person's will, the correction amount can be adjusted by the person depending on tasks such that the correction amount is increased when a fine task is performed (for example, in a task of inserting a flexible board into a connector) or the correction amount is reduced when a rough task is performed (for example, in a task of moving a flexible board to an insertion hole of the connector).

Though the present invention has been described above based on the above first to fourth embodiments, the present invention should not be limited to the above-described first to fourth embodiments. For example, the present invention also includes the following cases.

Each of the above-described apparatuses is actually a computer system that includes, for example, a microprocessor, ROM, RAM, hard disk unit, display unit, keyboard, and mouse. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

In other words, in each of the above-mentioned embodiments, each component may be composed of dedicated hardware, or implemented by executing programs for components feasible with software. Each component can be implemented as a result that a program executing part such as a CPU reads and executes software programs recorded in a recording medium such as a hard disk or semiconductor memory. Here, software that implements an information-processing device according to each of the above-mentioned embodiments is a following program. That is to say, this program has a computer execute the units/steps defined in claims. The program has a computer execute the units/steps defined in claims.

Arbitrary embodiments of the above various embodiments are combined to each other, whereby the effects held by the embodiments can be achieved.

The present invention is useful as a control apparatus and method for a master-slave robot such as an industrial robot in which a robot manipulated by a person and a robot performing a task can be separately manipulated, a master-slave robot, a program for robot control, and an integrated electronic circuit. The present invention may be applied as not only an industrial robot but also a home-use robot, a control apparatus for a robot, a control program for robot control, and an integrated electronic circuit.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus for a master-slave robot having a slave manipulator that grips an object and performs a task while touching an object to be worked, and a master manipulator that causes a person to remote-control the slave manipulator, the control apparatus comprising:
a speed information acquiring unit that acquires speed information of a hand of the slave manipulator;
a force information acquiring unit that acquires force information externally applied to the slave manipulator;
a force correction section detecting unit that detects a force correction section serving as information of a zone that is required to be corrected in the force information on the basis of (i) the force information acquired by the force information acquiring unit and (ii) the speed information acquired by the speed information acquiring unit;
a force correcting unit that corrects the force information in the zone detected by the force correction section detecting unit;
a force transmitting unit that transmits the force information from the force correcting unit to the master manipulator;
a master control unit that controls manipulation information of the master manipulator when the person manipulates the master manipulator on basis of the force information from the force transmitting unit; and
a slave control unit that is connected to the slave manipulator and the master control unit and outputs a control signal transmitting the manipulation information of the master manipulator sent from the master control unit to the slave manipulator,
wherein the force correction section detecting unit detects a force correction position serving as any one of (i) force information in a zone in which an absolute value of the force information is corrected so as to be increased and (ii) force information in a zone in which the force information is not corrected, from the force information acquired by the force information acquiring unit, and
wherein the force correcting unit corrects the force information so as to increase the absolute value of the force information detected by the force correction section detecting unit in the zone in which the absolute value is increased.

2. The control apparatus for a master-slave robot according to claim 1, wherein a zone from a force correction start time to a force correction end time is defined as the force correction section, and the force information in the zone is represented by a curve or a straight line changing in a form of a chevron in a relationship between time and force.

3. A master-slave robot comprising the master manipulator, the slave manipulator, and the control apparatus for a master-slave robot according to claim 1.

4. A control apparatus for a master-slave robot having a slave manipulator that grips an object and performs a task while touching an object to be worked, and a master manipulator that causes a person to remote-control the slave manipulator, the control apparatus comprising:
a speed information acquiring unit that acquires speed information of a hand of the slave manipulator;
a force information acquiring unit that acquires force information externally applied to the slave manipulator;
a force correction section detecting unit that detects a force correction section serving as information of a zone that is required to be corrected in the force information on the basis of (i) the force information acquired by the force information acquiring unit and (ii) the speed information acquired by the speed information acquiring unit;
a force correcting unit that corrects the force information in the zone detected by the force correction section detecting unit;
a force transmitting unit that transmits the force information from the force correcting unit to the master manipulator;
a master control unit that controls manipulation information of the master manipulator when the person manipulates the master manipulator on basis of the force information from the force transmitting unit;
a slave control unit that is connected to the slave manipulator and the master control unit and outputs a control signal transmitting the manipulation information of the master manipulator sent from the master control unit to the slave manipulator; and
a detecting method selecting unit that selects any one of (i) force information and speed information, (ii) speed information, and (iii) stored force information and speed information when the force correction section is detected in the force correction section detecting unit, wherein on basis of the information selected by the detecting method selecting unit, the force correction section is detected by the force correction section detecting unit.

5. The control apparatus for a master-slave robot according to claim 4,
wherein the force correction section detecting unit,
when (i) the force information and speed information is selected from any one of (i) the force information and speed information, (ii) the speed information, and (iii) the stored force information and speed information in the detecting method selecting unit,
sets a time at which a displacement of the speed information acquired by the speed information acquiring unit exceeds a first threshold value, as a force correction start time,
sets a time at which a displacement of the force information acquired by the force information acquiring unit is lower than a second threshold value, as a force correction end time, and
detects a zone from the force correction start time to the force correction end time as the force correction section.

6. The control apparatus for a master-slave robot according to claim 4,
wherein the force correction section detecting unit,
when (ii) the speed information is selected from any one of (i) the force information and speed information, (ii) the speed information, and (iii) the stored force information and speed information in the detecting method selecting unit,
sets a time at which a displacement of the speed information acquired by the speed information acquiring unit exceeds a first threshold value, as a force correction start time,
sets a time at which a displacement of the speed information acquired by the speed information acquiring unit is lower than a second threshold value, as a force correction end time, and
detects a zone from the force correction start time to the force correction end time as the force correction section.

7. The control apparatus for a master-slave robot according to claim 4, further comprising a storing unit that stores force information and speed information in advance,
wherein the force correction section detecting unit,
when (iii) the stored force information and speed information is selected from any one of (i) the force information and speed information, (ii) the speed information, and (iii) the stored force information and speed information in the detecting method selecting unit,
sets, as a force correction start time, a time at which a displacement of the force information or the speed information acquired by the force information acquiring unit or the speed information acquiring unit falls within a predetermined range with reference to a displacement of the force information or the speed information obtained when a displacement of the force information or the speed information stored in the storing unit exceeds a first threshold value,
sets, as a force correction end time, a time at which the displacement of the force information or the speed information acquired by the force information acquiring unit or the speed information acquiring unit falls within a predetermined range with reference to the displacement of the force information or the speed information obtained when the displacement of the force information or the speed information stored in the storing unit is lower than a second threshold value, and detects a zone from the force correction start time to the force correction end time as the force correction section.

8. The control apparatus for a master-slave robot according to claim 4, wherein a zone from a force correction start time to a force correction end time is defined as the force correction section, and the force information in the zone is represented by a curve or a straight line changing in a form of a chevron in a relationship between time and force.

9. A master-slave robot comprising the master manipulator, the slave manipulator, and the control apparatus for a master-slave robot according to claim 4.

10. A control apparatus for a master-slave robot having a slave manipulator that grips an object and performs a task while touching an object to be worked, and a master manipulator that causes a person to remote-control the slave manipulator, the control apparatus comprising:
a speed information acquiring unit that acquires speed information of a hand of the slave manipulator;
a force information acquiring unit that acquires force information externally applied to the slave manipulator;
a force correction section detecting unit that detects a force correction section serving as information of a zone that is required to be corrected in the force information on the basis of (i) the force information acquired by the force information acquiring unit and (ii) the speed information acquired by the speed information acquiring unit;
a force correcting unit that corrects the force information in the zone detected by the force correction section detecting unit;
a force transmitting unit that transmits the force information from the force correcting unit to the master manipulator;
a master control unit that controls manipulation information of the master manipulator when the person manipulates the master manipulator on basis of the force information from the force transmitting unit;
a slave control unit that is connected to the slave manipulator and the master control unit and outputs a control signal transmitting the manipulation information of the master manipulator sent from the master control unit to the slave manipulator; and
a force correcting method selecting unit that selects any one of (i) object grip position information, (ii) object flexibility information, and (iii) master grip position information when a force is corrected in the force correcting unit,
wherein the force correcting unit corrects the force information by the force correcting method selected by the force correcting method selecting unit.

11. The control apparatus for a master-slave robot according to claim 10, further comprising:
an object grip position acquiring unit that acquires position information for which the slave manipulator grips the objects; and
a correction amount storing unit that stores relationship information between the position information for which the slave manipulator grips the object and a correction amount,
wherein the force correcting unit,
when the object grip position information is selected from any one of (i) the object grip position information, (ii) the object flexibility information, and (iii) the master grip position information in the force correcting method selecting unit,
causes the object grip position acquiring unit to acquire grip position information for which the slave manipulator grips the object, and determines a correction amount of the force information from the correction amount storing unit by using the grip position information acquired by the object grip position acquiring unit.

12. The control apparatus for a master-slave robot according to claim 10, further comprising a correction amount storing unit that stores relationship information between flexibility information of the object and a correction amount,
wherein the force correcting unit,
when (ii) the object flexibility information is selected from any one of (i) the object grip position information, (ii) the object flexibility information, and (iii) the master grip position information in the force correcting method selecting unit,
acquires flexibility information of the object based on the object from the correction amount storing unit, and
calculates a correction amount of the force information from the correction amount storing unit by using the flexibility information.

13. The control apparatus for a master-slave robot according to claim 10, further comprising:
a master grip position acquiring unit that acquires position information for which the person grips the master manipulator; and
a correction amount storing unit that stores relationship information between the position information for which the person grips the master manipulator and a correction amount, wherein
wherein the force correcting unit,
when (iii) the master grip position information is selected from any one of (i) the object grip position information, (ii) the object flexibility information, and (iii) the master grip position information in the force correcting method selecting unit,
acquires the position information for which the person grips the master manipulator in the master grip position information acquiring unit, and
calculates a correction amount of the force information from the correction amount storing unit by using the position information acquired from the master grip position information acquiring unit.

14. The control apparatus for a master-slave robot according to claim 10, wherein a zone from a force correction start time to a force correction end time is defined as the force correction section, and the force information in the zone is represented by a curve or a straight line changing in a form of a chevron in a relationship between time and force.

15. A master-slave robot comprising the master manipulator, the slave manipulator, and the control apparatus for a master-slave robot according to claim 10.

16. A control method for a control apparatus for a master-slave robot having a slave manipulator that grips an object and performs a task while touching an object to be worked, and a master manipulator that causes a person to remote-control the slave manipulator, the control method comprising:
acquiring, using a speed information acquiring unit, speed information of a hand of the slave manipulator;
acquiring, using a force information acquiring unit, force information externally applied to the slave manipulator;
detecting, using a force correction section detecting unit implemented using a processor, a force correction section serving as information of a zone that is required to be corrected in the force information on the basis of (i) the force information acquired by the force information acquiring unit and (ii) the speed information acquired by the speed information acquiring unit;
correcting, using a force correcting unit, the force information in the zone detected by the force correction section detecting unit;
transmitting, using a force transmitting unit, the force information from the force correcting unit to the master manipulator;
controlling, using a master control unit, manipulation information of the master manipulator when the person manipulates the master manipulator on basis of the force information from the force transmitting unit;
outputting, using a slave control unit that is connected to the slave manipulator and the master control unit, a control signal transmitting the manipulation information of the master manipulator sent from the master control unit to the slave manipulator,
wherein the control method further comprises detecting, using the force correction section detecting unit, a force correction position serving as any one of (i) force information in a zone in which an absolute value of the force information is corrected so as to be increased and (ii) force information in a zone in which the force information is not corrected, from the force information acquired by the force information acquiring unit, and
wherein the force correcting unit corrects the force information so as to increase the absolute value of the force information detected by the force correction section detecting unit in the zone in which the absolute value is increased.

17. A control method for a control apparatus for a master-slave robot having a slave manipulator that grips an object and performs a task while touching an object to be worked, and a master manipulator that causes a person to remote-control the slave manipulator, the control method comprising:
acquiring, using a speed information acquiring unit, speed information of a hand of the slave manipulator;
acquiring, using a force information acquiring unit, force information externally applied to the slave manipulator;
detecting, using a force correction section detecting unit implemented using a processor, a force correction section serving as information of a zone that is required to be corrected in the force information on the basis of (i) the force information acquired by the force information acquiring unit and (ii) the speed information acquired by the speed information acquiring unit;
correcting, using a force correcting unit, the force information in the zone detected by the force correction section detecting unit;
transmitting, using a force transmitting unit, the force information from the force correcting unit to the master manipulator;
controlling, using a master control unit, manipulation information of the master manipulator when the person manipulates the master manipulator on basis of the force information from the force transmitting unit;
outputting, using a slave control unit that is connected to the slave manipulator and the master control unit, a control signal transmitting the manipulation information of the master manipulator sent from the master control unit to the slave manipulator; and
selecting, using a detecting method selecting unit, any one of (i) force information and speed information, (ii) speed information, and (iii) stored force information and speed information when the force correction section is detected in the force correction section detecting unit,
wherein on basis of the information selected by the detecting method selecting unit, the force correction section is detected by the force correction section detecting unit.

18. A control method for a control apparatus for a master-slave robot having a slave manipulator that grips an object and performs a task while touching an object to be worked, and a master manipulator that causes a person to remote-control the slave manipulator, the control method comprising:

acquiring, using a speed information acquiring unit, speed information of a hand of the slave manipulator;

acquiring, using a force information acquiring unit, force information externally applied to the slave manipulator;

detecting, using a force correction section detecting unit implemented using a processor, a force correction section serving as information of a zone that is required to be corrected in the force information on the basis of (i) the force information acquired by the force information acquiring unit and (ii) the speed information acquired by the speed information acquiring unit;

correcting, using a force correcting unit, the force information in the zone detected by the force correction section detecting unit;

transmitting, using a force transmitting unit, the force information from the force correcting unit to the master manipulator;

controlling, using a master control unit, manipulation information of the master manipulator when the person manipulates the master manipulator on basis of the force information from the force transmitting unit;

outputting, using a slave control unit that is connected to the slave manipulator and the master control unit, a control signal transmitting the manipulation information of the master manipulator sent from the master control unit to the slave manipulator; and selecting, using a force correcting method selecting unit, any one of (i) object grip position information, (ii) object flexibility information, and (iii) master grip position information when a force is corrected in the force correcting unit, wherein the force correcting unit corrects the force information by the force correcting method selected by the force correcting method selecting unit.

* * * * *